US010795858B1

(12) United States Patent
Schmitt

(10) Patent No.: US 10,795,858 B1
(45) Date of Patent: Oct. 6, 2020

(54) UNIVERSAL ABSTRACTION AND DE-ABSTRACTION OF A DIGITAL DATA STREAM

(71) Applicant: Erich Schmitt, Naples, FL (US)

(72) Inventor: Erich Schmitt, Naples, FL (US)

(73) Assignee: Erich Schmitt, Naples, FL (US)

( * ) Notice: Subject to any disclaimer, the term of this patent is extended or adjusted under 35 U.S.C. 154(b) by 318 days.

(21) Appl. No.: 14/621,593

(22) Filed: Feb. 13, 2015

Related U.S. Application Data

(60) Provisional application No. 61/941,027, filed on Feb. 18, 2014, provisional application No. 62/061,246, filed on Oct. 8, 2014.

(51) Int. Cl.
*G06F 17/30* (2006.01)
*G06F 16/174* (2019.01)

(52) U.S. Cl.
CPC ............... *G06F 16/1744* (2019.01)

(58) Field of Classification Search
CPC ......... G06F 17/30153; G06F 17/30345; G06F 17/2705
USPC ................................. 707/693, 758
See application file for complete search history.

(56) References Cited

U.S. PATENT DOCUMENTS

| 4,202,051 A | 5/1980 | Davida et al. |
| 4,452,590 A | 6/1984 | Trell |
| 4,575,088 A | 3/1986 | Peek |
| 4,949,294 A | 8/1990 | Wambergue |
| 4,949,380 A | 8/1990 | Chaum |
| 4,991,210 A | 2/1991 | Chaum |
| 4,996,711 A | 2/1991 | Chaum |
| 5,159,632 A | 10/1992 | Crandall |
| 5,244,371 A | 9/1993 | Bello et al. |
| 5,270,956 A | 12/1993 | Oruc et al. |
| 5,271,061 A | 12/1993 | Crandall |
| 5,272,755 A | 12/1993 | Miyaji et al. |
| 5,351,297 A | 9/1994 | Miyaji et al. |
| 5,442,707 A | 8/1995 | Miyaji et al. |
| 5,463,690 A | 10/1995 | Crandall |
| 5,497,423 A | 3/1996 | Miyaji |
| 5,502,665 A | 3/1996 | Im |
| 5,577,124 A | 11/1996 | Anshel et al. |
| 5,581,616 A | 12/1996 | Crandall |
| 5,598,181 A | 1/1997 | Kermisch |
| 5,606,690 A | 2/1997 | Hunter et al. |
| 5,710,562 A | 1/1998 | Gormish |

(Continued)

OTHER PUBLICATIONS

"*A Mathematical Theory of Communication*", C.E. Shannon, Reprinted with corrections from The Bell System Technical Journal, vol. 27, pp. 379-423, 623-656, Jul., Oct. 1948.

(Continued)

*Primary Examiner* — Lam T Mai
(74) *Attorney, Agent, or Firm* — Fish & Richardson P.C.

(57) ABSTRACT

Techniques for abstracting a set of abstraction codes from an input bit string and for de-abstracting the codes to recover an original input bit string from a set of abstraction codes are described. The techniques disclosed include an initialization of an abstraction engine and abstraction/deabstraction from an original and one's compliment of input strings. Applications of these techniques to compressing, storage, networking, and encryption are also described as is a parallel configuration for abstraction and de-abstraction.

57 Claims, 79 Drawing Sheets

(56) References Cited

U.S. PATENT DOCUMENTS

| | | |
|---|---|---|
| 5,737,425 A | 4/1998 | Ajtai |
| 5,751,808 A | 5/1998 | Anshel et al. |
| 5,790,599 A | 8/1998 | Wright, Jr. et al. |
| 5,805,703 A | 9/1998 | Crandall |
| 5,838,794 A | 11/1998 | Mittenthal |
| 5,838,795 A | 11/1998 | Mittenthal |
| 5,838,796 A | 11/1998 | Mittenthal |
| 5,867,578 A | 2/1999 | Brickell et al. |
| 6,018,735 A | 1/2000 | Hunter |
| 6,035,041 A | 3/2000 | Frankel et al. |
| 6,038,317 A | 3/2000 | Magliveras et al. |
| 6,049,610 A | 4/2000 | Crandall |
| 6,061,513 A | 5/2000 | Scandura |
| 6,064,738 A | 5/2000 | Fridrich |
| 6,081,597 A | 6/2000 | Hoffstein et al. |
| 6,128,764 A | 10/2000 | Gottesman |
| 6,138,125 A | 10/2000 | DeMoss |
| 6,141,420 A | 10/2000 | Vanstone et al. |
| 6,145,111 A | 11/2000 | Crozier et al. |
| 6,145,114 A | 11/2000 | Crozier et al. |
| 6,199,088 B1 | 3/2001 | Weng et al. |
| 6,209,091 B1 | 3/2001 | Sudia et al. |
| 6,239,727 B1 | 5/2001 | Crochemore |
| 6,246,768 B1 | 6/2001 | Kim |
| 6,252,958 B1 | 6/2001 | Rose |
| 6,252,959 B1 | 6/2001 | Paar et al. |
| 6,275,587 B1 | 8/2001 | Amerige |
| 6,285,760 B1 | 9/2001 | Crandall |
| 6,285,761 B1 | 9/2001 | Patel et al. |
| 6,298,137 B1 | 10/2001 | Hoffstein et al. |
| 6,307,935 B1 | 10/2001 | Crandall et al. |
| 6,341,349 B1 | 1/2002 | Takaragi et al. |
| 6,411,716 B1 | 6/2002 | Brickell |
| 6,480,606 B1 | 7/2002 | Kurumatani |
| 6,490,352 B1 | 12/2002 | Schroeppel |
| 6,543,021 B1 | 4/2003 | Piret |
| 6,560,336 B1 | 5/2003 | Arita |
| 6,560,493 B1 | 5/2003 | Dahleh et al. |
| 6,567,916 B1 | 5/2003 | Terao et al. |
| 6,618,483 B1 | 9/2003 | Vanstone et al. |
| 6,651,167 B1 | 11/2003 | Terao et al. |
| 6,666,381 B1 | 12/2003 | Kaminaga et al. |
| 6,718,508 B2 | 4/2004 | Lodge et al. |
| 6,751,318 B2 | 6/2004 | Crandall |
| 6,782,100 B1 | 8/2004 | Vanstone et al. |
| 6,801,579 B1 | 10/2004 | Hassibi et al. |
| 6,803,599 B2 | 10/2004 | Amin et al. |
| 6,847,737 B1 | 1/2005 | Kouri et al. |
| 6,876,745 B1 | 4/2005 | Kurumatani |
| 6,968,354 B2 | 11/2005 | Kaminaga et al. |
| 6,970,112 B2 | 11/2005 | Plotnikov et al. |
| 6,986,054 B2 | 1/2006 | Kaminaga et al. |
| 6,987,282 B2 | 1/2006 | Amin et al. |
| 6,987,818 B2 | 1/2006 | Brunel |
| 7,000,110 B1 | 2/2006 | Terao |
| 7,000,168 B2 | 2/2006 | Kurtas et al. |
| 7,023,898 B2 | 4/2006 | Brunel |
| 7,031,468 B2 | 4/2006 | Hoffstein et al. |
| 7,050,580 B1 | 5/2006 | Ferre Herrero |
| 7,069,287 B2 | 6/2006 | Paar et al. |
| 7,079,650 B1 | 7/2006 | Knudsen |
| 7,081,839 B2 | 7/2006 | Savari |
| 7,109,593 B2 | 9/2006 | Freedman et al. |
| 7,113,594 B2 | 9/2006 | Boneh et al. |
| 7,130,353 B2 | 10/2006 | Brunel |
| 7,136,484 B1 | 11/2006 | Koh |
| 7,139,396 B2 | 11/2006 | Montgomery et al. |
| 7,162,679 B2 | 1/2007 | Liberol et al. |
| 7,174,013 B1 | 2/2007 | Patel et al. |
| 7,174,498 B2 | 2/2007 | Weissinger |
| 7,197,527 B2 | 3/2007 | Naslund et al. |
| 7,200,225 B1 | 4/2007 | Schroeppel |
| 7,221,762 B2 | 5/2007 | Gentry et al. |
| 7,240,084 B2 | 7/2007 | Gura et al. |
| 7,243,064 B2 | 7/2007 | Paris |
| 7,243,292 B1 | 7/2007 | Naslund et al. |
| 7,250,624 B1 | 7/2007 | Freedman et al. |
| 7,251,325 B2 | 7/2007 | Paeng et al. |
| 7,266,303 B2 | 9/2007 | Linden et al. |
| 7,272,265 B2 | 9/2007 | Kouri et al. |
| 7,308,018 B2 | 12/2007 | Seeger et al. |
| 7,321,131 B2 | 1/2008 | Freedman et al. |
| 7,328,397 B2 | 2/2008 | Lunelli et al. |
| 7,337,322 B2 | 2/2008 | Gentry et al. |
| 7,346,159 B2 | 3/2008 | Gura et al. |
| 7,349,459 B2 | 3/2008 | Brunel |
| 7,349,538 B2 | 3/2008 | Gentry et al. |
| 7,353,395 B2 | 4/2008 | Gentry et al. |
| 7,363,496 B2 | 4/2008 | Gentry et al. |
| 7,379,546 B2 | 5/2008 | Ibrahim |
| 7,382,293 B1 | 6/2008 | Wicker |
| 7,389,225 B1 | 6/2008 | Jensen et al. |
| 7,435,562 B2 | 10/2008 | Jarrell et al. |
| 7,443,980 B2 | 10/2008 | Gentry et al. |
| 7,451,292 B2 | 11/2008 | Routt |
| 7,453,162 B2 | 11/2008 | Freedman et al. |
| 7,457,469 B2 | 11/2008 | Williams |
| 7,458,009 B2 | 11/2008 | Yu et al. |
| 7,461,115 B2 | 12/2008 | Eberle et al. |
| 7,461,261 B2 | 12/2008 | Vaudenay et al. |
| 7,474,010 B2 | 1/2009 | Freedman et al. |
| 7,485,423 B2 | 2/2009 | Jarrell et al. |
| 7,499,544 B2 | 3/2009 | Jao et al. |
| 7,508,936 B2 | 3/2009 | Eberle et al. |
| 7,518,138 B2 | 4/2009 | Freedman et al. |
| 7,525,202 B2 | 4/2009 | Freedman et al. |
| 7,530,051 B1 | 5/2009 | Allen et al. |
| 7,533,270 B2 | 5/2009 | Gentry |
| 7,548,588 B2 | 6/2009 | Averbuch et al. |
| 7,558,970 B2 | 7/2009 | Bellovin et al. |
| 7,566,896 B2 | 7/2009 | Freedman et al. |
| 7,579,146 B2 | 8/2009 | Jarrell et al. |
| 7,579,699 B2 | 8/2009 | Freedman et al. |
| 7,580,564 B2 | 8/2009 | Bailey |
| 7,587,605 B1 | 9/2009 | Venkatesan et al. |
| 7,590,854 B2 | 9/2009 | Gentry et al. |
| 7,594,261 B2 | 9/2009 | Lauter et al. |
| 7,598,514 B2 | 10/2009 | Freedman et al. |
| 7,600,223 B2 | 10/2009 | Massarenti |
| 7,603,560 B2 | 10/2009 | Crandall |
| 7,634,087 B2 | 12/2009 | Boneh et al. |
| 7,634,091 B2 | 12/2009 | Zhou et al. |
| 7,639,799 B2 | 12/2009 | Lauter et al. |
| 7,644,335 B2 | 1/2010 | Luby et al. |
| 7,653,817 B2 | 1/2010 | Gentry |
| 7,657,748 B2 | 2/2010 | Gentry |
| 7,664,957 B2 | 2/2010 | Gentry et al. |
| 7,672,952 B2 | 3/2010 | Isaacson et al. |
| 7,676,735 B2 | 3/2010 | Luby et al. |
| 7,680,268 B2 | 3/2010 | Lauter et al. |
| 7,685,566 B2 | 3/2010 | Brown, Jr. et al. |
| 7,689,056 B2 | 3/2010 | Papadakis et al. |
| 7,702,098 B2 | 4/2010 | Lauter et al. |
| 7,707,426 B2 | 4/2010 | Lauter et al. |
| 7,724,898 B2 | 5/2010 | Naslund et al. |
| 7,725,724 B2 | 5/2010 | Ding et al. |
| 7,737,870 B1 | 6/2010 | Wang |
| 7,743,253 B2 | 6/2010 | Lauter et al. |
| 7,751,558 B2 | 7/2010 | Gentry |
| 7,769,740 B2 * | 8/2010 | Martinez ............ G06F 17/30864 707/706 |
| 7,792,894 B1 | 9/2010 | Cohn et al. |
| 7,796,751 B2 | 9/2010 | Gentry |
| 7,814,326 B2 | 10/2010 | Gentry |
| 7,853,016 B2 | 12/2010 | Gentry |
| 7,881,466 B2 | 2/2011 | Gorissen et al. |
| 7,885,406 B2 | 2/2011 | Lauter et al. |
| 7,917,513 B2 | 3/2011 | Watanabe et al. |
| 7,930,335 B2 | 4/2011 | Gura et al. |
| 7,933,823 B1 | 4/2011 | Seifert et al. |
| 7,948,925 B2 | 5/2011 | Miyabayashi et al. |
| 7,961,873 B2 | 6/2011 | Ibrahim |
| 7,961,874 B2 | 6/2011 | Ibrahim |
| 7,962,761 B1 | 6/2011 | Spalka et al. |

(56) References Cited

U.S. PATENT DOCUMENTS

| | | | |
|---|---|---|---|
| 7,974,405 | B2 | 7/2011 | Furukawa et al. |
| 8,024,581 | B2 | 9/2011 | Spalka et al. |
| 8,027,466 | B2 | 9/2011 | Ebeid |
| 8,050,403 | B2 | 11/2011 | Ebeid |
| 8,053,754 | B2 | 11/2011 | Freedman et al. |
| 8,058,638 | B2 | 11/2011 | Freedman et al. |
| 8,065,735 | B2 | 11/2011 | Joye |
| 8,074,073 | B2 | 12/2011 | Gentry |
| 8,076,666 | B2 | 12/2011 | Bonderson et al. |
| 8,078,877 | B2 | 12/2011 | Cheon |
| 8,111,826 | B2 | 2/2012 | Takashima |
| 8,130,964 | B2 | 3/2012 | Boneh et al. |
| 8,150,029 | B2 | 4/2012 | Huque et al. |
| 8,160,245 | B2 | 4/2012 | Ebeid |
| 8,176,110 | B2 | 5/2012 | Eberle et al. |
| 8,180,047 | B2 | 5/2012 | Lauter et al. |
| 8,180,049 | B2 | 5/2012 | Gentry |
| 8,200,963 | B2 | 6/2012 | Jin et al. |
| 8,204,232 | B2 | 6/2012 | Struik et al. |
| 8,209,279 | B2 | 6/2012 | Freedman et al. |
| 8,214,811 | B2 | 7/2012 | Barcia |
| 8,219,820 | B2 | 7/2012 | Ebeid |
| 8,243,919 | B2 | 8/2012 | Ebeid |
| 8,250,367 | B2 | 8/2012 | Broker et al. |
| 8,261,069 | B2 | 9/2012 | Bellovin et al. |
| 8,266,089 | B2 | 9/2012 | Asenjo |
| 8,271,412 | B2 | 9/2012 | Johnson |
| 8,300,807 | B2 | 10/2012 | Broko et al. |
| 8,300,811 | B2 | 10/2012 | Georgiades et al. |
| 8,331,557 | B2 | 12/2012 | Ebeid |
| 8,345,863 | B2 | 1/2013 | Back et al. |
| 8,369,517 | B2 | 2/2013 | Venelli et al. |
| 8,379,844 | B2 | 2/2013 | Ebeid |
| 8,379,849 | B2 | 2/2013 | Ebeid |
| 8,380,982 | B2 | 2/2013 | Miyabayashi et al. |
| 8,391,479 | B2 | 3/2013 | Ebeid |
| 8,402,287 | B2 | 3/2013 | Vigilant et al. |
| 8,422,541 | B2 | 4/2013 | Ashikhmin et al. |
| 8,422,685 | B2 | 4/2013 | Al-Somani et al. |
| 8,432,884 | B1 | 4/2013 | Ashrafi |
| 8,457,305 | B2 | 6/2013 | Lauter et al. |
| 8,464,060 | B2 | 6/2013 | Yao et al. |
| 8,467,535 | B2 | 6/2013 | Struik |
| 8,468,512 | B2 | 6/2013 | Bnayahu |
| 8,471,245 | B2 | 6/2013 | Bonderson et al. |
| 8,477,934 | B2 | 7/2013 | Nogami et al. |
| 8,503,679 | B2 | 8/2013 | Bugbee |
| 8,509,426 | B1 | 8/2013 | Ghouti et al. |
| 8,516,267 | B2 | 8/2013 | Spalka et al. |
| 8,522,011 | B2 | 8/2013 | Spalka et al. |
| 8,533,490 | B2 | 9/2013 | Kargl et al. |
| 2004/0101048 | A1 | 5/2004 | Paris |
| 2013/0318093 | A1 | 11/2013 | Conron |
| 2013/0339377 | A1* | 12/2013 | Iwama ............... G06F 17/2705 707/758 |
| 2014/0123107 | A1* | 5/2014 | Rajagopalan ....... G06F 11/3684 717/123 |
| 2015/0055777 | A1 | 2/2015 | Wang |

OTHER PUBLICATIONS

"On the Length of Programs for Computing Finite Binary Sequences", G.J. Chaitin, Journal of the ACM 13 (1966), pp. 547-569.
"Development of Guidelines for the Definition of the Relevant Information Content in Data Classes", Erich Schmitt, The Research Foundation of State University of New York, Apr. 1973, pp. 1-24.
*An Introduction to the Theory of Groups*, Fourth Edition, Joseph J. Rotman, Springer, 4th edition (1999) cover pages, 2 pages.
*An Introduction to the Theory of Groups*, Fourth Edition, Joseph J. Rotman, Springer, 4th edition (1999) Chapter 10, Abelian Groups, 36 pages.
*An Introduction to the Theory of Groups*, Fourth Edition, Joseph J. Rotman, Springer, 4th edition (1999), Chapter 11, Free Groups and Free Products 75 pages.
*An Introduction to the Theory of Groups*, Fourth Edition, Joseph J. Rotman, Springer, 4th edition (1999), Table of Contents, 4 pages.
*An Introduction to the Theory of Groups*, Fourth Edition, Joseph J. Rotman, Springer, 4th edition (1999), Appendix II, Equivalence Relations and Equivalence Classes 2 pages.
Abstraction Principal from Wikipedia page was last modified on Oct. 19, 2015. Retrieved from "https://en.wikipedia.org/wiki/Abstraction_principle_(computer_programming)".
Abelian group page was last modified Mar. 13, 2016 Retrieved from https://en.wikipedia.org/w/index.php?title=Abelian_group&oldid=709860886.
Non-Abelian group page was last modified Nov. 23, 2015 Retrieved from https://en.wikipedia.org/w/index.php?title=Non-abelian_group&oldid=691956962.
Dihedral group of order 6 page was last modified Mar. 13, 2016 Retrieved from https://en.wikipedia.org/wiki/Dihedral_group_of_order_6.
Abstract Algebra Theory and Applications Thomas W. Judson, Stephen F. Austin State University Aug. 12, 2015; © 1997-2015 Thomas W. Judson, Robert A. Beezer; GNU Free Documentation License Retrieved at http://abstract.ups.edu/download.html Preface; Table of Contents.
Abstract Algebra Theory and Applications Thomas W. Judson, Stephen F. Austin State University Aug. 12, 2015; © 1997-2015 Thomas W. Judson, Robert A. Beezer; GNU Free Documentation License Retrieved at http://abstract.ups.edu/download.html Chap. 3.
Abstract Algebra Theory and Applications Thomas W. Judson, Stephen F. Austin State University Aug. 12, 2015; © 1997-2015 Thomas W. Judson, Robert A. Beezer; GNU Free Documentation License Retrieved at http://abstract.ups.edu/download.html Chap. 5.
http://planetmath.org/nonabeliangroup, pp. 1-3.
"New Public Key Cryptosystem using Finite Non Abelian Group," Seong-Hun Paeng et al., National Security Research Institute, Korea, pp. 1-16.
*Alice Corp.* v. *CLS Bank Intl* 573 U. S. (2014).
"An Introduction to the Theory of Groups", Third Edition, Joseph J. Rotman, pp. 240-350.
"An Introduction to the Theory of Groups", George W. Polites, 1968, Chapter 4, pp. 49-61.
Abstraction from https://en.wikipedia.org/wiki/Abstraction; last modified Dec. 27, 2017.
Judson, T.W. *Abstract Algebra Theory and Applications*, Austin State Univ., 2013, p. 1-444.
"Groups," (Chap. 3) in: Judson, T.W., *Abstract Algebra Theory and Applications*, Austin State Univ., 2013, pp. 37-58.
"Isomorphisms," (Chap. 9) in: Judson, T.W., *Abstract Algebra Theory and Applications*, Austin State Univ., 2013, pp. 143-158.
"Homomorphisms," (Chap. 11) in: Judson, T.W., *Abstract Algebra Theory and Applications*, Austin State Univ., 2013, pp. 169-178.
"The Structure of Groups," (Chap. 13) in: Judson, T.W., *Abstract Algebra Theory and Applications*, Austin State Univ., 2013, pp. 200-212.
"Group Properties and Group Isomorphism," E. Manalo, May 25, 2001, p. 1-29.
"A5 is the unique simple non-abelian group of smallest order," Apr. 30, 2012, p. 1-2.
"Group isomorphism," https://en.wikipedia.org/w/index.php?title=Group_isomorphism&oldid=866487806, Oct. 30, 2018, p. 1-5.

* cited by examiner

| Order DA String (k) | DA Element | Order DA String (k) | DA Element | Order DA String (k) | DA Element |
|---|---|---|---|---|---|
| 1 | 1 | 43 | 1 | 85 | 0 |
| 2 | 1 | 44 | 1 | 86 | 0 |
| 3 | 1 | 45 | 1 | 87 | 1 |
| 4 | 1 | 46 | 0 | 88 | 1 |
| 5 | 1 | 47 | 0 | 89 | 1 |
| 6 | 0 | 48 | 1 | 90 | 1 |
| 7 | 0 | 49 | 0 | 91 | 1 |
| 8 | 1 | 50 | 0 | 92 | 0 |
| 9 | 0 | 51 | 1 | 93 | 0 |
| 10 | 1 | 52 | 1 | 94 | 1 |
| 11 | 1 | 53 | 0 | 95 | 0 |
| 12 | 1 | 54 | 0 | 96 | 0 |
| 13 | 1 | 55 | 1 | 97 | 0 |
| 14 | 1 | 56 | 1 | 98 | 1 |
| 15 | 1 | 57 | 1 | 99 | 0 |
| 16 | 1 | 58 | 0 | 100 | 1 |
| 17 | 1 | 59 | 0 | 101 | 1 |
| 18 | 1 | 60 | 1 | 102 | 0 |
| 19 | 1 | 61 | 1 | 103 | 0 |
| 20 | 0 | 62 | 0 | 104 | 0 |
| 21 | 1 | 63 | 0 | 105 | 1 |
| 22 | 1 | 64 | 0 | 106 | 0 |
| 23 | 0 | 65 | 1 | 107 | 0 |
| 24 | 1 | 66 | 1 | 108 | 1 |
| 25 | 0 | 67 | 0 | 109 | 0 |
| 26 | 1 | 68 | 1 | 110 | 1 |
| 27 | 1 | 69 | 0 | 111 | 0 |
| 28 | 1 | 70 | 0 | 112 | 1 |
| 29 | 0 | 71 | 0 | 113 | 0 |
| 30 | 1 | 72 | 1 | 114 | 1 |
| 31 | 0 | 73 | 0 | 115 | 1 |
| 32 | 0 | 74 | 0 | 116 | 0 |
| 33 | 0 | 75 | 1 | 117 | 0 |
| 34 | 0 | 76 | 1 | 118 | 0 |
| 35 | 0 | 77 | 1 | 119 | 1 |
| 36 | 0 | 78 | 1 | 120 | 1 |
| 37 | 1 | 79 | 0 | 121 | 0 |
| 38 | 1 | 80 | 1 | 122 | 0 |
| 39 | 0 | 81 | 1 | 123 | 0 |
| 40 | 1 | 82 | 1 | 124 | 0 |
| 41 | 0 | 83 | 0 | 125 | 1 |
| 42 | 1 | 84 | 1 | | |

FIG. 4

| Order (m) | Limit Data String | Order (m) | Limit Data String |
|---|---|---|---|
| 0 | 0 | 21 | 0 |
| 1 | 0 | 22 | 1 |
| 2 | 1 | 23 | 0 |
| 3 | 0 | 24 | 0 |
| 4 | 0 | 25 | 0 |
| 5 | 0 | 26 | 1 |
| 6 | 0 | 27 | 1 |
| 7 | 1 | 28 | 1 |
| 8 | 0 | 29 | 1 |
| 9 | 1 | 30 | 1 |
| 10 | 1 | 31 | 0 |
| 11 | 1 | 32 | 0 |
| 12 | 1 | 33 | 1 |
| 13 | 1 | 34 | 1 |
| 14 | 0 | 35 | 0 |
| 15 | 0 | 36 | 1 |
| 16 | 1 | 37 | 0 |
| 17 | 1 | 38 | 1 |
| 18 | 1 | 39 | 1 |
| 19 | 0 | 40 | 0 |
| 20 | 0 | 41 | 1 |

FIG. 5A

| Order | AD Bits | Order | AD Bits | Order | AD Bits | Order | AD Bits | Order | AD Bits |
|---|---|---|---|---|---|---|---|---|---|
| 0 | 0 | 36 | 1 | 72 | 1 | 108 | 1 | 144 | 1 |
| 1 | 0 | 37 | 1 | 73 | 1 | 109 | 0 | 145 | 0 |
| 2 | 1 | 38 | 1 | 74 | 0 | 110 | 1 | 146 | 1 |
| 3 | 1 | 39 | 0 | 75 | 0 | 111 | 1 | 147 | 1 |
| 4 | 0 | 40 | 0 | 76 | 1 | 112 | 0 | 148 | 1 |
| 5 | 1 | 41 | 1 | 77 | 0 | 113 | 0 | 149 | 1 |
| 6 | 1 | 42 | 0 | 78 | 1 | 114 | 1 | 150 | 1 |
| 7 | 1 | 43 | 0 | 79 | 0 | 115 | 0 | 151 | 0 |
| 8 | 0 | 44 | 1 | 80 | 0 | 116 | 0 | 152 | 0 |
| 9 | 1 | 45 | 0 | 81 | 1 | 117 | 1 | 153 | 0 |
| 10 | 1 | 46 | 0 | 82 | 0 | 118 | 1 | 154 | 0 |
| 11 | 1 | 47 | 1 | 83 | 0 | 119 | 0 | 155 | 0 |
| 12 | 1 | 48 | 0 | 84 | 0 | 120 | 0 | 156 | 0 |
| 13 | 1 | 49 | 0 | 85 | 0 | 121 | 0 | 157 | 0 |
| 14 | 0 | 50 | 1 | 86 | 0 | 122 | 0 | 158 | 1 |
| 15 | 0 | 51 | 0 | 87 | 0 | 123 | 0 | 159 | 1 |
| 16 | 1 | 52 | 0 | 88 | 1 | 124 | 0 | 160 | 0 |
| 17 | 0 | 53 | 1 | 89 | 0 | 125 | 1 | 161 | 0 |
| 18 | 1 | 54 | 1 | 90 | 0 | 126 | 0 | 162 | 1 |
| 19 | 1 | 55 | 0 | 91 | 1 | 127 | 1 | 163 | 0 |
| 20 | 1 | 56 | 1 | 92 | 0 | 128 | 1 | 164 | 0 |
| 21 | 0 | 57 | 1 | 93 | 1 | 129 | 1 | 165 | 0 |
| 22 | 0 | 58 | 0 | 94 | 1 | 130 | 0 | 166 | 1 |
| 23 | 1 | 59 | 1 | 95 | 1 | 131 | 1 | | |
| 24 | 1 | 60 | 1 | 96 | 1 | 132 | 1 | | |
| 25 | 0 | 61 | 0 | 97 | 1 | 133 | 1 | | |
| 26 | 0 | 62 | 0 | 98 | 1 | 134 | 1 | | |
| 27 | 1 | 63 | 1 | 99 | 1 | 135 | 0 | | |
| 28 | 0 | 64 | 0 | 100 | 0 | 136 | 0 | | |
| 29 | 0 | 65 | 1 | 101 | 1 | 137 | 0 | | |
| 30 | 1 | 66 | 1 | 102 | 1 | 138 | 0 | | |
| 31 | 1 | 67 | 0 | 103 | 1 | 139 | 1 | | |
| 32 | 0 | 68 | 1 | 104 | 0 | 140 | 1 | | |
| 33 | 1 | 69 | 1 | 105 | 1 | 141 | 1 | | |
| 34 | 1 | 70 | 0 | 106 | 1 | 142 | 1 | | |
| 35 | 1 | 71 | 1 | 107 | 1 | 143 | 0 | | |

FIG. 5B

| | 0 | 1 | 2 | 3 | 4 | 5 |
|---|---|---|---|---|---|---|
| 0 | 0 | 1 | 2 | 3 | 4 | 5 |
| 1 | 1 | 2 | 0 | 4 | 5 | 3 |
| 2 | 2 | 0 | 1 | 5 | 3 | 4 |
| 3 | 3 | 5 | 4 | 0 | 2 | 1 |
| 4 | 4 | 3 | 5 | 1 | 0 | 2 |
| 5 | 5 | 4 | 3 | 2 | 1 | 0 |

| | 00 | 01 | 02 | 03 | 04 | 05 | 10 | 11 | 12 | 13 | 14 | 15 |
|---|---|---|---|---|---|---|---|---|---|---|---|---|
| 00 | 00 | 11 | 22 | 33 | 44 | 55 | 11 | 22 | 00 | 44 | 55 | 33 |
| 01 | 11 | 22 | 00 | 45 | 53 | 34 | 22 | 00 | 11 | 53 | 34 | 45 |
| 02 | 22 | 00 | 11 | 54 | 35 | 43 | 00 | 11 | 22 | 35 | 43 | 54 |
| 03 | 33 | 54 | 45 | 00 | 21 | 12 | 44 | 35 | 53 | 11 | 02 | 20 |
| 04 | 44 | 35 | 53 | 12 | 00 | 21 | 55 | 43 | 34 | 20 | 11 | 02 |
| 05 | 55 | 43 | 34 | 21 | 12 | 00 | 33 | 54 | 45 | 02 | 20 | 11 |
| 10 | 11 | 22 | 00 | 44 | 55 | 33 | 22 | 00 | 11 | 22 | 33 | 44 |
| 11 | 22 | 00 | 11 | 53 | 34 | 45 | 00 | 11 | 22 | 01 | 45 | 53 |
| 12 | 00 | 11 | 22 | 35 | 43 | 54 | 11 | 22 | 00 | 10 | 54 | 35 |
| 13 | 44 | 35 | 53 | 11 | 02 | 20 | 55 | 43 | 34 | 33 | 45 | 01 |
| 14 | 55 | 43 | 34 | 20 | 11 | 02 | 33 | 54 | 45 | 45 | 54 | 10 |
| 15 | 33 | 54 | 45 | 02 | 20 | 11 | 44 | 35 | 53 | 22 | 10 | 22 |
| 20 | 22 | 00 | 11 | 55 | 33 | 44 | 00 | 11 | 22 | 33 | 44 | 55 |
| 21 | 00 | 11 | 22 | 34 | 45 | 53 | 11 | 22 | 00 | 45 | 53 | 34 |
| 22 | 11 | 22 | 00 | 43 | 54 | 35 | 22 | 00 | 11 | 54 | 35 | 43 |
| 23 | 55 | 43 | 34 | 22 | 01 | 10 | 33 | 54 | 45 | 00 | 21 | 12 |
| 24 | 33 | 54 | 45 | 01 | 10 | 22 | 44 | 35 | 53 | 12 | 00 | 21 |
| 25 | 44 | 35 | 53 | 10 | 22 | 01 | 55 | 43 | 34 | 21 | 12 | 00 |

79→

| FIG. 8A | FIG. 8B | FIG. 8C |
|---|---|---|
| FIG. 8D | FIG. 8E | FIG. 8F |

FIG. 8

| | 20 | 21 | 22 | 23 | 24 | 25 | 30 | 31 | 32 | 33 | 34 | 35 |
|---|---|---|---|---|---|---|---|---|---|---|---|---|
| 00 | 22 | 00 | 11 | 55 | 33 | 44 | 33 | 55 | 44 | 00 | 22 | 11 |
| 01 | 00 | 11 | 22 | 34 | 45 | 53 | 55 | 44 | 33 | 21 | 10 | 02 |
| 02 | 11 | 22 | 00 | 43 | 54 | 35 | 44 | 33 | 55 | 12 | 01 | 20 |
| 03 | 55 | 43 | 34 | 22 | 10 | 01 | 00 | 12 | 21 | 33 | 45 | 54 |
| 04 | 33 | 54 | 45 | 01 | 22 | 10 | 22 | 01 | 10 | 54 | 33 | 45 |
| 05 | 44 | 35 | 53 | 10 | 01 | 22 | 11 | 20 | 02 | 45 | 54 | 33 |
| 10 | 00 | 11 | 22 | 33 | 44 | 55 | 45 | 34 | 53 | 12 | 01 | 20 |
| 11 | 11 | 22 | 00 | 45 | 53 | 34 | 34 | 53 | 45 | 00 | 22 | 11 |
| 12 | 22 | 00 | 11 | 54 | 35 | 43 | 53 | 45 | 34 | 21 | 10 | 02 |
| 13 | 33 | 54 | 45 | 00 | 21 | 12 | 12 | 21 | 00 | 45 | 54 | 33 |
| 14 | 44 | 35 | 53 | 12 | 00 | 21 | 01 | 10 | 22 | 33 | 45 | 54 |
| 15 | 55 | 43 | 34 | 21 | 12 | 00 | 20 | 02 | 11 | 54 | 33 | 45 |
| 20 | 11 | 22 | 00 | 44 | 55 | 33 | 54 | 43 | 35 | 21 | 10 | 02 |
| 21 | 22 | 00 | 11 | 53 | 34 | 45 | 43 | 35 | 54 | 12 | 01 | 20 |
| 22 | 00 | 11 | 22 | 35 | 43 | 54 | 35 | 54 | 43 | 00 | 22 | 11 |
| 23 | 44 | 43 | 53 | 11 | 02 | 20 | 21 | 00 | 12 | 54 | 33 | 45 |
| 24 | 55 | 54 | 34 | 20 | 11 | 02 | 10 | 22 | 01 | 45 | 54 | 33 |
| 25 | 33 | 35 | 45 | 02 | 20 | 11 | 02 | 11 | 20 | 33 | 45 | 54 |

|    | 40 | 41 | 42 | 43 | 44 | 45 | 50 | 51 | 52 | 53 | 54 | 55 |
|----|----|----|----|----|----|----|----|----|----|----|----|----|
| 00 | 44 | 33 | 55 | 11 | 00 | 22 | 55 | 44 | 33 | 22 | 11 | 00 |
| 01 | 33 | 55 | 44 | 02 | 21 | 10 | 44 | 33 | 55 | 10 | 02 | 21 |
| 02 | 55 | 44 | 33 | 20 | 12 | 01 | 33 | 55 | 44 | 01 | 20 | 12 |
| 03 | 11 | 20 | 02 | 44 | 53 | 35 | 22 | 01 | 10 | 55 | 34 | 43 |
| 04 | 00 | 12 | 21 | 35 | 44 | 53 | 11 | 20 | 02 | 43 | 55 | 34 |
| 05 | 22 | 01 | 10 | 53 | 35 | 44 | 00 | 12 | 21 | 34 | 43 | 55 |
| 10 | 53 | 45 | 34 | 20 | 12 | 01 | 34 | 53 | 45 | 01 | 20 | 12 |
| 11 | 45 | 34 | 53 | 11 | 00 | 22 | 53 | 45 | 34 | 22 | 11 | 00 |
| 12 | 34 | 53 | 45 | 02 | 21 | 10 | 45 | 34 | 53 | 10 | 02 | 21 |
| 13 | 20 | 02 | 11 | 53 | 35 | 44 | 01 | 10 | 22 | 34 | 43 | 55 |
| 14 | 12 | 21 | 00 | 44 | 53 | 35 | 20 | 02 | 11 | 55 | 34 | 43 |
| 15 | 01 | 10 | 22 | 35 | 44 | 53 | 12 | 21 | 00 | 43 | 55 | 34 |
| 20 | 35 | 54 | 43 | 02 | 21 | 10 | 43 | 35 | 54 | 10 | 02 | 21 |
| 21 | 54 | 43 | 35 | 20 | 12 | 01 | 35 | 54 | 43 | 01 | 20 | 12 |
| 22 | 43 | 35 | 54 | 11 | 00 | 22 | 54 | 43 | 35 | 22 | 11 | 00 |
| 23 | 02 | 11 | 20 | 35 | 44 | 53 | 10 | 22 | 01 | 43 | 55 | 34 |
| 24 | 21 | 00 | 12 | 53 | 35 | 44 | 02 | 11 | 20 | 34 | 43 | 55 |
| 25 | 10 | 22 | 01 | 44 | 53 | 35 | 21 | 00 | 12 | 55 | 34 | 43 |

| | 40 | 41 | 42 | 43 | 44 | 45 | 50 | 51 | 52 | 53 | 54 | 55 |
|---|---|---|---|---|---|---|---|---|---|---|---|---|
| 30 | 21 | 02 | 10 | 54 | 35 | 43 | 12 | 20 | 01 | 45 | 53 | 34 |
| 31 | 02 | 10 | 21 | 33 | 44 | 55 | 20 | 01 | 12 | 54 | 35 | 43 |
| 32 | 10 | 21 | 02 | 45 | 53 | 34 | 01 | 12 | 20 | 33 | 44 | 55 |
| 33 | 54 | 45 | 33 | 21 | 12 | 00 | 45 | 33 | 54 | 12 | 00 | 21 |
| 34 | 35 | 53 | 44 | 00 | 21 | 12 | 53 | 44 | 35 | 00 | 12 | 21 |
| 35 | 43 | 34 | 55 | 12 | 00 | 21 | 34 | 55 | 43 | 21 | 00 | 12 |
| 40 | 00 | 11 | 22 | 33 | 44 | 55 | 21 | 02 | 10 | 54 | 35 | 43 |
| 41 | 11 | 22 | 00 | 45 | 53 | 34 | 02 | 10 | 21 | 33 | 44 | 55 |
| 42 | 22 | 00 | 11 | 54 | 35 | 43 | 10 | 21 | 02 | 45 | 53 | 34 |
| 43 | 33 | 54 | 45 | 00 | 12 | 21 | 45 | 53 | 34 | 00 | 12 | 21 |
| 44 | 44 | 35 | 53 | 12 | 00 | 21 | 53 | 34 | 45 | 12 | 00 | 21 |
| 45 | 55 | 43 | 34 | 21 | 12 | 00 | 34 | 45 | 55 | 21 | 00 | 12 |
| 50 | 12 | 20 | 01 | 45 | 53 | 34 | 21 | 02 | 10 | 54 | 35 | 43 |
| 51 | 20 | 01 | 12 | 54 | 35 | 43 | 02 | 10 | 21 | 33 | 44 | 55 |
| 52 | 01 | 12 | 20 | 33 | 44 | 55 | 10 | 21 | 02 | 45 | 53 | 34 |
| 53 | 45 | 33 | 54 | 12 | 00 | 21 | 54 | 45 | 33 | 00 | 12 | 21 |
| 54 | 53 | 44 | 35 | 00 | 12 | 21 | 44 | 53 | 35 | 12 | 00 | 21 |
| 55 | 34 | 55 | 43 | 21 | 00 | 12 | 55 | 34 | 43 | 21 | 00 | 12 |

©2012 Erich Schmitt (17 U.S.C. 401)

| state | p | | #F | p+1 | | | | | | |
|---|---|---|---|---|---|---|---|---|---|---|
| | AD | DA | | AD | | | DA | | | |
| | | | | 0 | 1 | 2 | 3 | 4 | 5 | |
| 35 | 0 | 0 | 20 | 54 | 34 | 54 | 53 | 45 | 55 | |
| 35 | 0 | 1 | 21 | 54 | 34 | 54 | 53 | 53 | 45 | |
| 35 | 1 | 0 | 22 | 54 | 54 | 43 | 33 | 54 | 53 | |
| 35 | 1 | 1 | 23 | 54 | 54 | 43 | 33 | 33 | 54 | |
| 40 | 0 | 0 | 24 | 00 | 44 | 35 | 43 | 33 | 54 | |
| 40 | 0 | 1 | 25 | 00 | 44 | 35 | 43 | 43 | 33 | |
| 40 | 1 | 0 | 26 | 00 | 00 | 44 | 44 | 44 | 44 | |
| 40 | 1 | 1 | 26 | 00 | 00 | 44 | 44 | 44 | 44 | |
| 41 | 0 | 0 | 28 | 21 | 45 | 53 | 45 | 55 | 34 | |
| 41 | 0 | 1 | 29 | 21 | 45 | 53 | 45 | 45 | 55 | |
| 41 | 1 | 0 | 30 | 21 | 21 | 45 | 55 | 34 | 35 | |
| 41 | 1 | 1 | 31 | 21 | 21 | 45 | 55 | 55 | 34 | |
| 42 | 0 | 0 | 32 | 12 | 43 | 44 | 44 | 44 | 44 | |
| 42 | 0 | 1 | 32 | 12 | 43 | 44 | 44 | 44 | 44 | |
| 42 | 1 | 0 | 34 | 12 | 12 | 43 | 33 | 54 | 53 | |
| 42 | 1 | 1 | 35 | 12 | 12 | 43 | 33 | 33 | 54 | |
| 43 | 0 | 0 | 36 | 53 | 43 | 44 | 44 | 44 | 44 | |
| 43 | 0 | 1 | 36 | 53 | 43 | 44 | 44 | 44 | 44 | |
| 43 | 1 | 0 | 38 | 53 | 53 | 55 | 34 | 43 | 43 | |
| 43 | 1 | 1 | 39 | 53 | 53 | 55 | 34 | 34 | 35 | |

GG'

| state | p | | #G | p+1 | | | | | | |
|---|---|---|---|---|---|---|---|---|---|---|
| | AD | DA | | AD | | | DA | | | |
| | | | | 0 | 1 | 2 | 3 | 4 | 5 | |
| 35 | 0 | 0 | 20 | 45 | 45 | 35 | 34 | 34 | 53 | |
| 35 | 0 | 1 | 21 | 45 | 45 | 35 | 34 | 53 | 54 | |
| 35 | 1 | 0 | 22 | 45 | 44 | 53 | 54 | 54 | 35 | |
| 35 | 1 | 1 | 23 | 45 | 44 | 53 | 54 | 35 | 34 | |
| 40 | 0 | 0 | 24 | 00 | 00 | 44 | 44 | 44 | 44 | |
| 40 | 0 | 1 | 24 | 00 | 00 | 44 | 44 | 44 | 44 | |
| 40 | 1 | 0 | 26 | 00 | 44 | 53 | 54 | 54 | 35 | |
| 40 | 1 | 1 | 27 | 00 | 44 | 53 | 54 | 35 | 34 | |
| 41 | 0 | 0 | 28 | 12 | 12 | 34 | 53 | 53 | 54 | |
| 41 | 0 | 1 | 29 | 12 | 12 | 34 | 53 | 54 | 35 | |
| 41 | 1 | 0 | 30 | 12 | 34 | 45 | 55 | 55 | 43 | |
| 41 | 1 | 1 | 31 | 12 | 34 | 45 | 55 | 43 | 33 | |
| 42 | 0 | 0 | 32 | 21 | 21 | 54 | 35 | 35 | 34 | |
| 42 | 0 | 1 | 33 | 21 | 21 | 54 | 35 | 34 | 53 | |
| 42 | 1 | 0 | 34 | 21 | 54 | 34 | 53 | 53 | 54 | |
| 42 | 1 | 1 | 35 | 21 | 54 | 34 | 53 | 54 | 35 | |
| 43 | 0 | 0 | 36 | 35 | 35 | 54 | 55 | 35 | 34 | |
| 43 | 0 | 1 | 37 | 35 | 35 | 54 | 55 | 34 | 53 | |
| 43 | 1 | 0 | 38 | 35 | 33 | 33 | 45 | 45 | 55 | |
| 43 | 1 | 1 | 39 | 35 | 33 | 33 | 45 | 55 | 43 | |

FIG. 10C

©2012 Erich Schmitt (17 U.S.C. 401)

FF'

| p | | | #F | p+1 | | | | | |
|---|---|---|---|---|---|---|---|---|---|
| state | AD | DA | | AD | | | DA | | |
| | | | | 0 | 1 | 2 | 3 | 4 | 5 |
| 44 | 0 | 0 | 40 | 44 | 53 | 55 | 34 | 35 | 43 |
| 44 | 0 | 1 | 41 | 44 | 53 | 55 | 34 | 34 | 35 |
| 44 | 1 | 0 | 42 | 44 | 44 | 35 | 43 | 33 | 54 |
| 44 | 1 | 1 | 43 | 44 | 44 | 35 | 43 | 43 | 33 |
| 45 | 0 | 0 | 44 | 35 | 33 | 33 | 54 | 53 | 45 |
| 45 | 0 | 1 | 45 | 35 | 33 | 33 | 54 | 54 | 53 |
| 45 | 1 | 0 | 46 | 35 | 35 | 45 | 55 | 55 | 34 |
| 45 | 1 | 1 | 47 | 35 | 35 | 45 | 55 | 34 | 55 |
| 50 | 0 | 0 | 48 | 11 | 34 | 54 | 53 | 45 | 33 |
| 50 | 0 | 1 | 49 | 11 | 34 | 54 | 53 | 43 | 35 |
| 50 | 1 | 0 | 50 | 11 | 11 | 34 | 35 | 35 | 43 |
| 50 | 1 | 1 | 51 | 11 | 11 | 34 | 35 | 34 | 55 |
| 51 | 0 | 0 | 52 | 02 | 35 | 45 | 55 | 33 | 45 |
| 51 | 0 | 1 | 53 | 02 | 35 | 45 | 55 | 43 | 33 |
| 51 | 1 | 0 | 54 | 02 | 02 | 35 | 43 | 53 | 54 |
| 51 | 1 | 1 | 55 | 02 | 02 | 35 | 43 | 54 | 53 |
| 52 | 0 | 0 | 56 | 20 | 33 | 33 | 54 | 53 | 45 |
| 52 | 0 | 1 | 57 | 20 | 33 | 33 | 54 | 54 | 53 |
| 52 | 1 | 0 | 58 | 20 | 20 | 33 | 43 | 45 | 53 |
| 52 | 1 | 1 | 59 | 20 | 20 | 33 | 43 | 54 | 53 |

GG'

| p | | | #G | p+1 | | | | | |
|---|---|---|---|---|---|---|---|---|---|
| state | AD | DA | | AD | | | DA | | |
| | | | | 0 | 1 | 2 | 3 | 4 | 5 |
| 44 | 0 | 0 | 40 | 44 | 44 | 53 | 54 | 54 | 35 |
| 44 | 0 | 1 | 41 | 44 | 44 | 53 | 54 | 35 | 34 |
| 44 | 1 | 0 | 42 | 44 | 35 | 54 | 35 | 35 | 34 |
| 44 | 1 | 1 | 43 | 44 | 35 | 54 | 35 | 34 | 53 |
| 45 | 0 | 0 | 44 | 53 | 53 | 55 | 43 | 43 | 33 |
| 45 | 0 | 1 | 45 | 53 | 53 | 55 | 43 | 33 | 45 |
| 46 | 1 | 0 | 46 | 53 | 34 | 45 | 55 | 55 | 43 |
| 47 | 1 | 1 | 47 | 53 | 34 | 45 | 55 | 43 | 33 |
| 48 | 0 | 0 | 48 | 11 | 11 | 43 | 33 | 33 | 45 |
| 49 | 0 | 1 | 49 | 11 | 11 | 43 | 33 | 45 | 55 |
| 50 | 1 | 0 | 50 | 11 | 43 | 44 | 44 | 44 | 44 |
| 50 | 1 | 1 | 50 | 11 | 43 | 44 | 44 | 44 | 44 |
| 52 | 0 | 0 | 52 | 20 | 20 | 33 | 45 | 45 | 55 |
| 53 | 0 | 1 | 53 | 20 | 20 | 33 | 45 | 55 | 43 |
| 54 | 1 | 0 | 54 | 20 | 33 | 33 | 45 | 45 | 55 |
| 55 | 1 | 1 | 55 | 20 | 33 | 33 | 45 | 55 | 43 |
| 56 | 0 | 0 | 56 | 02 | 02 | 53 | 54 | 54 | 35 |
| 57 | 0 | 1 | 57 | 02 | 02 | 53 | 54 | 35 | 34 |
| 58 | 1 | 0 | 58 | 02 | 53 | 55 | 43 | 43 | 33 |
| 59 | 1 | 1 | 59 | 02 | 53 | 55 | 43 | 33 | 45 |

FF'

| state | p | | #F | p+1 AD | | | DA | | |
|---|---|---|---|---|---|---|---|---|---|
| | AD | DA | | 0 | 1 | 2 | 3 | 4 | 5 |
| 53 | 0 | 0 | 60 | 34 | 45 | 53 | 45 | 55 | 34 |
| 53 | 0 | 1 | 61 | 34 | 45 | 53 | 45 | 45 | 55 |
| 53 | 1 | 0 | 62 | 34 | 34 | 54 | 53 | 45 | 55 |
| 53 | 1 | 1 | 63 | 34 | 34 | 54 | 53 | 53 | 45 |
| 54 | 0 | 0 | 64 | 55 | 55 | 34 | 35 | 43 | 33 |
| 54 | 0 | 1 | 65 | 55 | 55 | 34 | 35 | 35 | 43 |
| 54 | 1 | 0 | 66 | 55 | 55 | 34 | 35 | 43 | 33 |
| 54 | 1 | 1 | 67 | 55 | 55 | 34 | 35 | 35 | 43 |
| 55 | 0 | 0 | 68 | 43 | 35 | 45 | 55 | 55 | 35 |
| 55 | 0 | 1 | 69 | 43 | 35 | 45 | 55 | 55 | 34 |
| 55 | 1 | 0 | ⃝70 | 43 | 43 | 44 | 44 | 44 | 44 |
| 55 | 1 | 1 | ⃝70 | 43 | 43 | 44 | 44 | 44 | 44 |

| state | p | | #G | p+1 AD | | | DA | | |
|---|---|---|---|---|---|---|---|---|---|
| | AD | DA | | 0 | 1 | 2 | 3 | 4 | 5 |
| 53 | 0 | 0 | ⃝60 | 43 | 43 | 44 | 44 | 44 | 44 |
| 53 | 0 | 1 | ⃝60 | 43 | 43 | 44 | 44 | 44 | 44 |
| 53 | 1 | 0 | 62 | 43 | 53 | 55 | 43 | 43 | 33 |
| 53 | 1 | 1 | 63 | 43 | 53 | 55 | 43 | 33 | 45 |
| 54 | 0 | 0 | 64 | 55 | 55 | 43 | 33 | 33 | 45 |
| 54 | 0 | 1 | 65 | 55 | 55 | 43 | 33 | 45 | 55 |
| 54 | 1 | 0 | 66 | 55 | 55 | 45 | 33 | 33 | 45 |
| 54 | 1 | 1 | 67 | 55 | 55 | 45 | 33 | 45 | 55 |
| 55 | 0 | 0 | 68 | 34 | 34 | 34 | 55 | 55 | 43 |
| 55 | 0 | 1 | 69 | 34 | 34 | 34 | 55 | 43 | 33 |
| 55 | 1 | 0 | 70 | 34 | 54 | 34 | 53 | 53 | 54 |
| 55 | 1 | 1 | 71 | 34 | 54 | 34 | 53 | 54 | 35 |

©2012 Erich Schmitt (17 U.S.C. 401)

| FIG. 10A |
|---|
| FIG. 10B |
| FIG. 10C |
| FIG. 10D |

FIG. 10

| #F | => decimal equivalent | #F end binary code | #F | #F | binary code |
|---|---|---|---|---|---|
| 0 | → 0 | 000000 | 38 | → 32 | 100000 |
| 1 | 1 | 000001 | 39 | 33 | 100001 |
| 2 | 2 | 000010 | 40 | 34 | 100010 |
| 3 | 3 | 000011 | 41 | 35 | 100011 |
| 4 | 4 | 000100 | 42 | 36 | 100100 |
| 5 | 5 | 000101 | 43 | 37 | 100101 |
| 6 | 6 | 000110 | 44 | 38 | 100110 |
| 7 | 7 | 000111 | 45 | 39 | 100111 |
| 8 | 8 | 001000 | 46 | 40 | 101000 |
| 9 | 9 | 001001 | 47 | 41 | 101001 |
| 10 | 10 | 001010 | 48 | 42 | 101010 |
| 11 | 11 | 001011 | 49 | 43 | 101011 |
| 12 | 12 | 001100 | 50 | 44 | 101100 |
| 13 | 13 | 001101 | 51 | 45 | 101101 |
| 14 | 14 | 001110 | 52 | 46 | 101110 |
| 15 | 15 | 001111 | 53 | 47 | 101111 |
| 16 | 16 | 010000 | 54 | 48 | 110000 |
| 17 | 17 | 010001 | 55 | 49 | 110001 |
| 18 | 18 | 010010 | 56 | 50 | 110010 |
| 19 | 19 | 010011 | 57 | 51 | 110011 |
| 20 | 20 | 010100 | 58 | 52 | 110100 |
| 21 | 21 | 010101 | 59 | 53 | 110101 |
| 22 | 22 | 010110 | 60 | 54 | 110110 |
| 23 | 23 | 010111 | 61 | 55 | 110111 |
| 24 | 24 | 011000 | 62 | 56 | 111000 |
| 25 | 25 | 011001 | 63 | 57 | 111001 |
|  |  |  | 64 | 58 | 111010 |
| 28 | 26 | 011010 | 65 | 59 | 111011 |
| 29 | 27 | 011011 | 66 | 60 | 111100 |
| 30 | 28 | 011100 | 67 | 61 | 111101 |
| 31 | 29 | 011101 | 68 | 62 | 111110 |
|  |  |  | 69 | 63 | 111111 |
| 34 | 30 | 011110 | - |  |  |
| 35 | 31 | 011111 |  |  |  |

FIG. 11A

| #G | => decimal equivalent | #G end binary code | #G | #G | binary code |
|---|---|---|---|---|---|
| 0 | → 0 | 000000 | 36 | → 32 | 100000 |
| 1 | 1 | 000001 | 37 | 33 | 100001 |
| 2 | 2 | 000010 | .. | | |
| 3 | 3 | 000011 | 40 | 34 | 100010 |
| 4 | 4 | 000100 | 41 | 35 | 100011 |
| 5 | 5 | 000101 | 42 | 36 | 100100 |
| 6 | 6 | 000110 | 43 | 37 | 100101 |
| 7 | 7 | 000111 | 44 | 38 | 100110 |
| 8 | 8 | 001000 | 45 | 39 | 100111 |
| 9 | 9 | 001001 | 46 | 40 | 101000 |
| 10 | 10 | 001010 | 47 | 41 | 101001 |
| 11 | 11 | 001011 | 48 | 42 | 101010 |
| 12 | 12 | 001100 | 49 | 43 | 101011 |
| 13 | 13 | 001101 | 50 | 44 | 101100 |
| 14 | 14 | 001110 | 51 | 45 | 101101 |
| 15 | 15 | 001111 | 52 | 46 | 101110 |
| 16 | 16 | 010000 | 53 | 47 | 101111 |
| 17 | 17 | 010001 | 54 | 48 | 110000 |
| 18 | 18 | 010010 | 55 | 49 | 110001 |
| 19 | 19 | 010011 | 56 | 50 | 110010 |
| 20 | 20 | 010100 | 57 | 51 | 110011 |
| 21 | 21 | 010101 | 58 | 52 | 110100 |
| 22 | 22 | 010110 | 59 | 53 | 110101 |
| 23 | 23 | 010111 | 60 | 54 | 110110 |
| | | | 61 | 55 | 110111 |
| 26 | 24 | 011000 | 62 | 56 | 111000 |
| 27 | 25 | 011001 | 63 | 57 | 111001 |
| 28 | 26 | 011010 | 64 | 58 | 111010 |
| 29 | 27 | 011011 | 65 | 59 | 111011 |
| 30 | 28 | 011100 | 66 | 60 | 111100 |
| 31 | 29 | 011101 | 67 | 61 | 111101 |
| 32 | 30 | 011110 | .. | | |
| 33 | 31 | 011111 | 70 | 62 | 111110 |
| .. | | | 71 | 63 | 111111 |

FIG. 11B

V
32 bit Data example    (normal user bit)

| k | DA |
|---|----|
| 1 | 0 |
| 2 | 0 |
| 3 | 0 |
| 4 | 0 |
| 5 | 0 |
| 6 | 0 |
| 7 | 1 |
| 8 | 0 |
| 9 | 0 |
| 10 | 0 |
| 11 | 1 |
| 12 | 1 |
| 13 | 0 |
| 14 | 0 |
| 15 | 1 |
| 16 | 1 |

| k | DA |
|---|----|
| 17 | 1 |
| 18 | 1 |
| 19 | 1 |
| 20 | 0 |
| 21 | 1 |
| 22 | 1 |
| 23 | 0 |
| 24 | 1 |
| 25 | 0 |
| 26 | 1 |
| 27 | 0 |
| 28 | 0 |
| 29 | 1 |
| 30 | 1 |
| 31 | 0 |
| 32 | 0 |

32 bit Data example     (complement user bit)

| k  | DA |
|----|----|
| 1  | 1  |
| 2  | 1  |
| 3  | 1  |
| 4  | 1  |
| 5  | 1  |
| 6  | 1  |
| 7  | 0  |
| 8  | 1  |
| 9  | 1  |
| 10 | 1  |
| 11 | 0  |
| 12 | 0  |
| 13 | 1  |
| 14 | 1  |
| 15 | 0  |
| 16 | 0  |

| k  | DA |
|----|----|
| 17 | 0  |
| 18 | 0  |
| 19 | 0  |
| 20 | 1  |
| 21 | 0  |
| 22 | 0  |
| 23 | 1  |
| 24 | 0  |
| 25 | 1  |
| 26 | 0  |
| 27 | 1  |
| 28 | 1  |
| 29 | 0  |
| 30 | 0  |
| 31 | 1  |
| 32 | 1  |

FIG. 13B

| m | DA | m | DA |
|---|----|----|----|
| 0 | 0 | 27 | 1 |
| 1 | 0 | 28 | 1 |
| 2 | 1 | 29 | 0 |
| 3 | 1 | 30 | 0 |
| 4 | 0 | 31 | 1 |
| 5 | 1 | 32 | 0 |
| 6 | 1 | 33 | 0 |
| 7 | 0 | 34 | 1 |
| 8 | 0 | 35 | 1 |
| 9 | 0 | 36 | 0 |
| 10 | 1 | 37 | 0 |
| 11 | 0 | 38 | 1 |
| 12 | 1 | 39 | 0 |
| 13 | 0 | 40 | 1 |
| 14 | 0 | 41 | 0 |
| 15 | 1 | 42 | 0 |
| 16 | 1 | 43 | 0 |
| 17 | 1 | 44 | 0 |
| 18 | 0 | 45 | 0 |
| 19 | 0 | 46 | 0 |
| 20 | 1 | 47 | 1 |
| 21 | 1 | 48 | 0 |
| 22 | 0 | 49 | 1 |
| 23 | 1 | 50 | 0 |
| 24 | 1 | 51 | 1 |
| 25 | 1 | 52 | 1 |
| 26 | 0 | 53 | 1 |

FIG. 14A random sequence m F

| m F | Begin states | m F | Begin states |
|---|---|---|---|
| 0 | 30 | 27 | 31 |
| 1 | 51 | 28 | 50 |
| 2 | 50 | 29 | 32 |
| 3 | 41 | 30 | 50 |
| 4 | 32 | 31 | 31 |
| 5 | 31 | 32 | 30 |
| 6 | 32 | 33 | 51 |
| 7 | 50 | 34 | 41 |
| 8 | 31 | 35 | 32 |
| 9 | 30 | 36 | 30 |
| 10 | 51 | 37 | 32 |
| 11 | 41 | 38 | 41 |
| 12 | 50 | 39 | 51 |
| 13 | 41 | 40 | 50 |
| 14 | 31 | 41 | 31 |
| 15 | 32 | 42 | 32 |
| 16 | 51 | 43 | 31 |
| 17 | 30 | 44 | 50 |
| 18 | 31 | 45 | 41 |
| 19 | 41 | 46 | 51 |
| 20 | 50 | 47 | 30 |
| 21 | 51 | 48 | 41 |
| 22 | 30 | 49 | 30 |
| 23 | 32 | 50 | 51 |
| 24 | 30 | 51 | 50 |
| 25 | 51 | 52 | 31 |
| 26 | 41 | 53 | 32 |

FIG. 14B

| random sequence m G | |
|---|---|

| m G | Begin states | m G | Begin states |
|---|---|---|---|
| 0 | 30 | 27 | 42 |
| 1 | 51 | 28 | 32 |
| 2 | 42 | 29 | 31 |
| 3 | 41 | 30 | 30 |
| 4 | 32 | 31 | 32 |
| 5 | 31 | 32 | 41 |
| 6 | 32 | 33 | 31 |
| 7 | 42 | 34 | 51 |
| 8 | 31 | 35 | 42 |
| 9 | 30 | 36 | 51 |
| 10 | 51 | 37 | 31 |
| 11 | 41 | 38 | 41 |
| 12 | 42 | 39 | 30 |
| 13 | 41 | 40 | 42 |
| 14 | 31 | 41 | 32 |
| 15 | 32 | 42 | 31 |
| 16 | 51 | 43 | 32 |
| 17 | 42 | 44 | 51 |
| 18 | 31 | 45 | 42 |
| 19 | 41 | 46 | 30 |
| 20 | 42 | 47 | 41 |
| 21 | 51 | 48 | 31 |
| 22 | 30 | 49 | 41 |
| 23 | 32 | 50 | 42 |
| 24 | 30 | 51 | 51 |
| 25 | 51 | 52 | 32 |
| 26 | 41 | 53 | 30 |

FIG. 14C

| i | AD | i | AD | i | AD | i | AD |
|---|----|---|----|---|----|---|----|
| 0 | 0 | 36 | 0 | 72 | 0 | 108 | 1 |
| 1 | 0 | 37 | 1 | 73 | 0 | 109 | 1 |
| 2 | 1 | 38 | 0 | 74 | 1 | | |
| 3 | 1 | 39 | 1 | 75 | 1 | | |
| 4 | 1 | 40 | 0 | 76 | 1 | | |
| 5 | 0 | 41 | 0 | 77 | 0 | | |
| 6 | 0 | 42 | 1 | 78 | 1 | | |
| 7 | 1 | 43 | 1 | 79 | 1 | | |
| 8 | 1 | 44 | 1 | 80 | 0 | | |
| 9 | 1 | 45 | 0 | 81 | 1 | | |
| 10 | 0 | 46 | 1 | 82 | 1 | | |
| 11 | 0 | 47 | 0 | 83 | 1 | | |
| 12 | 1 | 48 | 1 | 84 | 1 | | |
| 13 | 0 | 49 | 0 | 85 | 1 | | |
| 14 | 1 | 50 | 0 | 86 | 1 | | |
| 15 | 0 | 51 | 1 | 87 | 1 | | |
| 16 | 0 | 52 | 1 | 88 | 0 | | |
| 17 | 1 | 53 | 1 | 89 | 0 | | |
| 18 | 0 | 54 | 0 | 90 | 1 | | |
| 19 | 1 | 55 | 0 | 91 | 1 | | |
| 20 | 0 | 56 | 0 | 92 | 0 | | |
| 21 | 1 | 57 | 1 | 93 | 1 | | |
| 22 | 0 | 58 | 0 | 94 | 1 | | |
| 23 | 1 | 59 | 1 | 95 | 1 | | |
| 24 | 1 | 60 | 0 | 96 | 0 | | |
| 25 | 0 | 61 | 1 | 97 | 0 | | |
| 26 | 0 | 62 | 1 | 98 | 1 | | |
| 27 | 0 | 63 | 0 | 99 | 1 | | |
| 28 | 1 | 64 | 0 | 100 | 1 | | |
| 29 | 0 | 65 | 0 | 101 | 0 | | |
| 30 | 0 | 66 | 1 | 102 | 0 | | |
| 31 | 1 | 67 | 1 | 103 | 0 | | |
| 32 | 0 | 68 | 1 | 104 | 1 | | |
| 33 | 1 | 69 | 0 | 105 | 1 | | |
| 34 | 1 | 70 | 1 | 106 | 0 | | |
| 35 | 0 | 71 | 0 | 107 | 1 | | |

32-bit example
AD random sequence
AD = 3k+14
AD-limit = 109

| i | AD | s/k | DA | m | DA |
|---|----|-----|----|----|----|
| 28 | 0 | 11 k | 1 | | |
| 29 | 1 | 12 k | 1 | | |
| 30 | 1 | 13 k | 0 | | |
| 31 | 0 | 14 k | 0 | | |
| 32 | 1 | 15 k | 1 | | |
| 33 | 0 | 16 k | 1 | | |
| 34 | 1 | 17 k | 1 | | |
| 35 | 1 | 18 k | 1 | | |
| 36 | 0 | 19 k | 1 | | |
| 37 | 0 | 20 k | 0 | | |
| 38 | 1 | 21 k | 1 | | |

| FF' | | | | | |
|---|---|---|---|---|---|
| | | p | | p+1 | |
| i | FF' | AD | DA | #F | FF' |
| 28 | 55 | 0 | 0 | 68 | 34 |
| | | | | 69 | |
| 29 | 34 | 1 | 1 | 18 | 53 |
| | | | | 19 | |
| 30 | 53 | 0 | 0 | 60 | 34 |
| | | | | 61 | |
| 31 | 34 | 0 | 0 | 16 | 53 |
| | | | | 17 | |
| 32 | 53 | 1 | 1 | 62 | 45 |
| | | | | 63 | |
| 33 | 45 | 0 | 0 | 44 | 53 |
| | | | | 45 | |
| 34 | 53 | 1 | 1 | 62 | 45 |
| | | | | 63 | |
| 35 | 45 | 1 | 1 | 46 | 34 |
| | | | | 47 | |
| 36 | 34 | 0 | 0 | 16 | 54 |
| | | | | 17 | |
| 37 | 54 | 0 | 0 | 64 | 33 |
| | | | | 65 | |
| 38 | 33 | 1 | 1 | 14 | 55 |
| | | | | 15 | |

| GG' | | | | | |
|---|---|---|---|---|---|
| | | p | | p+1 | |
| i | GG' | AD | DA | #G | GG' |
| 28 | 33 | 0 | 0 | 12 | 35 |
| | | | | 13 | |
| 29 | 35 | 0 | 1 | 22 | 34 |
| | | | | 23 | |
| 30 | 34 | 1 | 0 | 16 | 55 |
| | | | | 17 | |
| 31 | 55 | 0 | 0 | 68 | 43 |
| | | | | 69 | |
| 32 | 43 | 0 | 0 | 38 | 43 |
| | | | | 39 | |
| 33 | 43 | 1 | 1 | 36 | 53 |
| | | | | 37 | |
| 34 | 53 | 0 | 0 | 62 | 45 |
| | | | | 63 | |
| 35 | 45 | 1 | 1 | 46 | 33 |
| | | | | 47 | |
| 36 | 33 | 0 | 0 | 12 | 35 |
| | | | | 13 | |
| 37 | 35 | 0 | 0 | 20 | 53 |
| | | | | 21 | |
| 38 | 53 | 1 | 1 | 62 | 45 |
| | | | | 63 | |

FIG. 16A-4

©2014, 2015 Erich Schmitt (17 U.S.C. 401)

| i | AD | s/k | DA | m | DA |
|---|---|---|---|---|---|
| 39 | 0 | 22 k | 1 | | |
| 40 | 1 | 23 k | 0 | | |
| 41 | 0 | 24 k | 1 | | |
| 42 | 0 | | | | |
| 42 | 0 | | | 6 | ① |
| 43 | 1 | | | | 1 |
| 43 | 1 | | | 7 | ⓪ |
| 44 | 1 | | | 7 | 1 |
| 45 | 1 | | | | |
| 45 | 1 | | | 8 | ⓪ |
| 46 | 0 | | | 8 | 1 |

| FF' | | | | |
|---|---|---|---|---|
| | p | | p+1 | |
| i | FF' | AD | #F | DA | FF' |
| 39 | 55 | 0 | 68 | 0 | 34 |
| 40 | 34 | 0 | 69 | 1 | 34 |
| 41 | 45 | 1 | 18 | 0 | 45 |
| 41 | | 1 | 19 | 1 | |
| 42 | 53 | 0 | 44 | 0 | 53 |
| 42 | | 0 | 45 | 1 | |
| 42 | 53 | 0 | 60 | 0 | 55 |
| 42 | | 0 | 61 | 1 | |
| 43 | 55 | 1 | 60 | 0 | |
| 43 | | 1 | 61 | 1 | |
| 43 | ㊿ mF=2 | 1 | 70 | 0 | 33 |
| 43 | | 1 | 70 | 1 | |
| 44 | 33 | 1 | 50 | 0 | |
| 44 | | 1 | 51 | 1 | |
| 45 | 55 | 1 | 14 | 0 | 55 |
| 45 | | 1 | 15 | 1 | |
| 45 | ㊶ mF=3 | 1 | �androidx70 | 0 | 35 |
| 45 | | 1 | 70 | 1 | |
| 46 | 35 | 0 | 30 | 0 | 45 |
| 46 | | 0 | 31 | 1 | |

| GG' | | | | |
|---|---|---|---|---|
| | p | | p+1 | |
| i | GG' | AD | DA | #G | GG' |
| 39 | 45 | 0 | 0 | 44 | 45 |
| 40 | 45 | 0 | 1 | 45 | 43 |
| 40 | | 1 | 0 | 46 | |
| 41 | 43 | 1 | 1 | 47 | 53 |
| 42 | 53 | 0 | 0 | 36 | |
| 42 | | 0 | 1 | 37 | |
| 42 | ㉛ mG=5 | 0 | 0 | ㉿ | 54 |
| 42 | | 0 | 1 | ㉿ | |
| 43 | 54 | 1 | 0 | 4 | |
| 43 | | 1 | 0 | 5 | 45 |
| 43 | 54 | 1 | 0 | 66 | |
| 44 | 45 | 1 | 1 | 67 | 33 |
| 44 | | 1 | 1 | 66 | |
| 45 | 33 | 1 | 0 | 67 | 45 |
| 45 | | 1 | 1 | 46 | |
| 45 | ㉜ mG=6 | 1 | 1 | ⑭ | 45 |
| 45 | | 1 | 1 | ⑭ | |
| 46 | 45 | 0 | 0 | 10 | 45 |
| 46 | | 0 | 1 | 11 | |

| i | AD | s/k | DA | m | DA | | i | FF' | AD | DA | #F | FF' (p+1) | | i | GG' | AD | DA | #G | GG' (p+1) |
|---|---|---|---|---|---|---|---|---|---|---|---|---|---|---|---|---|---|---|---|
| 47 | 1 | 25 k | 0 | | | | 47 | 45 | 1 | 0 | 46 / 47 | 35 | | 47 | 45 | 1 | 0 | 46 / 47 | 43 |
| 48 | 0 | 26 k | 1 | | | | 48 | 35 | 0 | 1 | 20 / 21 | 45 | | 48 | 43 | 0 | 1 | 36 / 37 | 53 |
| 49 | 1 | 27 k | 0 | | | | 49 | 45 | 1 | 0 | 46 / 47 | 35 | | 49 | 53 | 1 | 0 | 62 / 63 | 33 |
| 50 | 0 | 28 k | 0 | | | | 50 | 35 | 0 | 1 | 20 / 21 | 55 | | 50 | 33 | 0 | 1 | 12 / 13 | 54 |
| 51 | 0 | 29 k | 1 | | | | 51 | 55 | 0 | 0 | 68 / 69 | 34 | | 51 | 54 | 0 | 0 | 64 / 65 | 55 |
| 52 | 1 | 30 k | 1 | | | | 52 | 34 | 1 | 1 | 18 / 19 | 53 | | 52 | 55 | 1 | 1 | 70 / 71 | 35 |
| 53 | 1 | 31 k | 0 | | | | 53 | 53 | 1 | 1 | 62 / 63 | 55 | | 53 | 35 | 1 | 1 | 22 / 23 | 35 |
| 54 (LD) | 1 | | | 9 | (0) | | 54 | 55 | 1 | 0 | (70) / (70) | 34 | | 54 | 35 | 1 | 0 | 22 / 23 | 35 |
| 54 (LT) | 1 | | | 9 | 1 | | 54 | (32) mF=4 | 1 | 0 | 10 / 11 | 34 | | 54 | 35 | 1 | 1 | 22 / 23 | 35 |
| 55 (*) | 0 | | | | | | 55 | 34 | 0 | 0 | 16 / 17 | 54 | | 55 | 35 | 0 | 0 | 20 / 21 | 54 |
| 56 | 0 | 32 k | 0 | | | | 56 | 54 | 0 | 1 | 64 / 65 | 33 | | 56 | 54 | 0 | 1 | 64 / 65 | 45 |

©2014, 2015 Erich Schmitt (17 U.S.C. 401)

| i | AD | s/k | DA | m | DA | | | |
|---|---|---|---|---|---|---|---|---|
| LD | 44 | 1 | | | | | | |
| LT | 44 | 1 | | | | 12 | (1) | |
| * | 45 | 1 | 18 k | 0 | 12 | 0 | | |
| LD | 46 | 0 | | | | | | |
| LT | 47 | 1 | | | 13 | (0) | | |
| LD | 47 | 1 | | | | | | |
| LD | 48 | 0 | | | 14 | (0) | | |
| LT | 48 | 0 | 19 k | 0 | 14 | 1 | | |
| * | 49 | 1 | | | | | | |
| LD | 50 | 0 | | | | | | |
| LD | 51 | 0 | | | | | | |

| FF' | | | | | |
|---|---|---|---|---|---|
| | p | | | p+1 | |
| i | FF' | AD | DA | #F | FF' |
| 44 | 55 | 1 | 0 | (70) | |
| 44 | (31) mF=5 | 1 | 0 | 70 | |
| 45 | 35 | 1 | 1 | 6 | 35 |
| | | | | 7 | |
| 46 | 53 | 0 | 0 | 22 | 53 |
| | | | | 23 | |
| 47 | 34 | 1 | 1 | 60 | 34 |
| | | | | 61 | |
| 47 | 34 | 1 | 0 | 18 | 45 |
| | | | | 19 | |
| 48 | 45 | 0 | 0 | 18 | 45 |
| | | | | 19 | |
| 48 | 45 | 0 | 1 | 44 | 45 |
| | | | | 45 | |
| 49 | 45 | 1 | 1 | 46 | 34 |
| | | | | 47 | |
| 50 | 34 | 0 | 0 | 16 | 53 |
| | | | | 17 | |
| 51 | 53 | 0 | 0 | 60 | |
| | | | | 61 | |

| GG' | | | | | |
|---|---|---|---|---|---|
| | p | | | p+1 | |
| i | GG' | AD | DA | #G | GG' |
| 44 | 34 | 1 | 0 | 18 | 54 |
| | | | | 19 | |
| 44 | 34 | 1 | 0 | 18 | 45 |
| | | | | 19 | |
| 45 | 54 | 1 | 1 | 66 | 33 |
| | | | | 67 | |
| 46 | 45 | 0 | 1 | 44 | |
| | | | | 45 | |
| 47 | 33 | 1 | 0 | (14) | 53 |
| | | | | (14) | |
| 47 | (30) mG=9 | 1 | 0 | 2 | |
| | | | | 3 | |
| 48 | 53 | 0 | 0 | (60) | 55 |
| | | | | (60) | |
| 48 | (51) mG=10 | 0 | 1 | 52 | 35 |
| | | | | 53 | |
| 49 | 55 | 1 | 1 | 70 | 53 |
| | | | | 71 | |
| 50 | 35 | 0 | 0 | 20 | |
| | | | | 21 | |
| 51 | 53 | 0 | 0 | (60) | |
| | | | | (60) | |

©2014, 2015 Erich Schmitt (17 U.S.C. 401)

©2014, 2015 Erich Schmitt (17 U.S.C. 401)

| i | AD | s/k | DA | m | DA |
|---|----|-----|----|----|----|
| 76 | 1 |  |  | 23 | 0 |
| 77 | 1 | 32 k | 1 |  |  |

| | | FF' | | | |
|---|---|---|---|---|---|
| | | p | | p+1 | |
| i | FF' | AD | DA | #F | FF' |
| 76 | 45 | 1 | 0 | 46 / 47 | 35 |
| 77 | 35 | 1 | 1 | 22 / 23 | 54 |

| | | GG' | | | |
|---|---|---|---|---|---|
| | | p | | p+1 | |
| i | GG' | AD | DA | #G | GG' |
| 76 | 55 | 1 | 0 | 70 / 71 | 54 |
| 77 | 54 | 1 | 1 | 66 / 67 | 55 |

FIG. 16B-10      ©2014, 2015 Erich Schmitt (17 U.S.C. 401)

F equivalent classes (transformation to 4 bits)

| decimal | # F | | hexa decimal | binary code #F end 3,4,5 | F DA elements | | |
|---|---|---|---|---|---|---|---|
| | | | | | 3 | 4 | 5 |
| 0 | #12 | #42 | → 0 | 0000 | 43 | 33 | 54 |
| 1 | #13 | #43 | → 1 | 0001 | 43 | 43 | 33 |
| 2 | #14 | #60 | → 2 | 0010 | 45 | 55 | 34 |
| 3 | #15 | #61 | → 3 | 0011 | 45 | 45 | 55 |
| 4 | #16 | #22 | → 4 | 0100 | 33 | 54 | 53 |
| 5 | #17 | #23 | → 5 | 0101 | 33 | 33 | 54 |
| 6 | #18 | #44 | → 6 | 0110 | 54 | 53 | 45 |
| 7 | #19 | #45 | → 7 | 0111 | 54 | 54 | 53 |
| 8 | #20 | #62 | → 8 | 1000 | 53 | 45 | 55 |
| 9 | #21 | #63 | → 9 | 1001 | 53 | 53 | 45 |
| 10 | #38 | #40 | → A | 1010 | 34 | 35 | 43 |
| 11 | #39 | #41 | → B | 1011 | 34 | 34 | 35 |
| 12 | #46 | #68 | → C | 1100 | 55 | 34 | 35 |
| 13 | #47 | #69 | → D | 1101 | 55 | 55 | 34 |
| 14 | #64 | #66 | → E | 1110 | 35 | 43 | 33 |
| 15 | #65 | #67 | → F | 1111 | 35 | 35 | 43 |

FIG. 17

G equivalent groups (transformation to 4 bits)

| decimal | # G | | DEC equiv. | binary code #G end 3,4,5 | G DA elements | | |
|---|---|---|---|---|---|---|---|
| | | | | | 3 | 4 | 5 |
| 0 | #12 | #70 | → 0 | 0000 | 53 | 53 | 54 |
| 1 | #13 | #71 | → 1 | 0001 | 53 | 54 | 35 |
| 2 | #16 | #38 | → 2 | 0010 | 45 | 45 | 55 |
| 3 | #17 | #39 | → 3 | 0011 | 45 | 55 | 43 |
| 4 | #18 | #20 | → 4 | 0100 | 34 | 34 | 53 |
| 5 | #19 | #21 | → 5 | 0101 | 34 | 53 | 54 |
| 6 | #22 | #40 | → 6 | 0110 | 54 | 54 | 35 |
| 7 | #23 | #41 | → 7 | 0111 | 54 | 35 | 34 |
| 8 | #36 | #42 | → 8 | 1000 | 35 | 35 | 34 |
| 9 | #37 | #43 | → 9 | 1001 | 35 | 34 | 53 |
| 10 | #44 | #62 | → A | 1010 | 43 | 43 | 33 |
| 11 | #45 | #63 | → B | 1011 | 43 | 33 | 45 |
| 12 | #46 | #68 | → C | 1100 | 55 | 55 | 43 |
| 13 | #47 | #69 | → D | 1101 | 55 | 43 | 33 |
| 14 | #64 | #66 | → E | 1110 | 33 | 33 | 45 |
| 15 | #65 | #67 | → F | 1111 | 33 | 45 | 55 |

FIG. 18

DEAB V    i=14, k=1, DA=0
32 bit sequence: FE= 64, GE=64, i end=56, k=32

```
       #F  3  4  5           #G  3  4  5
   FE  64  35 43 33      GE  64  33 33 45
   FOX 12  43 33 54      GOX 12  53 53 54
36 ENG     12 12 00   36 ENG     12 12 00

#F  3  4  5           #G  3  4  5
   FEC 65  35 35 43     GEC 65  33 45 55
   FOX 12  43 33 54     GOX 12  53 53 54
36 ENG     12 21 12  36 ENG     12 12 12
```

"0"-Part 2 x 00-elements, 10 x non-zero-elements

Minimal 00
Maximal non-zero
=> DA=0

```
       #F  3  4  5           #G  3  4  5
   FE  64  35 43 33      GE  64  33 33 45
   F1X 13  43 43 33      G1X 13  53 54 35
36 ENG     12 00 00   36 ENG     12 00 12

#F  3  4  5           #G  3  4  5
   FEC 65  35 35 43     GEC 65  33 45 55
   F1X 13  43 43 33     G1X 13  53 54 35
36 ENG     12 12 12  36 ENG     12 00 21
```

"1"-Part 4 x 00-elements, 8 x non-zero-elements

FIG. 20A   deabstraction example V, i=14, k=1 (normal)

DEAB V'   i=14, k=1, DA'=1
32 bit complement sequence: FE'=23, GE'=67, i end=77, k=32

```
          #F  3  4  5              #G  3  4  5
     FE'  23 33 33 54         GE'  67 33 45 55
→ FOX'    12 43 33 54     → GOX'  12 53 53 54
  36 ENG  21 00 00 36 ENG          12 12 12

#F  3  4  5              #G  3  4  5
     FEC' 22 33 54 53         GEC' 66 33 33 45
→ FOX'    12 43 33 54     → GOX'  12 53 53 54
  36 ENG  21 00 21 36 ENG          12 12 00

36 ENG                            36 ENG

"0"-Part 4 x 00-elemets, 8 x non-zero-elements
```

```
          #F  3  4  5              #G  3  4  5
     FE'  23 33 33 54         GE'  67 33 45 55
   → F1X' 13 43 43 33     → G1X'  13 53 54 35
     36 ENG 21 21 00 36 ENG        12 00 21

#F  3  4  5              #G  3  4  5
     FEC' 22 33 54 53         GEC' 66 33 33 45
   → F1X' 13 43 43 33     → G1X'  13 53 54 35
     36 ENG 21 21 21 36 ENG        00 00 12

"1"-Part 4 x 00-elements, 8 x non-zero-elements
```

Result: "0"-Part = "1"-Part
=> no decision possible
Go to V-Part

FIG. 20B

DEAB V i=22, k=7, DA=1
32 bit sequence: FE= 64, GE=64, i end=56, k=32

```
        #F  3  4  5              #G  3  4  5
     FE  64 35 43 33          GE  64 33 33 45
→ FOX  18 54 53 45        → GOX  62 43 43 33
  36 ENG  21 21 00  36 ENG     21 21 00

#F  3  4  5              #G  3  4  5
     FEC 65 35 35 43         GEC 65 33 45 55
→ FOX  18 54 53 45        → GOX  62 43 43 33
  36 ENG  21 00 12  36 ENG     21 21 12

"0"-Part 3 x 00-elements, 9 x non-zero-elements
```

```
        #F  3  4  5              #G  3  4  5
     FE  64 35 43 33          GE  64 33 33 45
  → F1X  19 54 54 53       → G1X  63 43 33 45
  36 ENG  21 12 12  36 ENG     21 00 00

#F  3  4  5              #G  3  4  5
     FEC 65 35 35 43         GEC 65 33 45 55
  → F1X  19 54 54 53       → G1X  63 43 33 45
  36 ENG  21 21 21  36 ENG     21 00 12

"1"-Part 3 x 00-elements, 9 x non-zero-elements
```

Result: "0"-Part = "1"-Part
=> no decision possible
Go to V'-Part

FIG. 20C    deabstraction example V, i=22, k=7 (normal)

DEAB V' i=23, k=7, DA'=0
32 bit complement sequence: FE'= 23, GE'=67, i end=77, k=32

```
        #F  3  4  5              #G  3  4  5
    FE' 23 33 33 54          GE' 67 33 45 55
    FOX' 44 54 53 45         GOX' 68 55 55 43
36 ENG  00 12 00 36 ENG      21 21 00

#F  3  4  5              #G  3  4  5
    FEC' 22 33 54 53         GEC' 66 33 33 45
    FOX' 44 54 53 45         GOX' 68 55 55 43
36 ENG  00 12 21 36 ENG      21 21 21
```

"0"-Part 4 x 00-elements, 8 x non-zero-elements

```
        #F  3  4  5              #G  3  4  5
    FE' 23 33 33 54          GE' 67 33 45 55
    F1X' 45 54 54 53         G1X' 69 55 43 33
36 ENG  00 00 12 36 ENG      21 21 12

#F  3  4  5              #G  3  4  5
    FEC' 22 33 54 53         GEC' 66 33 33 45
    F1X' 45 54 54 53         G1X' 69 55 43 33
36 ENG  00 00 00 36 ENG      12 21 00
```

"1"-Part 6 x 00-elements, 6 x non-zero-elements

Minimal 00
Maximal non-zero
=> DA' = 0
=> DA = 1

FIG. 20D   deabstraction example V', i=23, k=7 (complement)

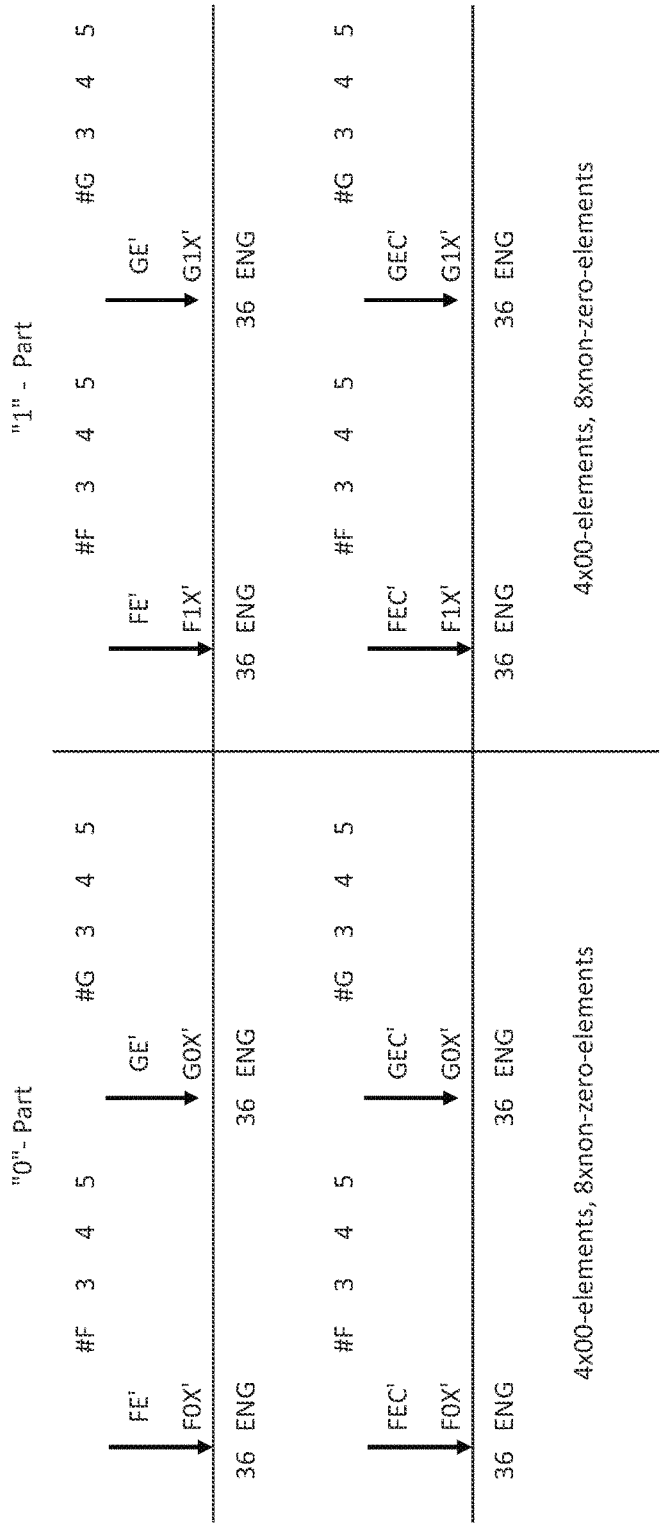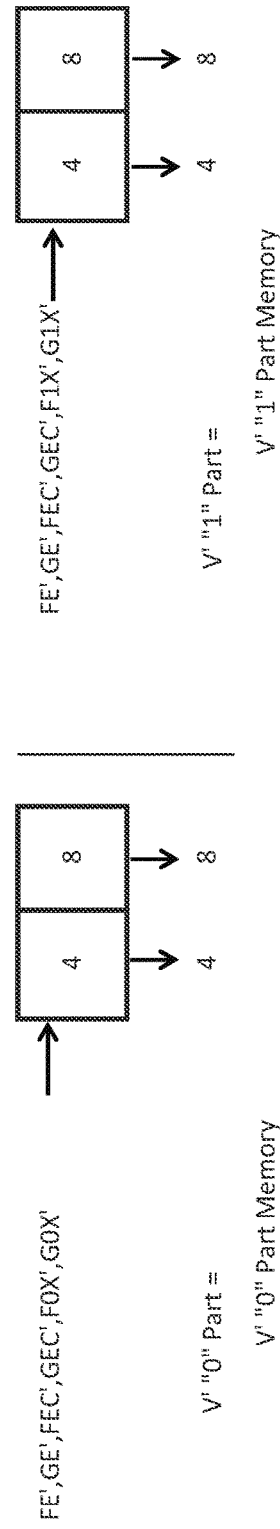
FIG. 22

| #F | natural Number | => dec equiv | #F end binary code | #F | natural Number | => dec equiv | binary code |
|---|---|---|---|---|---|---|---|
| 0 | 0 | 2 | 000010 | 38 | 32 | 9 | 001001 |
| 1 | 1 | 53 | 110101 | 39 | 33 | 28 | 011100 |
| 2 | 2 | 61 | 111101 | 40 | 34 | 49 | 110001 |
| 3 | 3 | 42 | 101010 | 41 | 35 | 24 | 011000 |
| 4 | 4 | 62 | 111110 | 42 | 36 | 25 | 011001 |
| 5 | 5 | 60 | 111100 | 43 | 37 | 20 | 010100 |
| 6 | 6 | 18 | 010010 | 44 | 38 | 6 | 000110 |
| 7 | 7 | 41 | 101001 | 45 | 39 | 3 | 000011 |
| 8 | 8 | 46 | 101110 | 46 | 40 | 40 | 101000 |
| 9 | 9 | 47 | 101111 | 47 | 41 | 7 | 000111 |
| 10 | 10 | 38 | 100110 | 48 | 42 | 26 | 011010 |
| 11 | 11 | 37 | 100101 | 49 | 43 | 23 | 010111 |
| 12 | 12 | 5 | 000101 | 50 | 44 | 1 | 000001 |
| 13 | 13 | 54 | 110110 | 51 | 45 | 4 | 000100 |
| 14 | 14 | 55 | 110111 | 52 | 46 | 31 | 011111 |
| 15 | 15 | 11 | 001011 | 53 | 47 | 59 | 111011 |
| 16 | 16 | 14 | 001110 | 54 | 48 | 13 | 001101 |
| 17 | 17 | 35 | 100011 | 55 | 49 | 36 | 100100 |
| 18 | 18 | 34 | 100010 | 56 | 50 | 15 | 001111 |
| 19 | 19 | 19 | 010011 | 57 | 51 | 8 | 001000 |
| 20 | 20 | 17 | 010001 | 58 | 52 | 43 | 101011 |
| 21 | 21 | 45 | 101101 | 59 | 53 | 50 | 110010 |
| 22 | 22 | 51 | 110011 | 60 | 54 | 39 | 100111 |
| 23 | 23 | 57 | 111001 | 61 | 55 | 58 | 111010 |
| 24 | 24 | 44 | 101100 | 62 | 56 | 30 | 011110 |
| 25 | 25 | 16 | 010000 | 63 | 57 | 22 | 010110 |
|  |  |  |  | 64 | 58 | 48 | 110000 |
| 28 | 26 | 52 | 101110 | 65 | 59 | 56 | 111000 |
| 29 | 27 | 33 | 100001 | 66 | 60 | 27 | 011011 |
| 30 | 28 | 29 | 011101 | 67 | 61 | 12 | 001100 |
| 31 | 29 | 32 | 100000 | 68 | 62 | 21 | 010101 |
|  |  |  |  | 69 | 63 | 10 | 001010 |
| 34 | 30 | 0 | 000000 |  |  |  |  |
| 35 | 31 | 63 | 111111 |  |  |  |  |

FIG. 33

| #G | natural Number | => dec equiv | #G end binary code | #G | natural Number | => dec equiv | #G end binary code |
|---|---|---|---|---|---|---|---|
| 0 | 0 | 46 | 101110 | 36 | 32 | 23 | 010111 |
| 1 | 1 | 47 | 101111 | 37 | 33 | 24 | 011000 |
| 2 | 2 | 39 | 100111 | - | | | |
| 3 | 3 | 6 | 000110 | 40 | 34 | 16 | 010000 |
| 4 | 4 | 48 | 110000 | 41 | 35 | 56 | 111000 |
| 5 | 5 | 44 | 101100 | 42 | 36 | 45 | 101101 |
| 6 | 6 | 14 | 001110 | 43 | 37 | 7 | 000111 |
| 7 | 7 | 60 | 111100 | 44 | 38 | 42 | 101010 |
| 8 | 8 | 40 | 101000 | 45 | 39 | 5 | 000101 |
| 9 | 9 | 30 | 011110 | 46 | 40 | 9 | 001001 |
| 10 | 10 | 38 | 100110 | 47 | 41 | 4 | 000100 |
| 11 | 11 | 13 | 001101 | 48 | 42 | 41 | 101001 |
| 12 | 12 | 50 | 110010 | 49 | 43 | 49 | 110001 |
| 13 | 13 | 20 | 010100 | 50 | 44 | 54 | 110110 |
| 14 | 14 | 37 | 100101 | 51 | 45 | 12 | 001100 |
| 15 | 15 | 26 | 011010 | 52 | 46 | 32 | 100000 |
| 16 | 16 | 36 | 100100 | 53 | 47 | 61 | 111101 |
| 17 | 17 | 59 | 111011 | 54 | 48 | 25 | 011001 |
| 18 | 18 | 31 | 011111 | 55 | 49 | 2 | 000010 |
| 19 | 19 | 11 | 001011 | 56 | 50 | 43 | 101011 |
| 20 | 20 | 22 | 010110 | 57 | 51 | 10 | 001010 |
| 21 | 21 | 28 | 011100 | 58 | 52 | 29 | 011101 |
| 22 | 22 | 27 | 011011 | 59 | 53 | 19 | 010011 |
| 23 | 23 | 1 | 000001 | 60 | 54 | 33 | 100001 |
| | | | | 61 | 55 | 52 | 110100 |
| 26 | 24 | 3 | 000011 | 62 | 56 | 53 | 110101 |
| 27 | 25 | 21 | 010101 | 63 | 57 | 8 | 001000 |
| 28 | 26 | 63 | 111111 | 64 | 58 | 15 | 001111 |
| 29 | 27 | 55 | 110111 | 65 | 59 | 51 | 110011 |
| 30 | 28 | 0 | 000000 | 66 | 60 | 18 | 010010 |
| 31 | 29 | 58 | 111010 | 67 | 61 | 57 | 111001 |
| 32 | 30 | 35 | 100011 | - | | | |
| 33 | 31 | 34 | 100010 | 70 | 62 | 62 | 111110 |
| - | | | | 71 | 63 | 17 | 010001 |

FIG. 34

| #F | | DEC equiv | binary code |
| --- | --- | --- | --- |
| 3 | 4 | | |
| 43 | 33 | 0 | 0000 |
| 43 | 43 | 1 | 0001 |
| 45 | 55 | 2 | 0010 |
| 45 | 46 | 3 | 0011 |
| 33 | 54 | 4 | 0100 |
| 33 | 33 | 5 | 0101 |
| 54 | 53 | 6 | 0110 |
| 54 | 54 | 7 | 0111 |
| 53 | 46 | 8 | 1000 |
| 53 | 53 | 9 | 1001 |
| 34 | 35 | 10 | 1010 |
| 34 | 34 | 11 | 1011 |
| 56 | 34 | 12 | 1100 |
| 56 | 55 | 13 | 1101 |
| 35 | 43 | 14 | 1110 |
| 36 | 36 | 15 | 1111 |

FIG. 37A

| #G | | DEC equiv | binary code |
| --- | --- | --- | --- |
| 3 | 4 | | |
| 45 | 45 | 0 | 0000 |
| 45 | 55 | 1 | 0001 |
| 43 | 43 | 2 | 0010 |
| 43 | 33 | 3 | 0011 |
| 54 | 54 | 4 | 0100 |
| 54 | 53 | 5 | 0101 |
| 33 | 33 | 6 | 0110 |
| 33 | 54 | 7 | 0111 |
| 53 | 53 | 8 | 1000 |
| 53 | 46 | 9 | 1001 |
| 34 | 34 | 10 | 1010 |
| 34 | 36 | 11 | 1011 |
| 56 | 56 | 12 | 1100 |
| 56 | 34 | 13 | 1101 |
| 35 | 35 | 14 | 1110 |
| 35 | 43 | 15 | 1111 |

FIG. 37B

UNIVERSAL ABSTRACTION AND DE-ABSTRACTION OF A DIGITAL DATA STREAM

CLAIM OF PRIORITY

This application claims priority under 35 U.S.C. §119(e) to provisional U.S. Patent Application 62/061,246, filed on Oct. 8, 2014, entitled: "Universal Abstraction and De-Abstraction of a Digital Data Stream", the entire contents of which are hereby incorporated by reference and to provisional U.S. Patent Application 61/941,027, filed on Feb. 18, 2014, entitled: "Universal Abstraction and De-Abstraction of a Digital Data Stream", the entire contents of which are hereby incorporated by reference.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

This disclosure relates to computer-based computational techniques involving random and non-random data sequences for use with various applications.

For example, known techniques for data compression are redundancy-based data compression procedures. Such techniques include both lossy and lossless data compression techniques. Typically, lossless data compression allows for a 1:1 compression rate of random data bit strings, and otherwise a compression ratio that is dependent on the statistical distribution of the zeros (0) and ones (1) in the bit strings for nonrandom data bit strings. That is, commonly known data compression techniques are dependent on the level of redundancy of the data bits in the bit string. Typical, reported data compression rates for non-randome sequences are 2:1 and less.

SUMMARY

Described is a process of abstraction-de-abstraction of digital information from a data stream. Abstraction reduces a bit stream of a finite, yet arbitrary length or size without the loss of any data. De-abstraction recovers from an abstracted bit stream the finite original data bit string without the loss of any data. Abstraction/de-abstraction is independent of the statistical distribution and length of the original data bit string.

According to an aspect, a device implemented method of reducing the number of bits in an input string of bits to reduce the size of the string includes providing to a device that includes an abstraction engine an input string having a finite length, producing by the device from the input string the one's compliment of the input string, calculating by the abstraction engine in the device from the input string and the one's complement of the input string two pairs of abstraction codes from the initialized state of the abstraction engine, and returning by the device the two pairs of two abstraction codes as a compressed representation of the input string.

Aspects also include computer program products that include instructions and tables tangibly stored on hardware storage devices that are readable by a computer system, as well as, computer systems and computer devices that incorporate a processor and memory and which are programmed to perform abstraction processing and/or specialized circuitry configured to perform abstraction processing.

Set forth are some embodiments within the scope of one or more of the above aspects.

Initializing the abstraction engine by applying a set of system values to the abstraction engine where the system values represent known system values to provide beginning conditions for abstracting the input string. Calculating the set of abstraction codes includes iteratively determining a set of functions based on bits in a fundamental module number of bits and the one's complement of the fundamental module number of bits, and transforming the set of functions from one of the iterations into the abstraction codes. The set of the abstraction codes and the length L of the input bit string is the reduced size representation of the input bit string. The set of codes are bit codes and the set of bit codes being two codes with each code being selected from the group consisting of four bits in length, five bits in length and six bits in length. Initialing defines beginning conditions as a fixed row for any application. The set of system values applied for initializing are six values that a prepended to the input string and processed through the abstraction engine prior to processing of the input string.

A table is included in an application program that executes on a processor to perform the method on the device, the table including values of functions for system initializing values, a present set of inputs, and values of a next set of inputs. The aspects further include iteratively choosing the functions by evaluating each bit of the input bit string according to a set of present inputs and prior state to provide the functions and the next set of inputs.

Calculating the abstraction codes further includes iteratively evaluating a DA bit according to a bit position of the input bit string, by, testing for a limit condition for the bit position. when a limit condition is not encountered, using the data bit from the input bit string according to the bit position, and when a limit condition is encountered, substituting for the data bit from the input bit string according to the bit position, a limit bit from a limit bit table according to an index value of the limit string when a limit condition is encounter, substituting for next function of the set of functions, a defined set of functions.

A limit condition is a limit detect condition and occurs when for an input bit, and a present input of the AD bit or the DA bit, the computed functions have the same values. For the limit detect condition a substitution of a function is made for one or both of the computed functions according to whether one of or both of the set of functions encounter the limit detect condition. A limit condition is a limit transition condition and occurs when for an input bit and a present input of the AD bit or the DA bit, the computed next states of the functions have the same values. For the limit transition condition a substitution of the computed next states is made for one or both of the computed next states according to whether one of or both of the set of functions encounter the limit transition condition. Transforming the final set of functions into abstraction codes. The length L of the input bit string provides the abstracted representation of the input bit string.

According to an additional aspect, a device includes one or more processor device coupled to memory, the processor devices providing an abstraction engine that is configured to receive an input string having a finite length, produce from the input string the one's compliment of the input string, initializing the abstraction engine by applying a set of system values to the abstraction engine where the system values represent known system values to provide beginning conditions for abstracting the input string, calculating from the input string and the one's complement of the input string two pairs of two abstraction codes using the initialized state of the abstraction engine, and returning by the device the set of abstraction codes as a compressed representation of the input string.

Abstraction/de-abstraction can be applied to any finite sequence of binary data bits. A data bit string of finite arbitrary length L can be reduced via the abstraction process to a pair of codes that comprise 8 to twelve bits. In some embodiments abstraction provides two pairs of codes that each comprise 8 to twelve bits. With either embodiment the abstraction ratio for any data bit string is very high. The reduction ratios are generally not possible or conceivable with presently known procedures. The advantages of the abstraction-de-abstraction processes are many. Abstraction provides significant improvements and changes for many diverse applications. A sampling of areas of application of these processes include binary data processing and data storage, large sequential memories (electronic implementation of hard disks and large memory backup systems), acoustic and video bandwidth reduction in data transmissions, cryptography (extreme security), and all similar related applications.

The abstraction-de-abstraction process is distinct from redundancy-based 'data compression procedures. While prior art lossless data compression techniques typically allow a 1:1 compression rate of random data bit strings and for nonrandom data bit strings a compression ratio is dependent of the statistical distribution of the zeros (0) and ones (1) located in the bit strings. This is because commonly known data compression techniques are dependent on the level of redundancy of the data bit strings. The most commonly rates are believed to be 2:1 and less.

Aspects also involve an initialization process that transitions engines to known system states to provide known previous inputs used for abstraction. In some embodiments, abstraction engines and de-abstraction engines are implemented together whereas in others the abstraction engine can be implemented alone.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a table that depicts an arbitrary data string of length L and data bit index.
FIG. 5A is a table that depicts a limit data string.
FIG. 5B is a table that depicts an address string.
FIG. 6 is a table that depicts a six-group.
FIG. 7 is a table that depicts a factor structure for abstraction.
FIG. 8 is a diagram that shows the relationship of FIGS. 8A-8F.

FIGS. 8A-8F are tables that depict a factor structure for de-abstraction.
FIGS. 9-1 to 9-4 are diagrams that depict exemplary ones of transition graphs.
FIG. 10 is a diagram that shows the relationship of FIGS. 10A-10D.
FIGS. 10A-10D are tables that depict state transitions and output functions.
FIGS. 11A and 11B depict permissible final #F and #G functions with transformations to minimum binary code derived from FIGS. 10A-10D.
FIGS. 13A and 13B depict user example sequences 32 bits normal (V) and one's complement (V').
FIG. 14A is a table that depicts a random sequence m/DA
FIG. 14B is a table that depicts a random sequence mF.
FIG. 14C is a table that depicts a random sequence mG.
FIG. 14D is a table that depicts a random AD sequence
FIGS. 16A-1 to 16A-6 depict an Abstraction example for a 32 bit string (normal).
FIGS. 16B-1 to 16B-10 depict an Abstraction example for a 32 bit string (complement).
FIG. 17 is a table that depicts #F equivalent classes and conversions from 5 bit codes to 4 bit codes.
FIG. 18 is a table that depicts #G equivalent classes and conversions from 5 bit codes to 4 bit codes.
FIG. 20A is a table that depicts a portion of de-abstraction for V, i=14, k=1 (normal)
FIG. 20B is a table that depicts a portion of de-abstraction for V', i=14, k=1 (complement)
FIG. 20C is a table that depicts a portion of de-abstraction for V, i=22, k=7 (normal)
FIG. 20D is a table that depicts a portion of de-abstraction for V', i=23, k=7 (complement)
FIG. 22 is a table that depicts de-abstraction processing of memories for V', i=14, k=1.
FIGS. 33 and 34 are tables that depict an exemplary transformation permutation.

FIGS. 37A-37B depict tables for #F and #G functions used for providing a hashing function.

DETAILED DESCRIPTION

Figure 1:
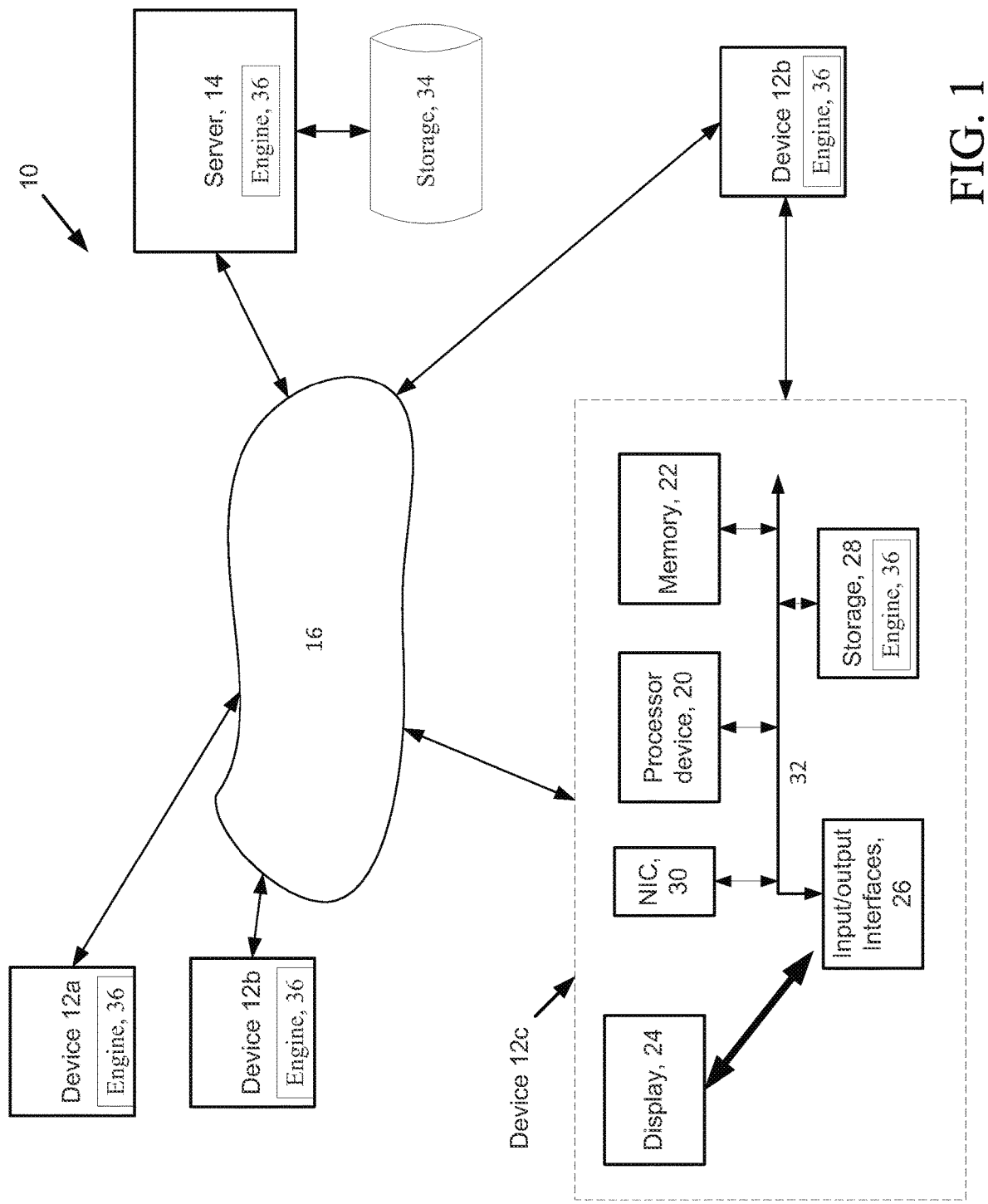
FIG. 1 depicts a system for abstraction/de-abstraction.

Referring now to FIG. 1, a system 10 is shown comprised of plural, diverse computing devices. The devices 12a-12c of the system 10 typically include (as shown for device 12c) a processor 20, memory 22, and storage 28, with user interfaces 26 for devices (e.g., display 24, mouse, etc.) and network interface 30 all coupled via one or more buses 32 with an abstraction/de-abstraction engine 36, shown stored in storage 28.

The abstraction/de-abstraction engine 36 will be discussed below. However, the engine 36 can be used in and/or with various computing devices, such as a server 14 or hand-held devices such as 12a or consumer and/or special purpose devices 12b, as shown. The abstraction/de-abstraction engine 36 can be implemented in software, firmware, hard wired logic or other forms such as a co-processor or as a separate card or combinations thereof. The system 10 is illustrated to show examples of how bit streams can be received and/or produced by one device that would provide an abstracted representation of the bit stream, and send the representation via a network to another one of the devices for de-abstraction and recovery of the original input bit string. Additionally, other mechanisms can be used. For example, a single engine can receive input bit strings and abstract the stream and later de-abstract the representation to produce the original input stream.

Figure 2:
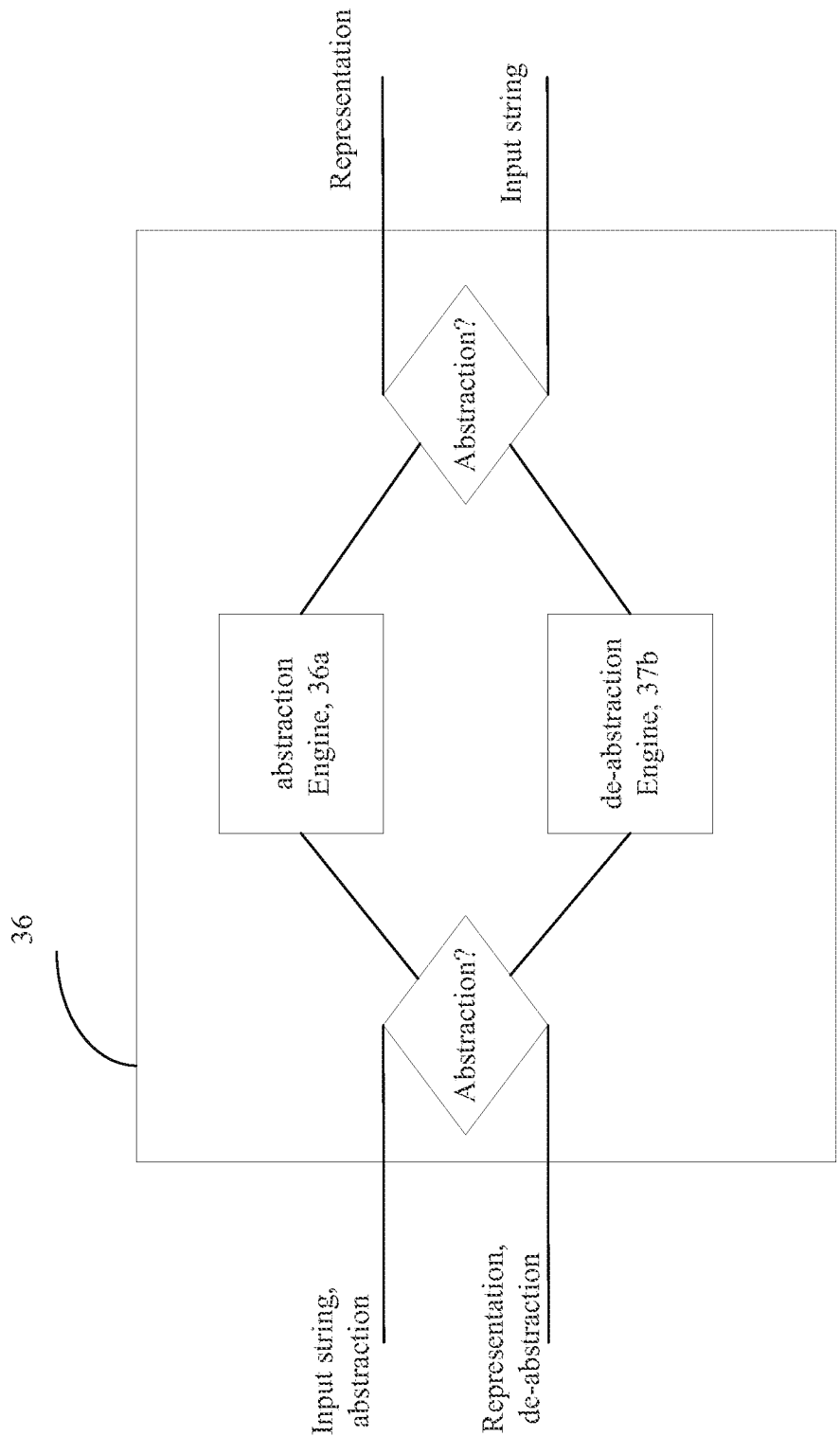
FIG. 2 is block diagram that depicts an abstraction/de-abstraction engine.

Referring now to FIG. 2, the system 10 has one or more of the devices including an abstraction/de-abstraction engine 36. The abstraction/de-abstraction engine 36 includes an abstraction engine 37a and a de-abstraction engine 37b that are implemented in software, firmware, hard wired logic or other forms such as a co-processor or separate card or combinations thereof. The abstraction/de-abstraction engine 36 is illustrated as including two separate engines, the abstraction engine 37a and the de-abstraction engine 37b. In some embodiments, the abstraction engine 37a and the de-abstraction engine 37b share code or circuitry, as appropriate, whereas in other embodiments, the abstraction engine 37a and the de-abstraction engine 37b are implemented in a combination as a dual purpose engine. In still other embodiments, the abstraction engine 37a and the de-abstraction engine 37b are implemented separately. Therefore, the reference number 36 can refer to any of these specific implementations or others as will be apparent from the context.

Figure 15:
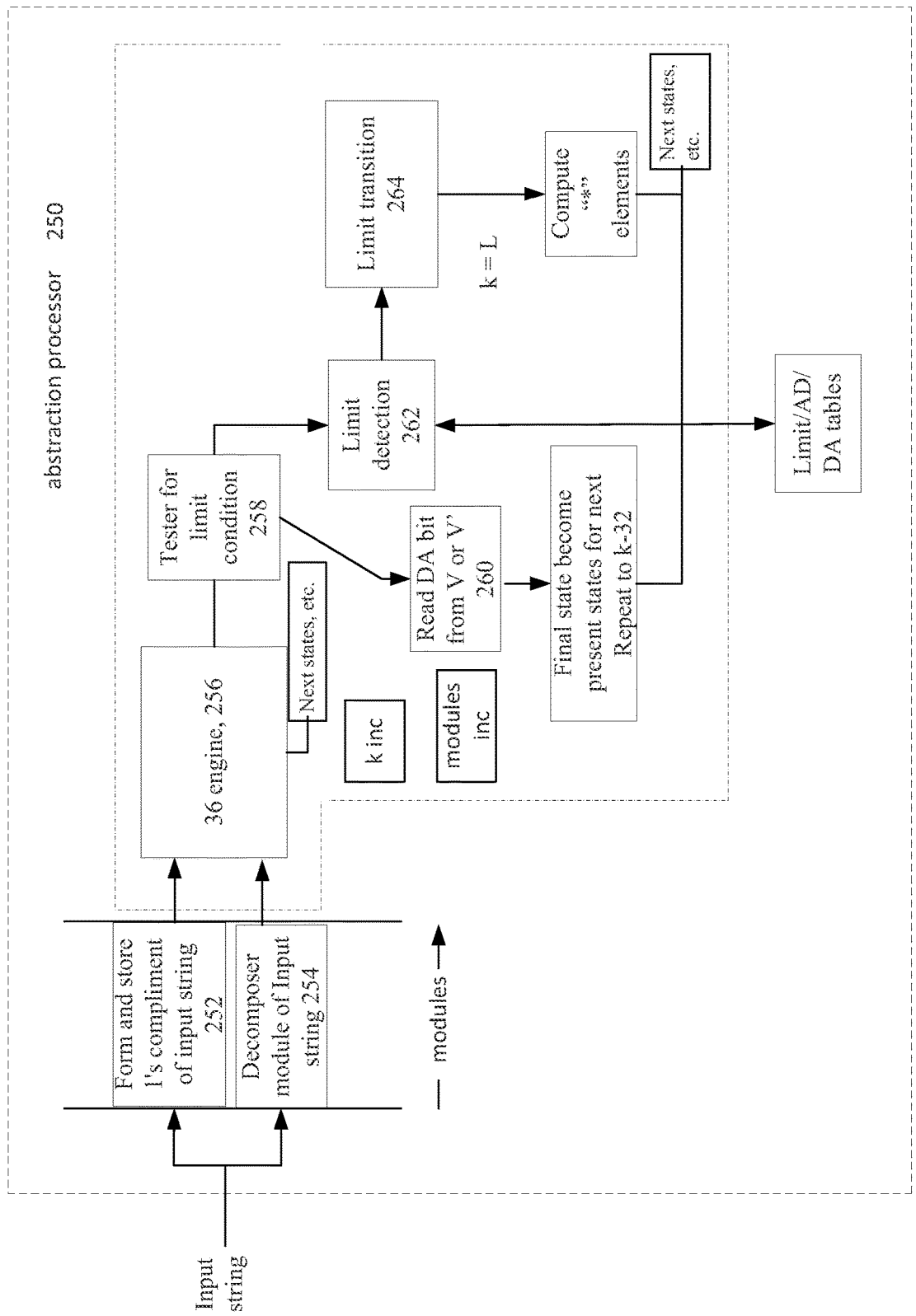
FIG. 15 depicts a universal abstraction engine.

In some implementations, the abstraction/de-abstraction engines 36a, 37b will include logic and a table. The table is of a type described in FIG. 10, an example implementation of which for universal abstraction is depicted in FIGS. 16A-1 to 16A-6 and 16B-1 to 16B-10, as will be discussed below, a look-up table that can be used to find values of functions given a set of present inputs and also find a next set of inputs (present+1). The logic will be of a type described below to access the table and apply the algorithm to data inputs, etc. Another exemplary engine, for universal abstraction is shown in FIG. 15 and for universal de-abstraction is shown in FIG. 23A.

The abstraction/de-abstraction engine 36 when it receives an input bit string to be abstracted has that input bit string processed by the abstraction engine 37a and provides as an output a representation of the input bit string. The representation is two code elements (each element being, e.g., 4, 5 or 6 bits in length) and input bit string length. The code elements produced by abstraction are also generally referred to herein as "abstraction codes." The abstraction/de-abstraction engine 36 when it receives the two codes elements each element being, e.g., 4, 5 or 6 bits in length, and either receiving or determining or otherwise knowing the original input bit string length processes those inputs in the de-abstraction engine 37b to recover the original input bit string. The abstraction/de-abstraction engine 36 is configured for either abstraction or de-abstraction either based on an external input, such as a call or invocation, etc. of a routine to provide the requested process or by the particular use of the engine 36. For example, other ways are for the engine 36 to recognized abstraction or de-abstraction requests based on the input and so forth.

It is to be appreciated that in the description below abstraction and de-abstraction operate on or recover serial bit streams. Some applications work with bytes, words, long words, quad words etc. For those applications, the data in these formats if not in a serial format when received, are converted to a serial format to provide the input bit string, prior to abstraction, and the recovered input bit string can be converted back to the original format subsequent to de-abstraction. Conversion techniques to convert from parallel to serial formats and back are generally conventional and well-known. Alternatively, the abstraction and de-abstraction can be implemented in a parallel configuration as will be discussed below in conjunction with FIGS. 40-42, which shows examples of parallel configurations.

Figure 3A:
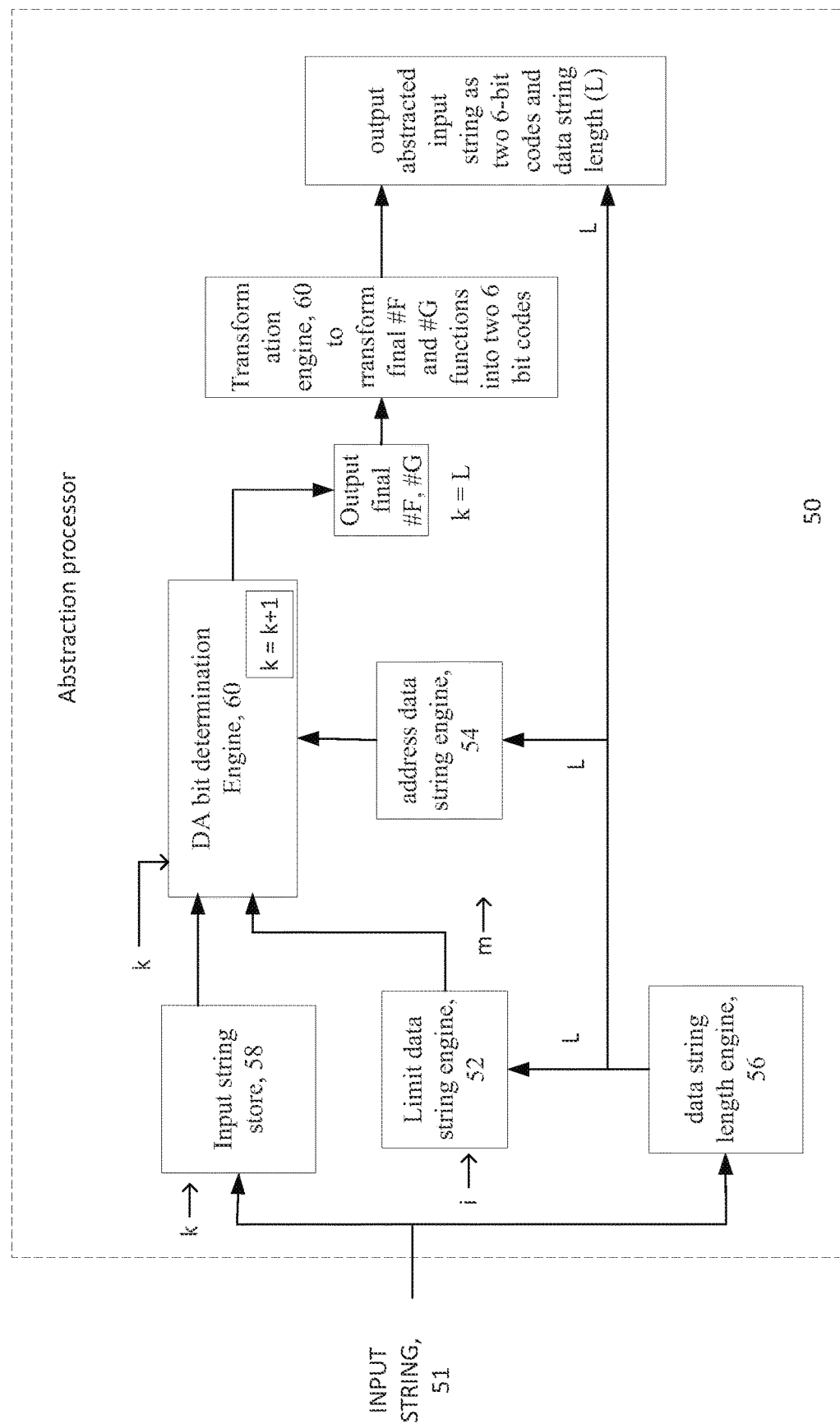
FIG. 3A is block diagram that depicts an abstraction engine.

Referring now to FIG. 3A an abstraction engine 50 is shown. (A univerals abstraction engine is described below in conjunction with FIG. 15 and a deabstractin engine and process is described in FIGS. 23, 23A and 24A and 24B.) The abstraction engines 50 or as in FIG. 15 is executed by processor 12 (FIG. 1) or can be implemented in hardcoded logic, firmware, etc., as appropriate. The abstraction engine 50 includes a limit bit string engine 52, an address bit string engine 54 and a data string length engine 56.

An input bit string 51 is fed to the abstraction engine 50 and typically is stored in a buffer that can reside in memory or computer storage, as in FIG. 1. The abstraction engine 50 forms in the limit bit string engine 52, the limit bit string as in FIG. 4 below from the input bit string length, and forms in the address bit string engine 54 the address bit string as in FIG. 5 using the input bit string length. The input bit string length L is either supplied as an input (not shown) along with the input bit string 51 or is determined by the data string length engine 56, as shown. In general, each different length of an input string will have a different length of limit and AD strings.

The abstraction engine 50 determines DA bits in a DA bit determination engine 60 by evaluation of each bit of the input bit string and detecting non-permissible states that require substitution of a limit data bit for a calculated DA bit. That is, the process starts at the initial bit of the input data string, k=1 and continues to k=L selecting the DA bit either from the input bit string or the limit bit string according to evaluated limit conditions, producing functions #F and #G (function types) as will be described below. Functions #F and #G are used in evaluation of the next bit in the input bit string. Final values (end values) of #F and #G are arrived at when the bit at k=L has been evaluated and these end values of #F and #G are used in producing the abstraction codes that represent the input string, as will be discussed below.

When the DA bit determination engine 60 has evaluated the produced functions #F, #G to k=L, the produced functions #F, #G at k=L are considered the final functions. That is, the entire input stream has been evaluated (i.e., evaluated from k=1 to k=L) and the abstraction engine 50 uses a transformation engine 64 to transform the final (or end) #F and #G functions into two bit codes. Exemplary bit code lengths include two six bit codes, two five bit codes and two four bit codes. These transformed codes along with the original input data length (L) are outputted, as a compact representation, i.e., compressed representation of the original input data string.

Figure 3B:
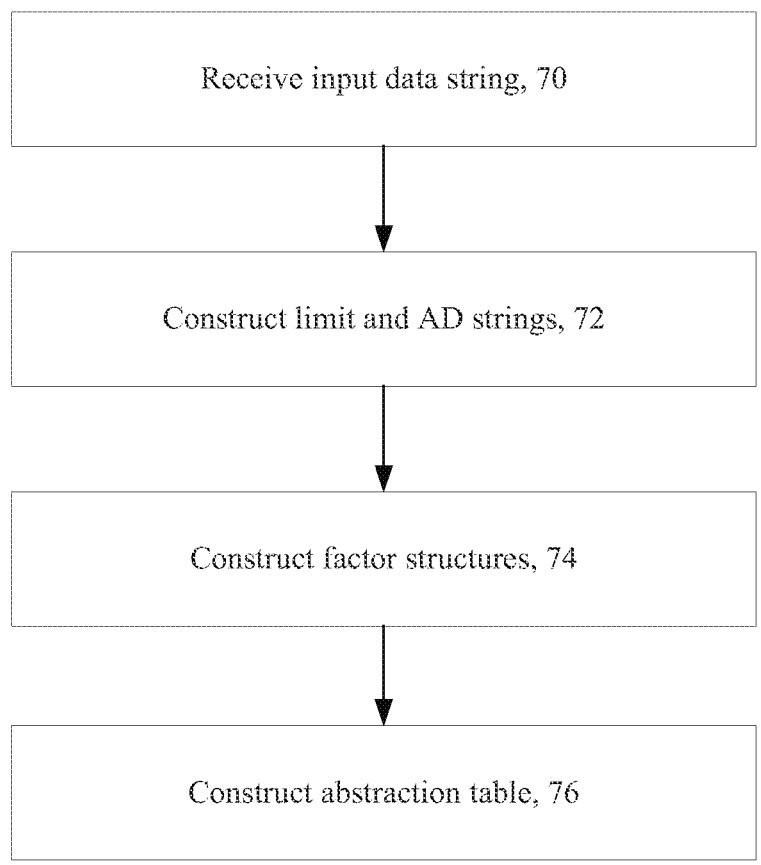
FIG. 3B is a flow chart that depicts abstraction process

Referring now to FIG. 3B, the system 10 receives 70 the input bit string and from the length of that data string constructs 72 the limit and AD strings. These strings can be stored in tables and used in de-abstraction. Factor structures used for abstraction are also constructed 74 by use of group theory, discussed below generally, and a new recursion concept in particular, here by use of a non-commutative six-group, as discussed below. From these constructs an abstraction table is produced 76. The abstraction table (FIG. 10) can be generated on the fly or supplied with an application (software or hardware) or can be loaded into devices through applications that will abstract input bit strings and de-abstract representations of the input bit strings to recover the original input bit strings.

Figures 1, 9:
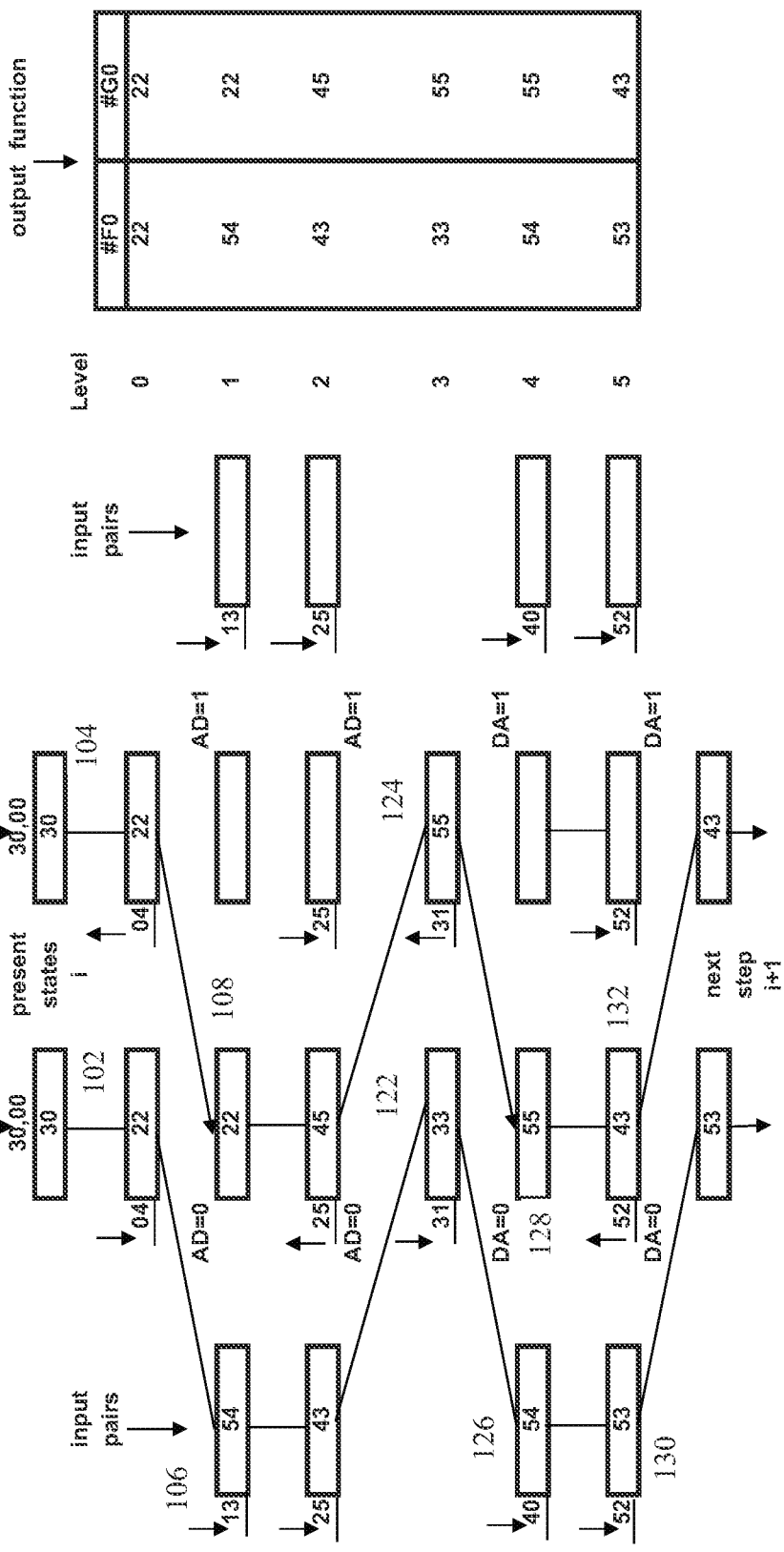
Figures 2, 9:
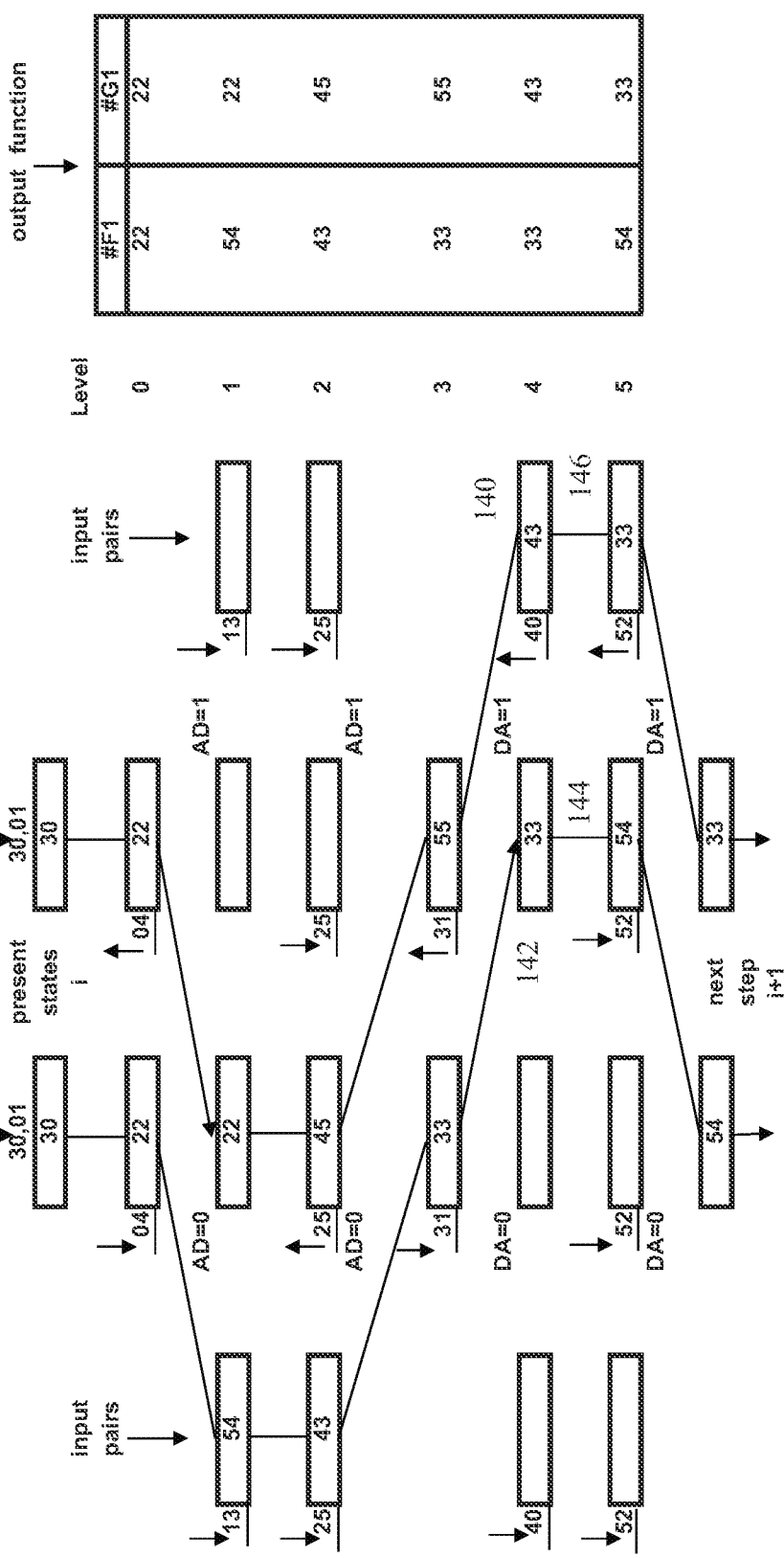
Figures 3, 9:
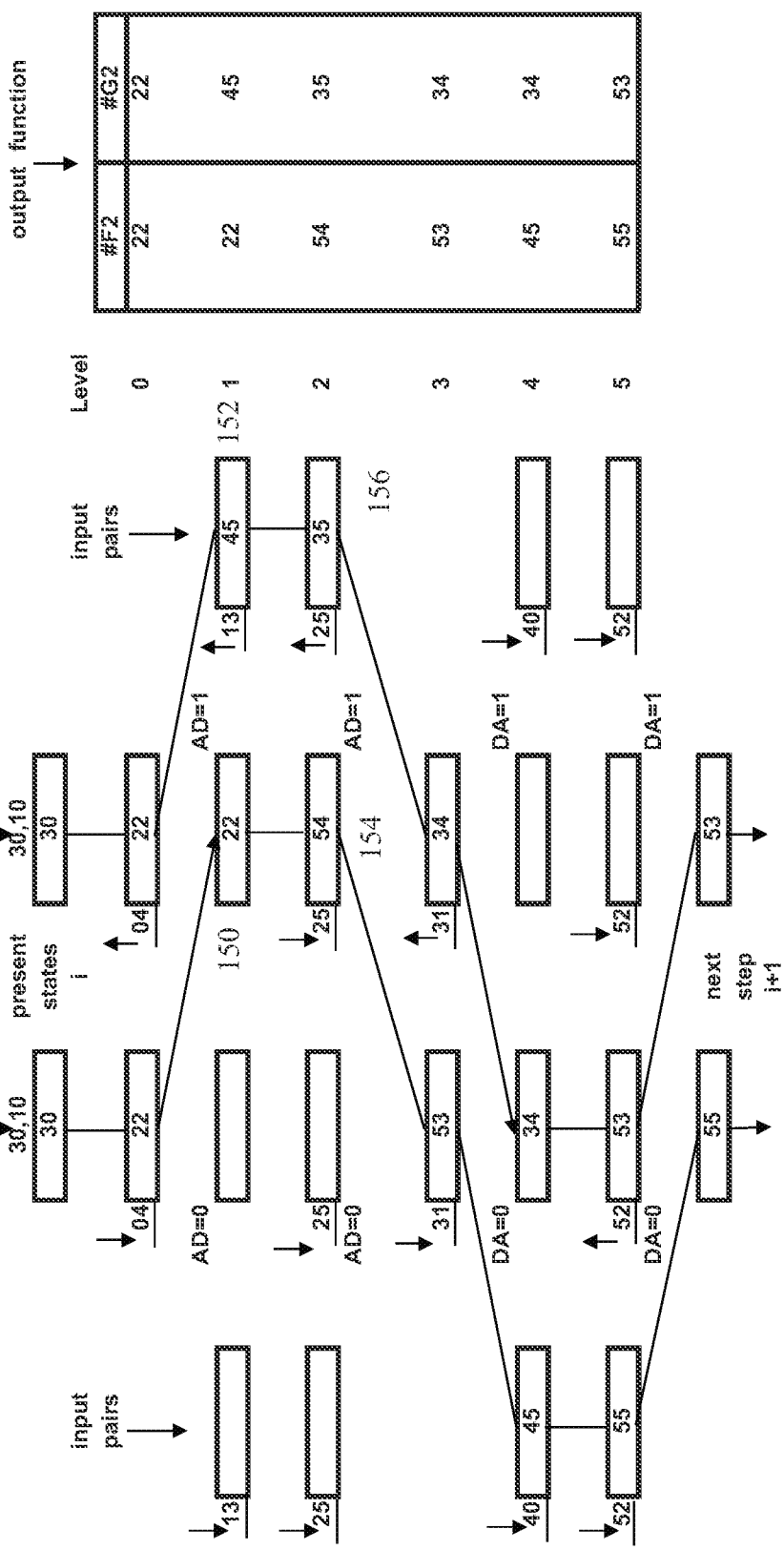
Figures 4, 9:
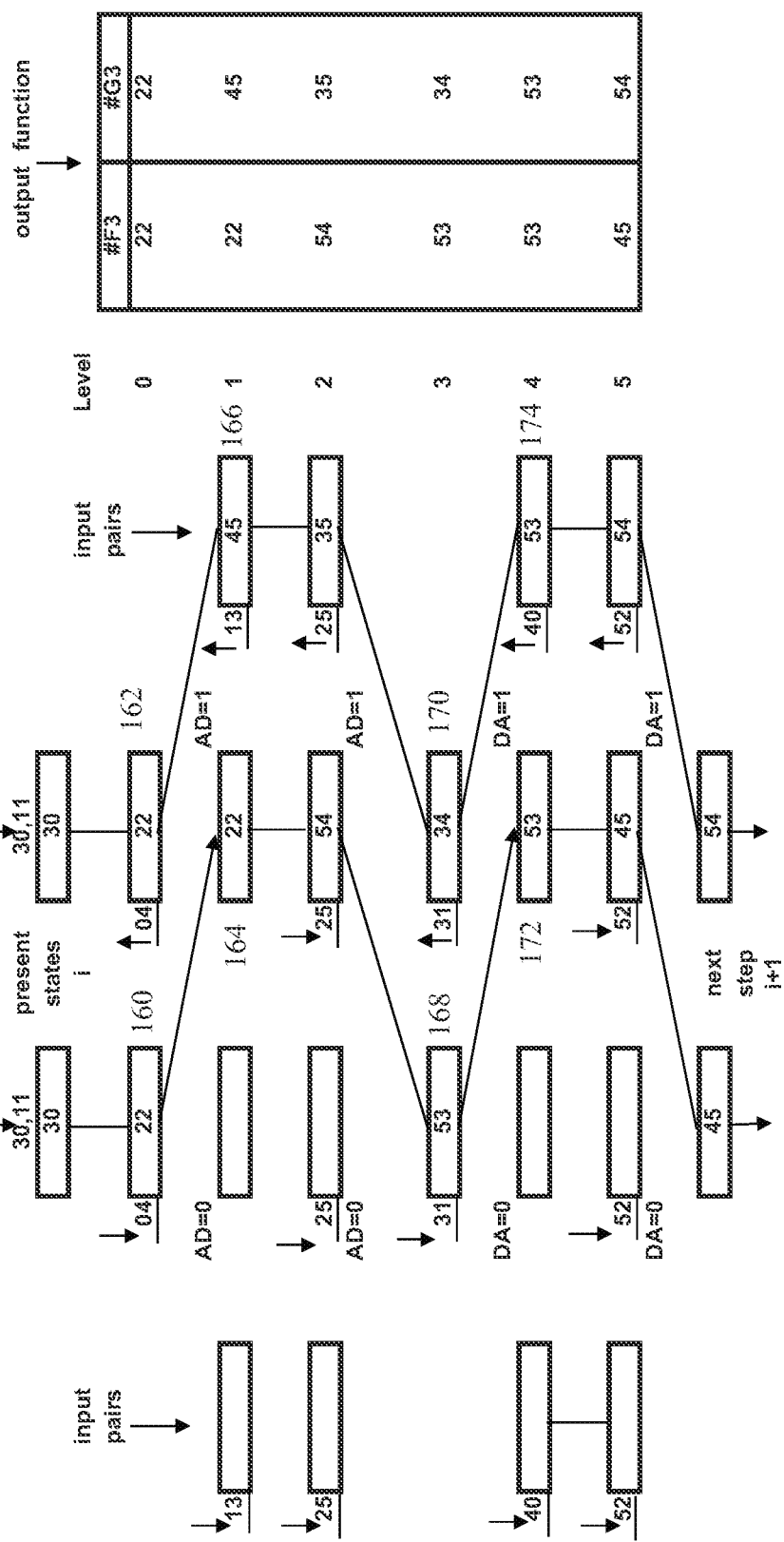

Referring now to FIG. 4, an example of an input bit string to be abstracted is shown. In the table of FIG. 4, the "Order DA string" columns represent the bit positions of "an index k" and the "DA Element" columns represent data values of the input data bit string. FIG. 4 shows an example of a bit string of length (L) where L=125. The sequence of the data bit string is ordered by the index k. The k order is a natural number that starts at 1 and continues up to L (125), where k defines the bit position in the input stream.

Referring now to FIG. 5A, a limit bit string table is shown. The limit bit string is determined by the engine 36 in accordance with the length (L) of the input data string. The engine 36 defines the limit data string, with a sequence or index (m) as shown, where m is the order of the 'limit' data bits. The limit bit string can be dynamically generated by the system and stored as a table in storage or memory. The limit bit string is provided as a random sequence of bits. These 'limit' data bits are inserted during the abstraction process, anytime a 'limit' condition occurs (see FIG. 10A and FIG. 10B). This insertion is used as a mechanism to overcome the limit condition, as discussed below. The length of the limit bit string ($L_{DA}$) is determined by the system according to $L_{DA}=q*L$, where nominally q=0.33. Thus, here $L_{DA}=(\frac{1}{3})*L$, where in the case of the exemplary input bit string of FIG. 2 is $L_{DA}=(\frac{1}{3})*125=41$.

Plural such sequences can be generated and used to make limit data strings of an arbitrary length. The engine 36 can accept a sequence of any length. These sequences can be generated by random bit number generators for example those types of generators available in libraries of compilers (e.g. the c++ compiler).

Rather than using a library, random permutations (32 or 64) for FIG. 11A #F and FIG. 11B for #G can be generated manually. One technique is by use of a commercially available bingo-machine. The machine can be loaded with 32 or 64 balls (numbers on balls from 0 to 31 or from 0 to 63). The machine is operated to spill out balls one at a time to get the first permutation, reloaded and repeated 31 times for the 32-permutation or 63 times for the 64-permutation. The numbers can be written and placed them in FIG. 11A #F to generate the random binary codes or 11B for #G to generate the random binary codes.

Referring now to FIG. 5B, an address bit string table (AD bit string) is shown. In the table of FIG. 5B, the index (i) defines the bit position in the AD bit string. The AD bit string is also determined by the system. The AD bit string is also generated by random bit number generators for example those types of generators available in libraries of compilers (e.g. the c++ compiler) or manually. The length of i is the sum of k and m. That is, the length of the address string is determined in accordance with the length (L) of the input bit string and the length ($L_{DA}$) of the limit bit string or the length of address string ($L_{AD}$)=(L)+($L_{DA}$). In the example, the sum of k and m is 125+41, which corresponds to i=166. This value is 1.33 times L. In the example in FIGS. 13A-13O, the "used i" is 157 and the "used m" is 32 or in other words there are reserve bits provided in "i" and "m."

The actual value used to determine the sizes of the limit string and address string can vary from 0.33 L and 1.33 L. For example, it may be possible to have the factor "q" be in a range that is about 0.25 and higher. However, a higher value of q would not necessary serve any practical purpose but to increase the sizes of the limit and address strings and increase the amount of unused portions of those strings.

Thus, through FIGS. 5A and 5B, the abstraction uses two strings of bits, here shown as tables, but which could be generated, as needed, the sequence of which is defined by indexes m and i as shown, where m is the order of the 'limit' data bits and i defines the bit position in the AD bit string. The sum of the two strings k and m provides an ordered index i for the abstraction process to be described below. The bit strings defined by indexes m and i are generated and stored as a table, or generated as needed by the engine 36, using random processes. The order elements "k" (of order 1 to L), "m" (of order 0 to M), and "i" (of order 0 to I) are all natural numbers (including "0"). These indexes represent the positions of the data bits element in the input, DA and AD strings respectively.

The process of "Abstraction" involves producing two function codes (or two pairs of function codes for universal abstraction discussed further below) from the input bit string (or the inputstring and its complement as discussed below for universal abstraction), which along with the known length of the input bit string identically describes/represents the input bit string (also referred to herein as the original input bit string, user input string, user defined input string). That is, abstraction starts with a user defined data bit string (input data string) of finite length L. This user defined data bit string is a string of any length and any values that represent an input to be abstracted. That is, the input bit string can be a random bit string or a non-random bit string.

Referring now to FIG. 6, a non-commutative six-group is shown. A six-group is well-known in abstract mathematics. One such example is in a book entitled: "An Introduction to the Theory of Groups" by George W. Politis, International Textbook Company, Scranton Pa. 1968, the contents of which are incorporatedherein by reference in its entirety. On page 50, of that book in Table 13, the author provides a representation of a six-group, numbers from 0 to 5. On page 51, the author describes a group "G" as a non-ABELIAN (which is a non-commutative) group of order 6. In mathematics, a non-abelian group (or a non-commutative group)

is a group (G, *) in which there are at least two elements a and b of G such that a*b #b*a. Any other non-ABELIAN group of order 6 is isomorphic to G. In exercise 61 in that book, the author shows that S3 (see example 4, page 4) is isomorphic to the group G above.

Below are the representations of the six-group G and the isomorphic symmetric group S3.

$$G \longleftrightarrow S3$$

$$0 \quad P0 = \begin{pmatrix} 0 & 1 & 2 \\ 0 & 1 & 2 \end{pmatrix}$$

$$1 \quad P1 = \begin{pmatrix} 0 & 1 & 2 \\ 2 & 0 & 1 \end{pmatrix}$$

$$2 \quad P2 = \begin{pmatrix} 0 & 1 & 2 \\ 1 & 2 & 0 \end{pmatrix}$$

$$3 \quad P3 = \begin{pmatrix} 0 & 1 & 2 \\ 1 & 0 & 2 \end{pmatrix}$$

$$4 \quad P4 = \begin{pmatrix} 0 & 1 & 2 \\ 2 & 1 & 0 \end{pmatrix}$$

$$5 \quad P5 = \begin{pmatrix} 0 & 1 & 2 \\ 0 & 2 & 1 \end{pmatrix}$$

Note that each of the two groups of three values are enclosed in the same set of parentheses. The representations of the six-group G and the isomorphic symmetric group S3 are related by reverse triplets as follows:

G-pairs ⟷ S3-pairs

| G-pairs | S3-pairs |
|---|---|
| 0, 4 | P0, P4<br>0 1 2, 2 1 0 |
| 1, 3 | P1, P3<br>2 0 1, 1 0 2 |
| 2, 5 | P2, P5<br>1 2 0, 0 2 1 |
| 3, 1 | P3, P1<br>1 0 2, 2 0 1 |
| 4, 0 | P4, P0<br>2 1 0, 0 1 2 |
| 5, 2 | P5, P2<br>0 2 1, 1 2 0 |

Figure 7:
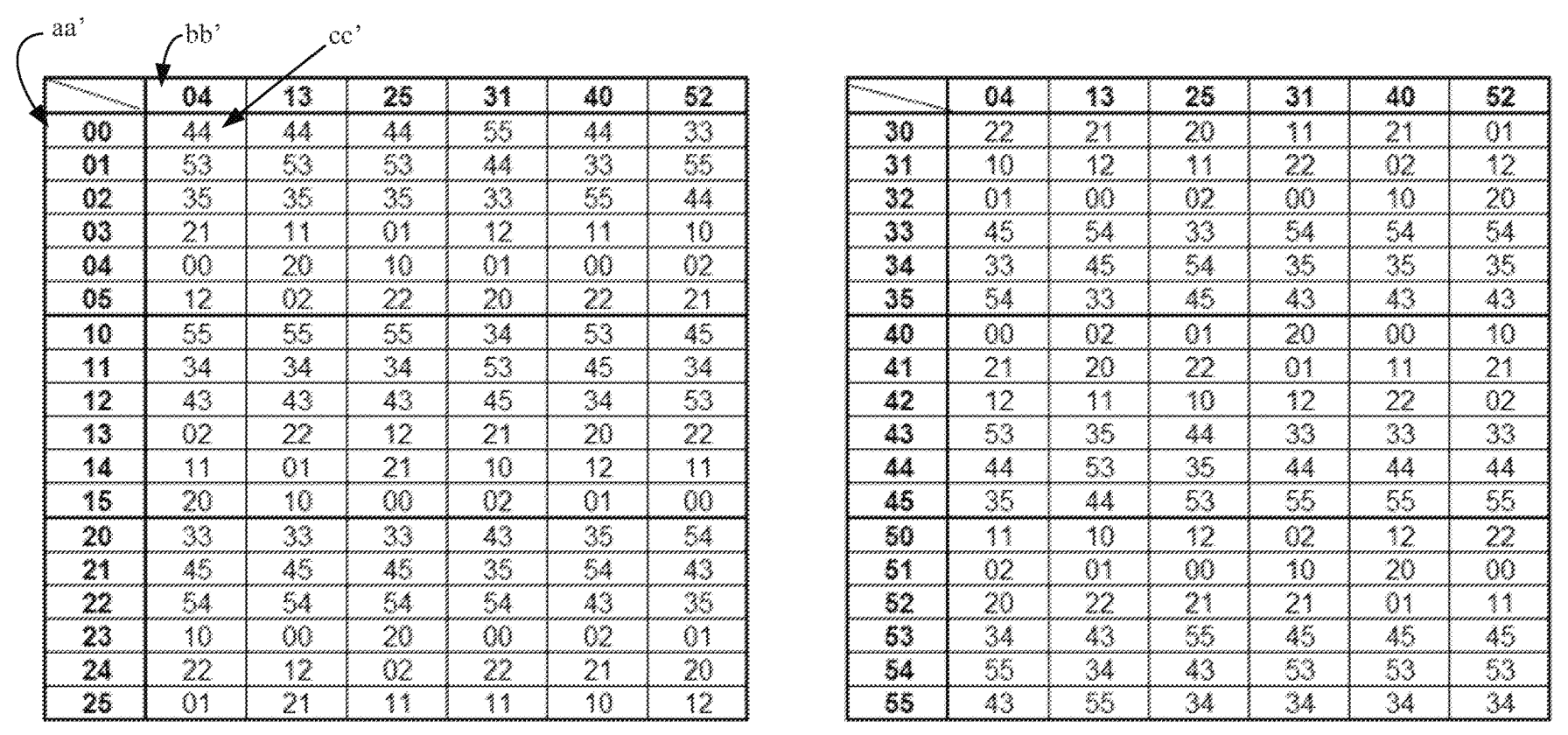

The G pairs of the non-commutative six-group are used to construct the six columns of the unique, new factor structure shown in FIG. 7.

Figure 8D:
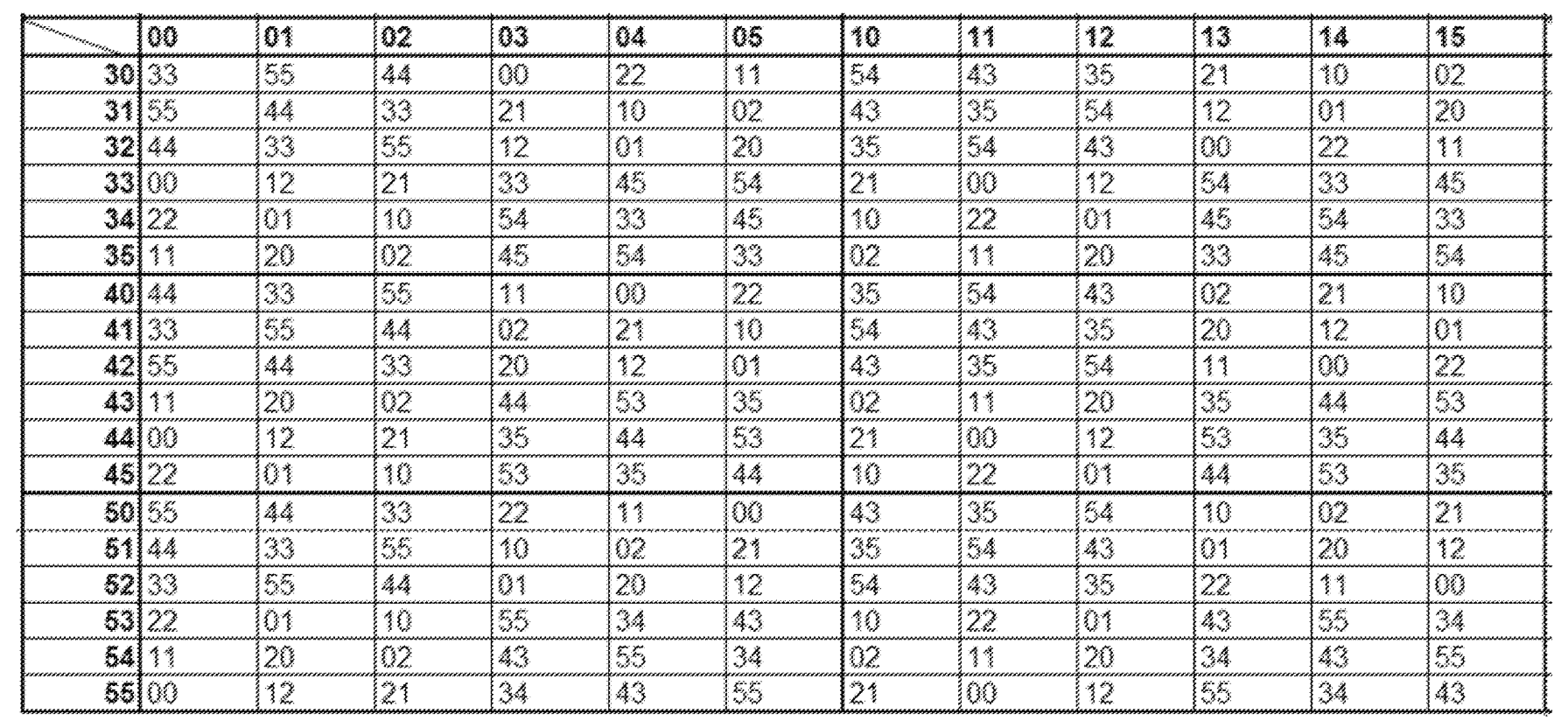
Figure 8E:
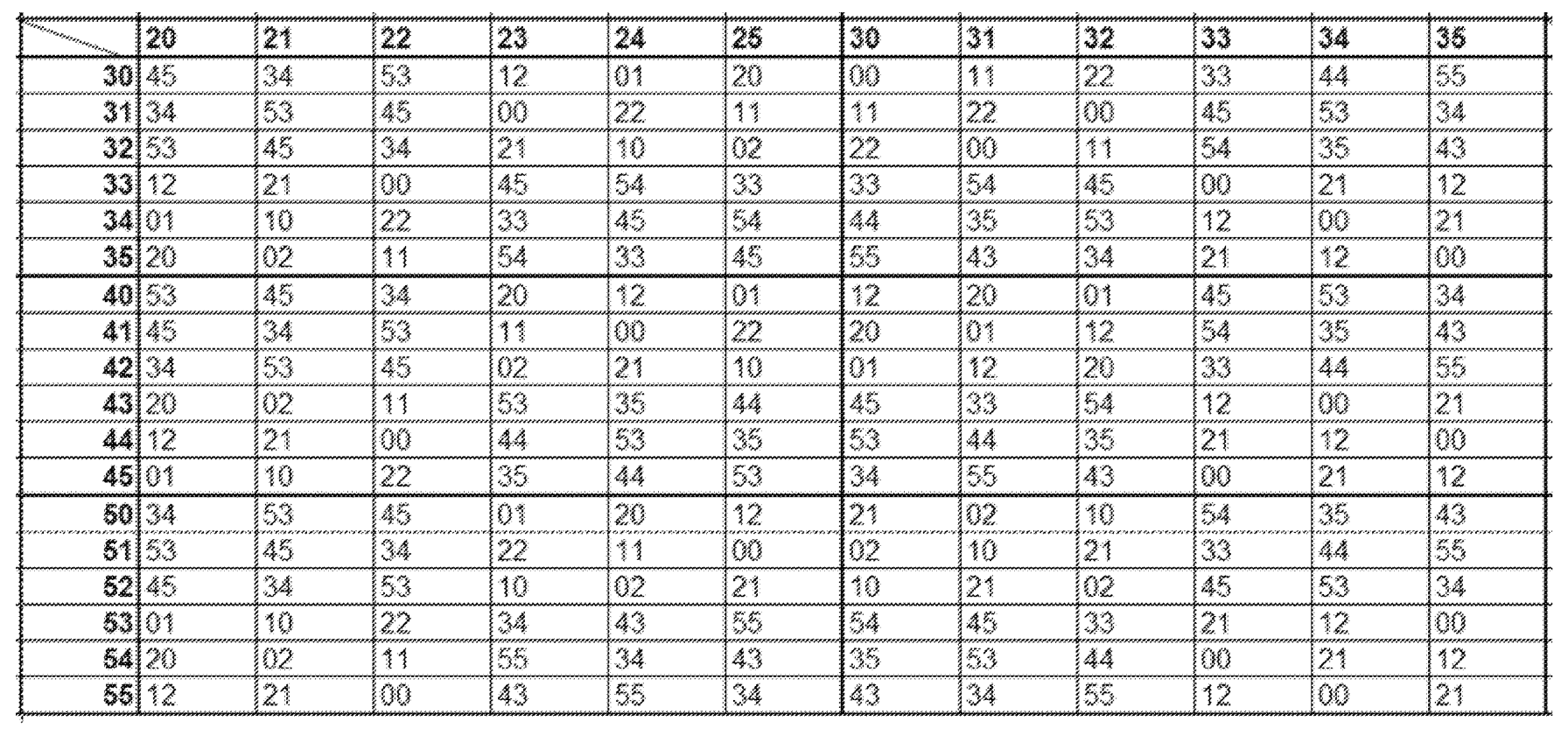

Referring now to FIGS. 7 and 8, for the abstraction process a mapping function of 36 rows and 6 columns is constructed (FIG. 7), whereas for the de-Abstraction process a mapping function of 36 rows and 36 columns is constructed (FIG. 8). Thus, in most applications because the six columns of the abstraction table (FIG. 7) are included in the de-abstraction table (FIG. 8) it is sufficient to only use the de-abstraction table for both abstraction and de-abstraction. Throughout the application the mapping function of 36 rows and 36 columns is referred to as a 36 engine operator.

However, there may be situations where an application only performs abstraction and another application that receives the results of abstraction and performs de-abstraction. In those situations, it would be sufficient to have the abstraction table (FIG. 7), in the abstraction application and the de-abstraction table in the de-abstraction application.

The six-group matrix discussed above is used for the function mapping. For each row pair (aa'), times column pair (bb'), there is a calculated result pair (cc') that is calculated according to the six-group table theory mentioned above. The tables are produced with all row/column pairs for FIGS. 7 and 8 produced similarly according to the following equation.

$$c=a.b.a'.b' \quad c'=b.a.b'.a'$$

An example calculation is given below:

Example

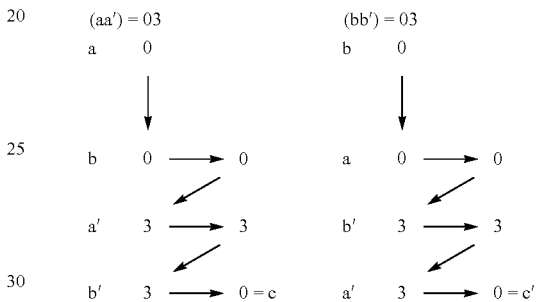

(03). (03)=>(00) as shown in FIG. 8A by the arrow 79.

Referring now to FIGS. 9-1 to 9-4, columns 04, 13, 25, 31, 40, 52 (from FIG. 7) are used for transition and output functions in the abstraction graphs. These columns are selected because these elements (04, 13, 25, 31, 40, 52) are reverse sequence pairs and isomoric, meaning identity or similarity of form. In FIGS. 9-1 to 9-4 from inputs 13, 25, 40 and 52 (the columns from the table of FIG. 7) output functions #Fi and #Gi for each possible state are determined according to the 36×6 table (FIG. 7) mentioned above.

FIGS. 9-1 to 9-4 are exemplary ones of the transition graphs, and which correspond to FIGS. 9-1 to 9-4 from the provisional U.S. Patent Application 62/061,246, filed on Oct. 8, 2014, entitled: "Universal Abstraction and De-Abstraction of a Digital Data Stream" incorporated herein by reference. Only transition graphs FIGS. 9-1 to 9-4 are illustrated in the present application in the interests of brevity; it being understood that FIGS. 9-5 through 9-72 from the provisional being incorporated herein by reference. It further being understood that FIGS. 10 A-10D below are exact summaries of all of the graphs in FIGS. 9-1 to 9-72.

In this implementation, output functions #F and output functions #G are "independent." The multiplication of the present states times the next input for output functions #G is generated in the opposite direction as for #F as arrows indicate. The #G functions have arrows pointing upwards whereas #F have arrows pointing downwards. That is, the results of the two functions #F and #G are completely "independent."

In the provisional U.S. Patent Application 61/941,027, filed on Feb. 18, 2014, entitled: "Universal Abstraction and De-Abstraction of a Digital Data Stream," the entire contents of which are hereby incorporated by reference, the output functions #F and #G are not "independent." In the '027 provisional application implementation, multiplication of the present states times the next input for output functions #G is generated in the same "direction" as for #F output functions. (This "direction" has arrows pointing downwards (in the transition graphs not shown here, but depicted in the graph FIGS. 9-1 to 9-72 of the '027 provisional). The #G functions and #F functions both have arrows pointing downwards. That is, the results of the two functions #F and #G are not completely independent.

Discussed below will be the implementation based on the '246 provisional, in which results of the two functions #F and #G are completely independent (having arrows in the transition graphs pointing upwards.

Referring now to FIG. 9-1, (as appearing in the '246 provisional) the process starts with beginning or initial states for FF' and GG' as the values "30" for both, and 00 for AD, DA (as shown in FIG. 9-1 as "30,00"). The input pairs are the value of FF' or GG' from the previous state (or the initial state) and the inputs 04, 13, 25, 31, 40 and 52 (the columns from the table of FIG. 7).

The value of the AD bit controls operations in the first 3 "positions" 0, 1, 2 of FIG. 9-1. For AD=0, the input "04" controls the transition for the F-part and the G-part at position 0 according to:

$F0,0=FF'=30\times04=22$ (see ref. no. 102)

$G0,0=30\times04=22$ (see ref. no. 104)

For AD=0 at position 1, only the F-part is transformed by the input 13, the G-part copies the G0,0 value.

$F0,1=F0,0\times13=22\times13=54$ (see ref. no. 106)

$G0,1=G0,0=22$ (see ref. no. 108)

Similarly, the DA bit controls the elements in position 3, 4, 5. For position 3, for DA=0, the input 31 controls the transition for the F-part and G-part according to:

$F0,3=F0,2\times31=43\times31=33$ (see ref. no. 122)

$G0,3=G0,2\times31=54\times31=55$ (see ref. no. 124)

For DA=0 at position 4, only the F-part is transformed by the input 40, the G-part copies the G0,3 value.

$F0,4=F0,3\times40=33\times40=54$ (see ref. no. 126)

$G0,4=G0,3=55$ (see ref. no. 128)

At position 5, both parts would be transformed by 52 (see refs. 130 and 132) providing final values 53 and 43. The final values of #F0, #G0 provide the inputs for the next state step (i+1) when applied (See FIGS. 13A-13O).

As shown in FIG. 9-2, with begin states for FF' and GG' as the values "30" for both, and 01 for AD, DA (shown in FIG. 9-2 as "30,01").

Described below are selected ones of the transformations that occur in FIG. 9-2. For the case DA=1 at position 4, F0,4 copies F0,3, (see ref. no. 140) G0,4 changes to G0,4=G0,3×40, (see ref. no. 142). At position 5 both parts would transform by 52, (see ref. nos. 144 and 146).

$F0,5=F0,4\times52=54\times52=53\ G0,5=G0,4\times52=53\times52=45$

As shown in FIG. 9-3, for the case AD=1, with begin states for FF' and GG' as the values "30" for both, and 10 for AD, DA (shown in FIG. 9-3 as "30,10").

Described below are selected ones of the transformations that occur in FIG. 9-3. The input pairs are the values of FF' or GG' from the previous state (or the initial state) and the inputs 04, 13, 25, 31, 40 and 52 are from the columns from the table of FIG. 7.

For AD=1, at position 1 F0,1 copies F0,0 (see ref. no. 150) and G0,1 changes to G0,1×13=45 (see ref no. 152). At position 2 both parts transform by 25 (see ref. nos. 114, 116), as:

$F0,2=F0,1\times25=54\times25=43\ G0,2=G0,1\times25=22\times25=54$

Similarly, the functions #F3 and #G3 are determined as in FIG. 9-4 for FF' and GG' as the values "30" for both, and 11 for AD, DA (shown in FIG. 9-4 as "30,10").

Described below are selected ones of the transformations that occur in FIG. 9-4. The value of the AD bit controls operations in the first 3 "positions" 0, 1, 2 of FIG. 9-4. For AD=0, the input "04" controls the transition for the F-part and the G-part at position 0 according to:

$F0,0=FF'=30\times04=22$ (see ref. no. 160)

$G0,0=30\times04=22$ (see ref. no. 162)

For AD=1 at position 1, only the G-part is transformed by the input 13, the F-part copies the F0,0 value.

$F0,1=F0,0=22$ (see ref. no. 164)

$G0,1=G0,0\times13=22\times13=45$ (see ref. no. 166)

Similarly, the DA bit controls the elements in position 3, 4, 5. For position 3, for DA=0, the input 31 controls the transition for the F-part and G-part according to:

$F0,3=F0,2\times31=54\times31=53$ (see ref. no. 168)

$G0,3=G0,2\times31=35\times31=34$ (see ref. no. 170)

For DA=1 at position 4, only the G-part is transformed by the input 40, the F-part copies the F0,3 value.

$F0,4=F0,3=53$ (see ref. no. 172)

$G0,4=G0,3\times40=33\times40=53$ (see ref. no. 174)

At position 5, both parts would be transformed by 52 (see refs. 176 and 178) providing final values 45 and 54. These final values of #F0, #G0 provide the inputs for the next state step (i+1) when applied to the next graph.

The results of applying to all graphs (including the ones depicted in the provisional) are summarized in FIGS. 10A-10D and the example of FIGS. 13A-13O.

FIGS. 9-1 to 9-4 depict an exemplary set of the abstraction graphs. In actuality, there are seventy-two (72) such abstraction graphs (18 such sets one for each state, and 4 graphs for each state corresponding to the four possible values of AD,DA) starting with state "30" inputs "00 01 10 and 11" as illustrated, and ending with state "55" inputs 00 01 10 11".

FIGS. 9-5 to 9-72 are included in the '246 provisional referred to herewith and depict the remaining ones of the 72 such transition graphs. There are 72 graphs because there are 18 beginning and final states and each final state is the next beginning state to the graph and each beginning state has 4 possibilities of AD, DA, (i.e., 18*4=72). In a similarly manner the remaining transition graphs of FIGS. 9-5 to 9-72 in the provisional are provided, but the detailed discussion and depiction are omitted for brevity.

The graphs represent a set of eighteen states, namely 30, 31, 32, 33, 34, 35, 40, 41, 42, 43, 44, 45, 50, 51, 52, 53, 54, 55. For each of those states there are four pairs of elements for AD DA. These pairs are 00,01,10,11 for each state. All possible transition and output functions of the graph are listed in FIGS. 10A-D corresponding to states FF' and GG' respectively. FIGS. 10A-D are tables that summarize results calculated from the graphs from the 246' provisional and that in embodiments form part of the engine 36 for both abstraction and de-abstraction.

Figure 10A:
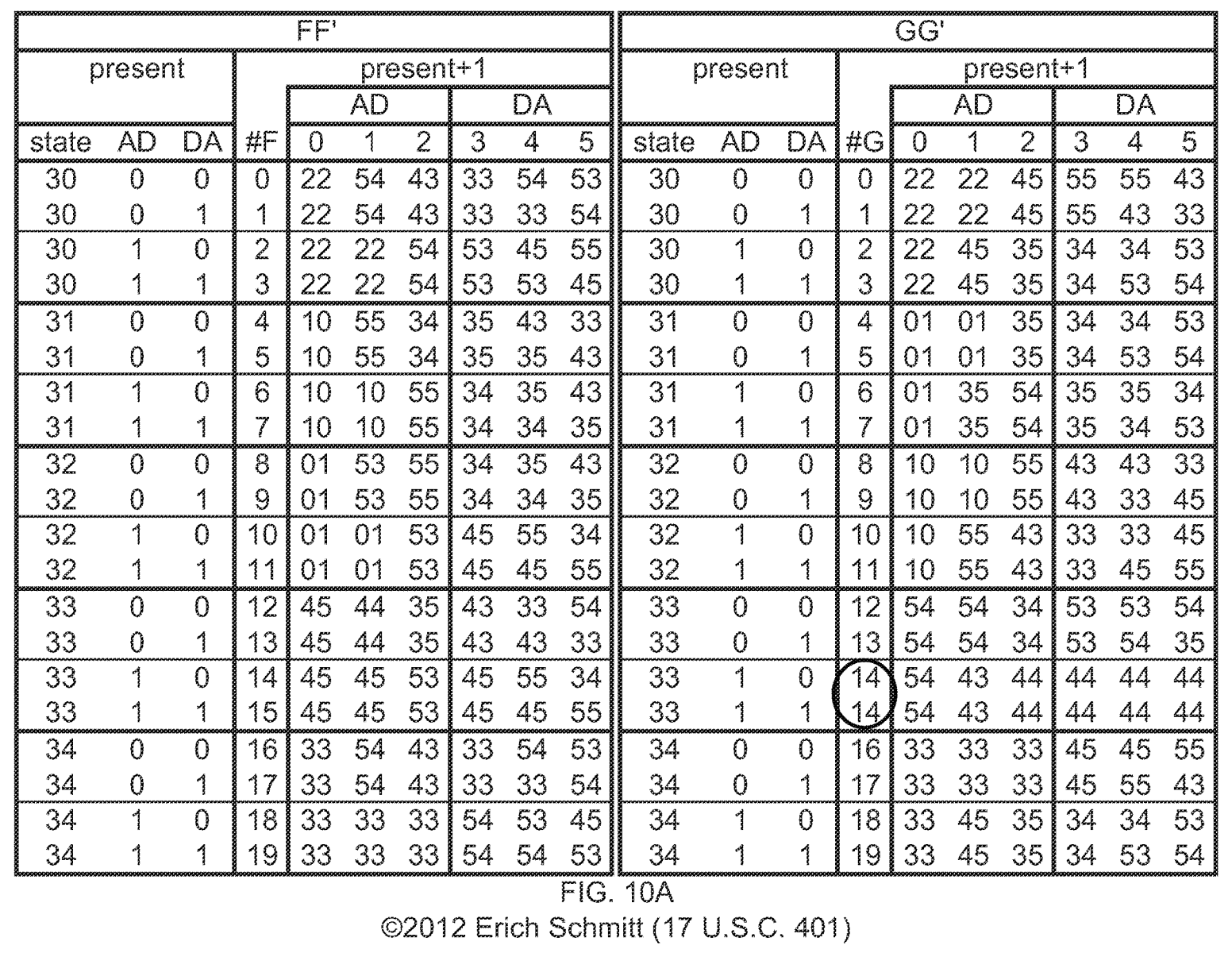

Referring now to FIGS. 10A-10D, among the two sets of 72 functions representing #F and #G there are two sets of 8 functions corresponding to #F and #G that are identical. These are denoted as "circled entries" in the tables of FIG. 10B and FIG. 10C. These functions are comprised of four pairs with two identical elements each. These two sets of four pairs contain data bits that are non-permissible as ending output functions and states, thus leaving 64 remaining permissible end output functions and states. The first set of columns in the tables of FIGS. 10-10D represent #F and the second set of columns in the tables of FIGS. 10-10D represent #G. As seen, both #F and #G have several equivalent results shown in the binary positions 3, 4 and 5. These equivalent results are used in the conversion examples discussed below in FIGS. 17 and 18.

Referring now to FIGS. 11A-11B, the permissible, possible ending functions for #F and #G obtained from the abstraction tables in FIGS. 10A-10D are shown. The non-permissible functions that were indicated in FIGS. 10A-10D are not included in FIGS. 11A-11B, and the absence of those non-permissible functions is represented as gaps in the order in FIGS. 11A-11B. The permissible end functions are transformed into an optimal binary code in the indicated columns.

Six Bit Codes

Referring now to FIGS. 11A-11B, in particular, the mapping to the binary code is the identity element of the symmetric group S 64. There are 64! possible permutations. Any permutation can be used for additional security. That is, since any permutation can be used that means that there are 64! possible permutations for each end #F and end #G to consider. The possible number of permutation is 64! times 64!, where here "!" is used to indicate a factorial operation.

$$(64!=1.268\times10^{89}; 64!\times64!=2.537\times10^{178})$$

As shown in the tables of FIGS. 11A and 11B there are six binary elements each for "#F end" and "#G end" resulting in 12 bits for the description of the user requested abstraction (FIG. 1, data bit string k of length L). The particular transformation of the "#F end" and "#G end" functions into the 12 bits provides the abstraction codes, as a pair of 6 bit codes.

Universal Abstraction Technique

Figure 12:
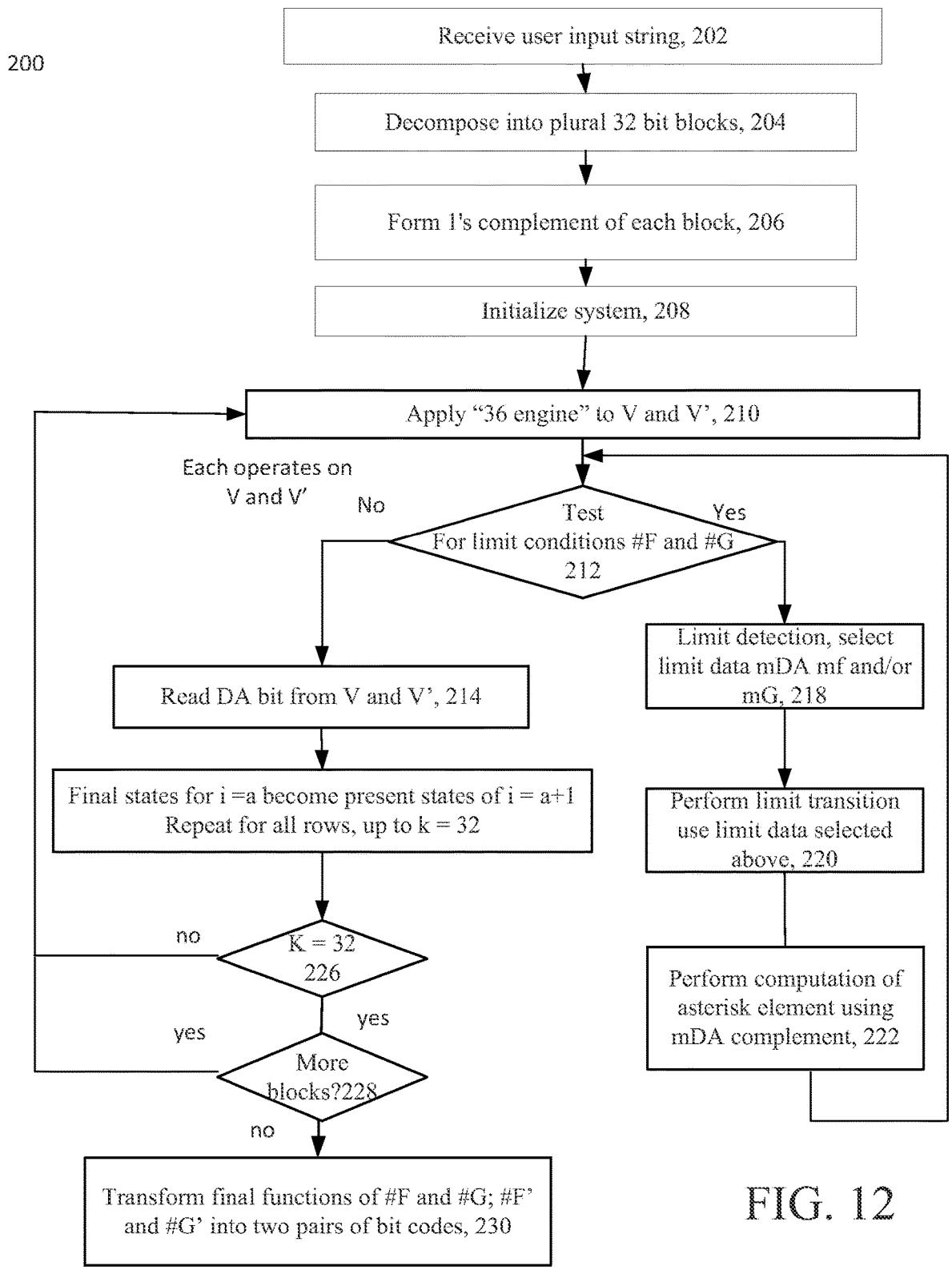
FIG. 12 is a flow chart depicting a universal abstraction process.

Referring now to FIG. 12, processing 200 in a universal abstraction engine is shown. The universal abstraction engine is described herein with the figures following giving detailed aspects. In the following figures an example 32 string is shown in FIGS. 13A and 13B, with an example of a limit data table FIG. 14A and random sequence tables 14B and 14C and random AD table 14D.

The universal abstraction engine receives 202 a user input string of any length L, (ideally of a power of 2, but if not a power of two can be padded or extra bits handled in a user input string of length L defined manner), e.g., FIG. 13B. The universal abstraction engine decomposes 204 the string of length L into plural blocks of here 32 bits, e.g., FIG. 13B. For each block is formed 206 a one's complement of the block, providing V and V' blocks. A system initialization 208 is performed and the 36 engine operator (FIG. 8) 210 is applied to the V blocks and V' blocks. The universal abstraction engine processing 200 tests 212 for limit conditions for #F and #G and if no limit condition exists, 214 reads the DA bits from V and V'.

However, if there is a limit detection, the universal abstraction engine processing 200 selects 218 the limit data from mDA mf and/or mG, performs 220 a limit transition using the limit data selected above and performs 222 a computation of any asterisked element(s) using the mDA complement. Upon the universal abstraction engine processing 200 detecting 212 a limit condition, it repeats the sequence 218, 220 and 222, as shown until the condition is cleared. Once there is no limit condition (at 214), the final states for i=a become the present states of i=a+1 and this is repeated for all rows up to k=32, 224, when K=24, 226 the processing 200 tests for more blocks 228 and the universal abstraction engine transforms 230 the final functions of #F and #G and #F' and #G' into the two pairs of abstraction codes.

Referring now to FIG. 13A, an example of an input string to be abstracted is shown. In the table of FIG. 13A, the "order DA string" columns represent the bit positions of "an index k" and the "DA element" columns represent the data values of the input data bit string. FIG. 13A shows an example of a bit string of length L where L=32 here referred to as "V" is the user input string. The sequence of the data bit string is ordered by the index k. The k order is a natural number and starts at 1 and continues up to L (in this example, L=32), where k defines the bit position in the input stream. L can be any length of random or nonrandom bit sequences.

FIG. 13B shows the complement string referred to as "V'" and its details. The complement string is the one's complement of the user string of FIG. 13A and is directly derived from the user string. The first data string "V" the user input string (FIG. 13A) and the second the "V'" (FIG. 13B) is the one's complement of V. As known, the 1's complement of a string transforms a logic "0" to a logic "1" and a logic "1" to a logic "0"

This implementation of the universal abstraction and de-abstraction uses a pair of modules of 32 bit data bits that defines a fundamental module for abstraction and de-abstraction as the smallest module possible for abstraction and de-abstraction in the described implementation. Referring now to FIGS. 14A, 14B, 14C, random limit bit string tables are shown.

In FIG. 14A, the table depicts a maximum "m" order of 53 with the corresponding DA elements for each value of m. In FIG. 14B for function F there is depicted for each value of mF being states for the function F when a limit transition state is encountered. These states will be used to substitute for calculated states for F in a subsequent iteration. In FIG. 14C for function G there is depicted for each value of mG begin states for the function G when a limit transition state is encountered. These states will be used to substitute for calculated states for F in a subsequent iteration.

In FIGS. 14B and 14C, the tables depicts a maximum "mF or mG" order of 53 with the corresponding state values for F or G respectively.

The limit bit string tables of FIGS. 14A-14C are stored in storage or memory. The limit bit string tables are random sequence of bits and states. These 'limit' data bits and limit begin states are inserted during the abstraction process, anytime a 'limit' condition occurs (see FIG. 10A and FIG. 10B and also as discussed below). This insertion is used as a mechanism to overcome the limit condition, as discussed below.

The length of the limit bit string ($L_{DA}$) is determined by the system according to $L_{DA}=1.25*L+14=54$ (0 to 53).

FIG. 14D shows an address bit string (AD bit string) table, where the index(i) defines the bit position in the AD string. For a user bit string of L=32 bits where k=32 the length of the maximum AD bit string length will be i=109. The maximum AD bit string length can be defined as 3k+14. The maximum limit strings m, mF, and mG=53.

Figure 19:
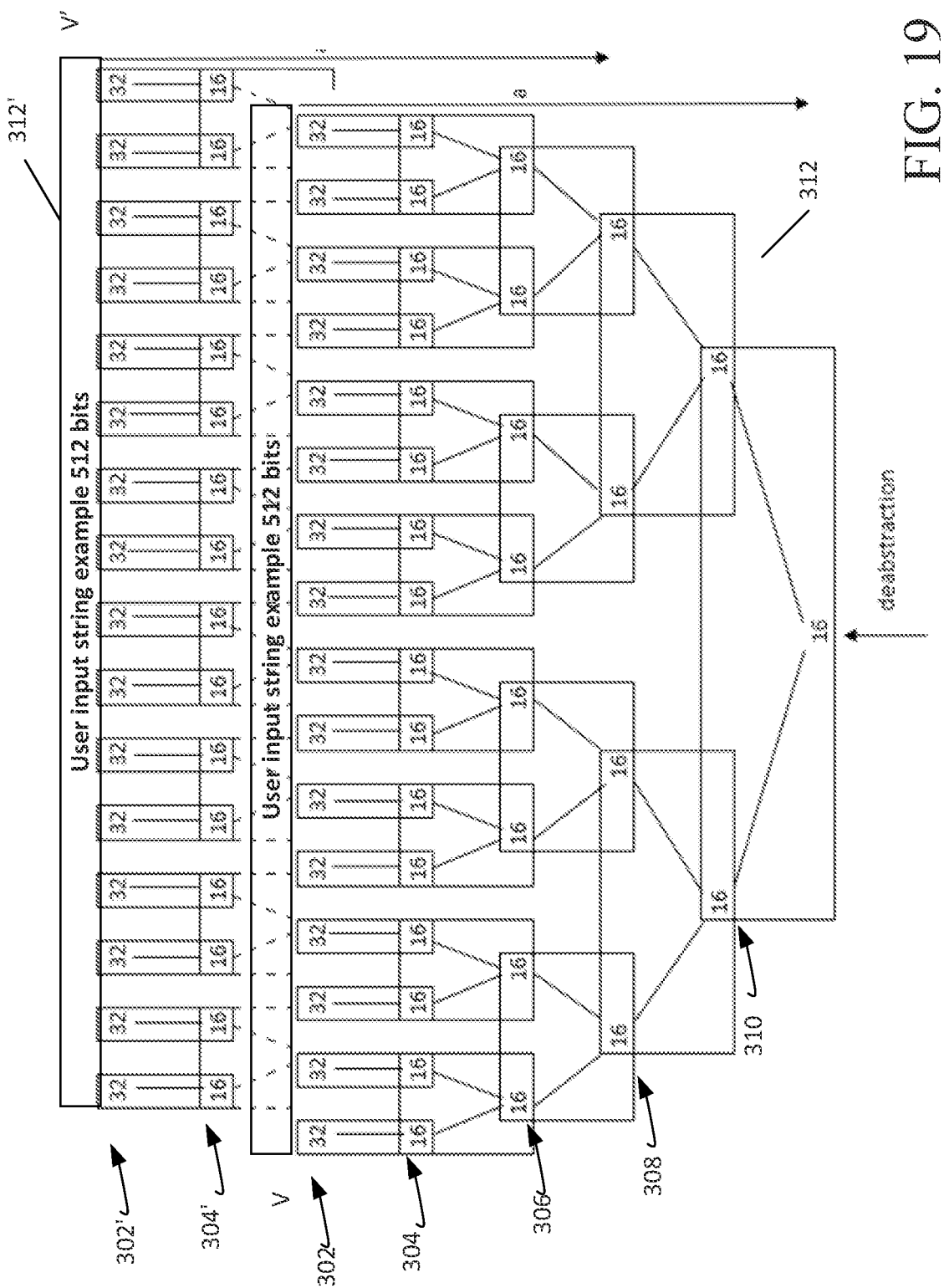
FIG. 19 is a block diagram that depicts the abstraction engine and de-abstraction engine particularly suitable for memory/storage applications as a Tree Structure for a 512 bit user string.

The system can take multiple 32 bit strings and can concatenate them in orderly fashion to implement any arbitrary user string length (see FIG. 19). Again, these user bit strings can be random or nonrandom sequences. FIG. 14D shows an address bit string (AD bit string) table, where the index(i) defines the bit position in the AD string. For a user bit string of L=32 bits where k=32 the length of the maximum AD bit string length will be i=109. The maximum AD bit string length can be defined as 3k+14. The maximum limit strings m, mF, and mG=53.

The system can take multiple 32 bit strings and can concatenate them in orderly fashion to implement any arbitrary user string length (see FIG. 19). Again, these user bit strings can be random or nonrandom sequences.

Referring now to FIG. 15 an abstraction processor 250 is shown. The abstraction processor 250 can be implemented as a single processor or on a multi-processor chip with plural processors being assigned to or dedicated to specific tasks. The abstraction processor 250 receives the original input string V and from that string passes through a module 252 that forms the ones complement V' of the string V and a module 254 that decomposes into 32 bit modules. These strings V and V' are stored as modules and the modules are applied bit by bit to the 36 engine operator 256 (FIG. 8 or graphs FIG. 9 or table FIG. 10) to produce output functions #F and #G for V and #F' and #G' for V'. The produced output functions #F and #G for and states FF and GG V and #F' and #G' states FF' and GG' for V' are tested in a limit tester 258 for the presence of limit condition(s). If limit conditions are not present, the abstraction processor 250 reads the DA bit from V and V' respectively. If a limit condition is present, depending on the limit condition, a limit detection circuit 262 and/or limit transition circuit 264 are used to substitute random bits FIG. 14A for DA bits in V and/or V' and/or random states from tables in FIGS. 14B-14D, when the limit detection circuit 262 detects a limit condition and will compute "*" asterisked elements, as further discussed below.

For some states encountering a limit condition and thus an mDA input, only one of the two random sequences, mF or mG will be required, whereas in others both are required, as described with respect to FIGS. 16A-1 to 16A-6 and FIGS. 16B-1 to 16B-10.

Referring now also to FIGS. 16A-1 to 16A-6 and FIGS. 16B-1 to 16B-10 iterative abstraction processing and use of the limit tables and AD tables are shown. For these tables selected examples are described for the sake of brevity.

Figure 16A-1:
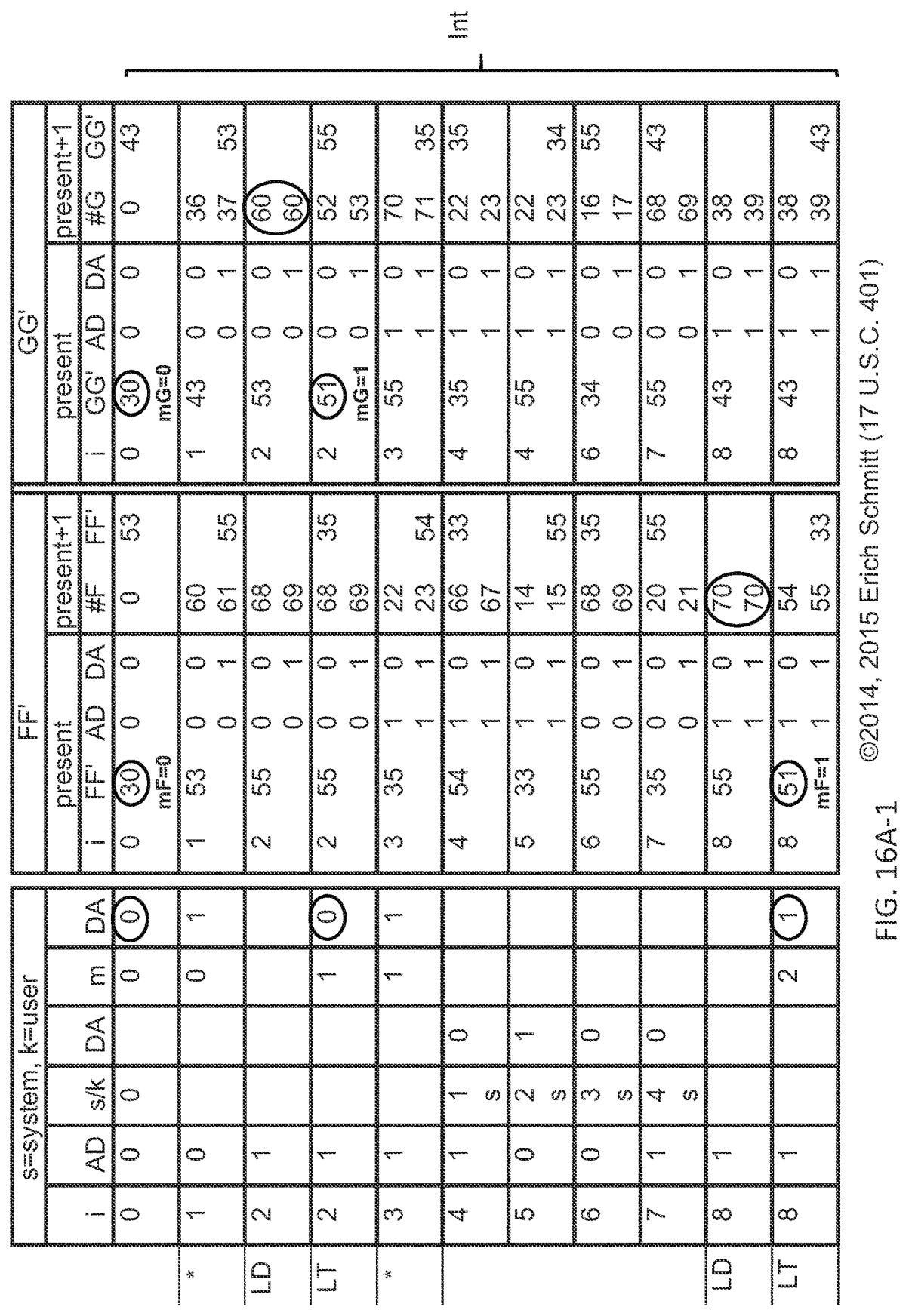
Figure 16A-2:
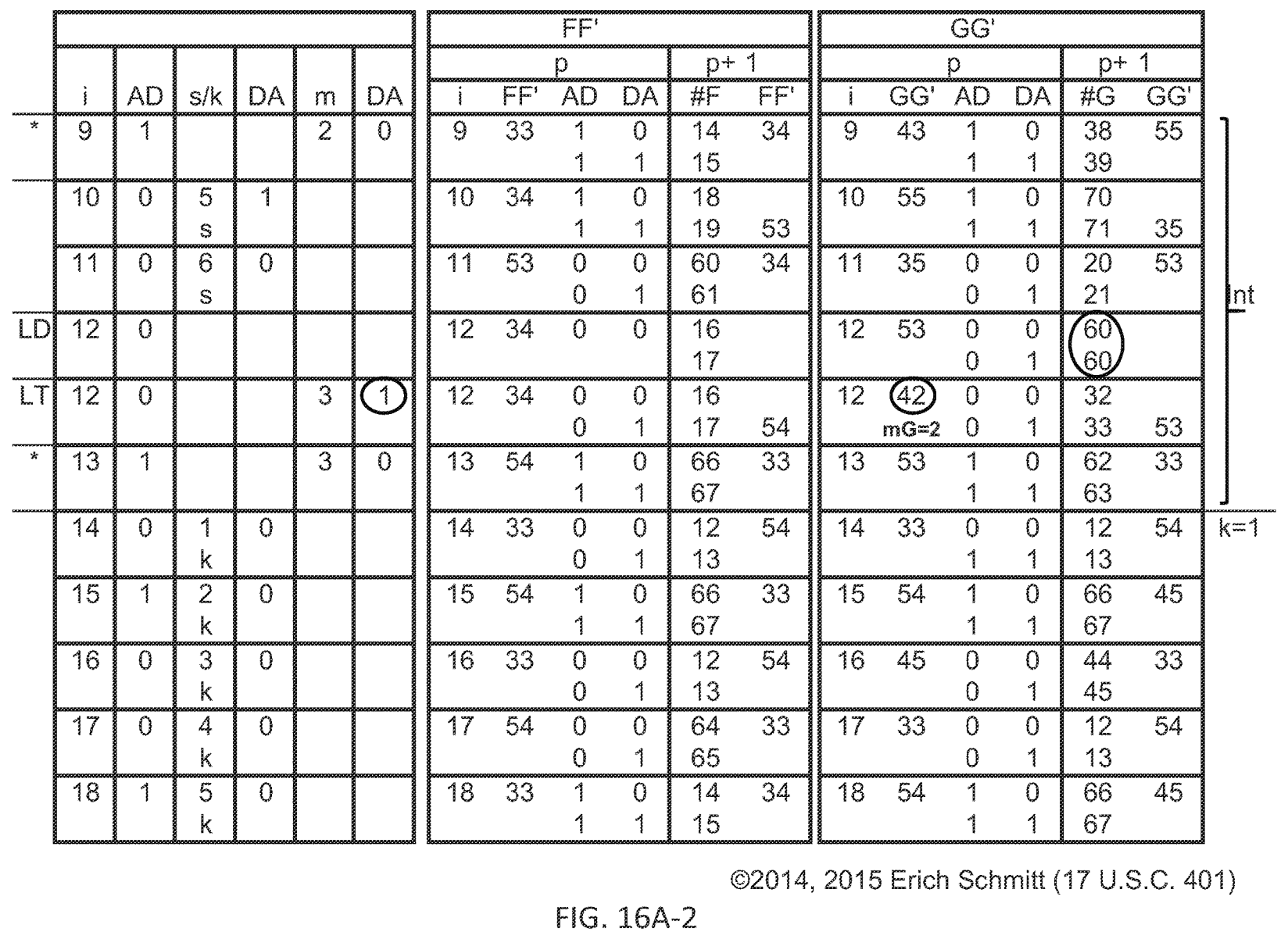
Figure 16A-3:
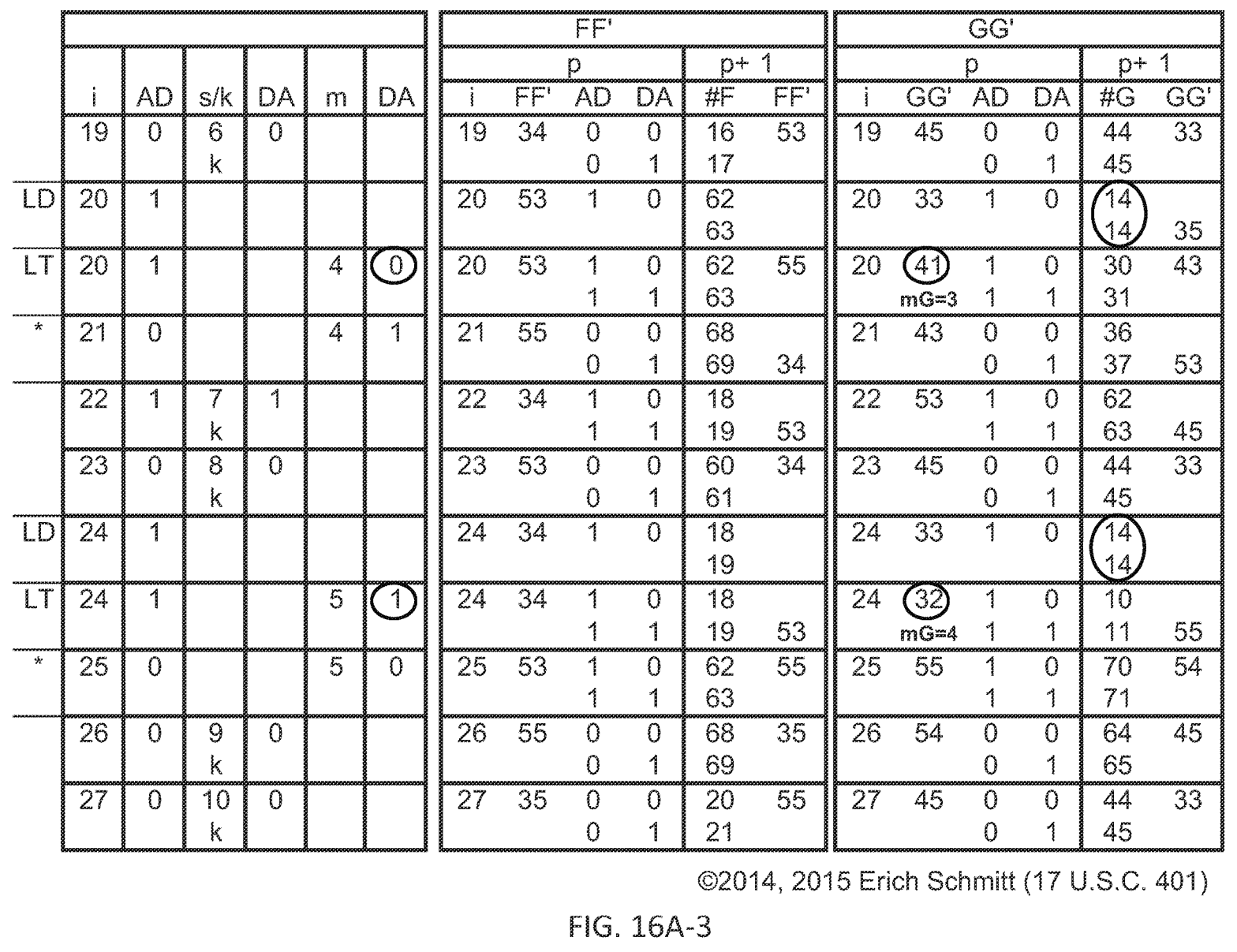
Figure 16B-1:
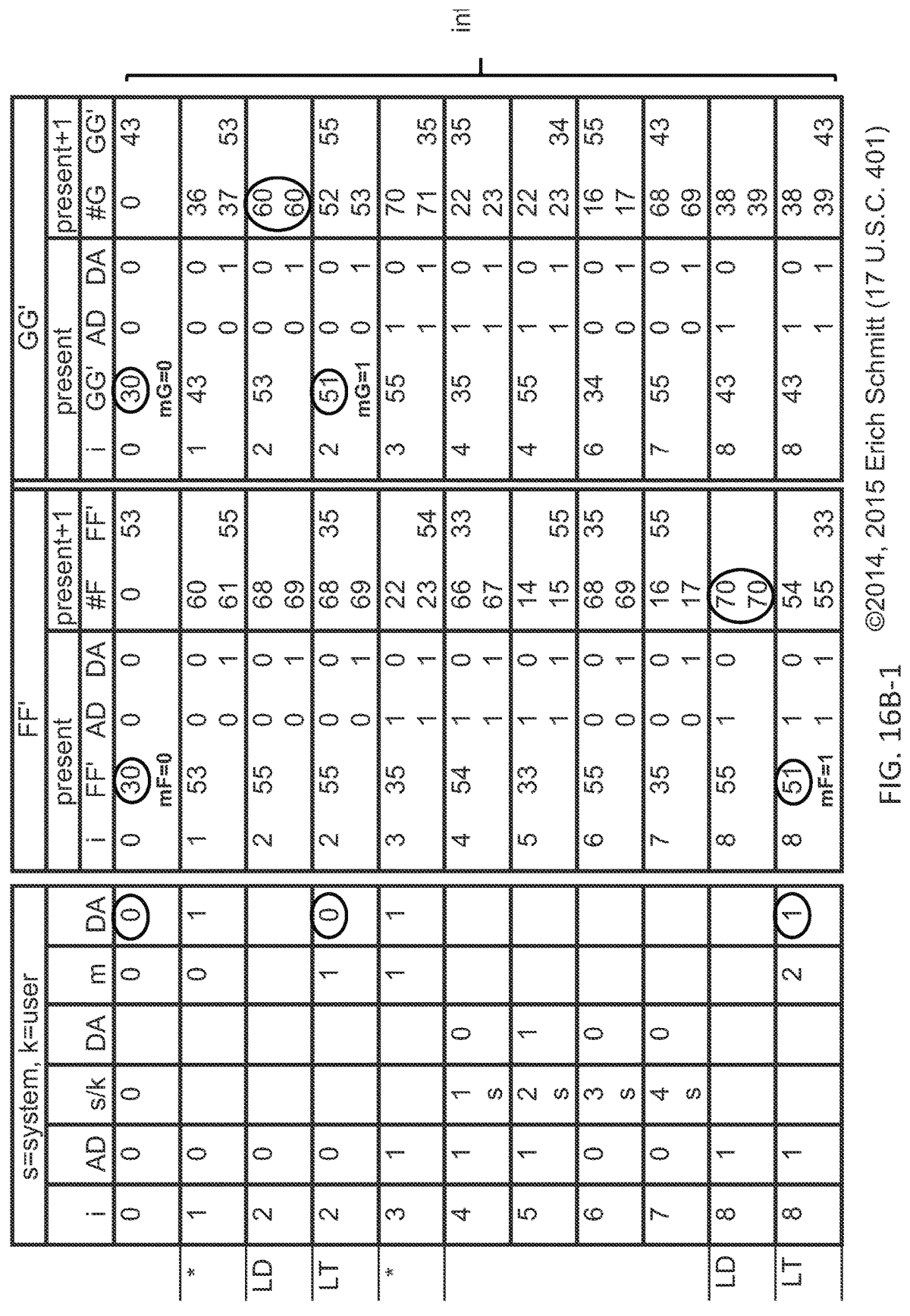
Figure 16B-2:
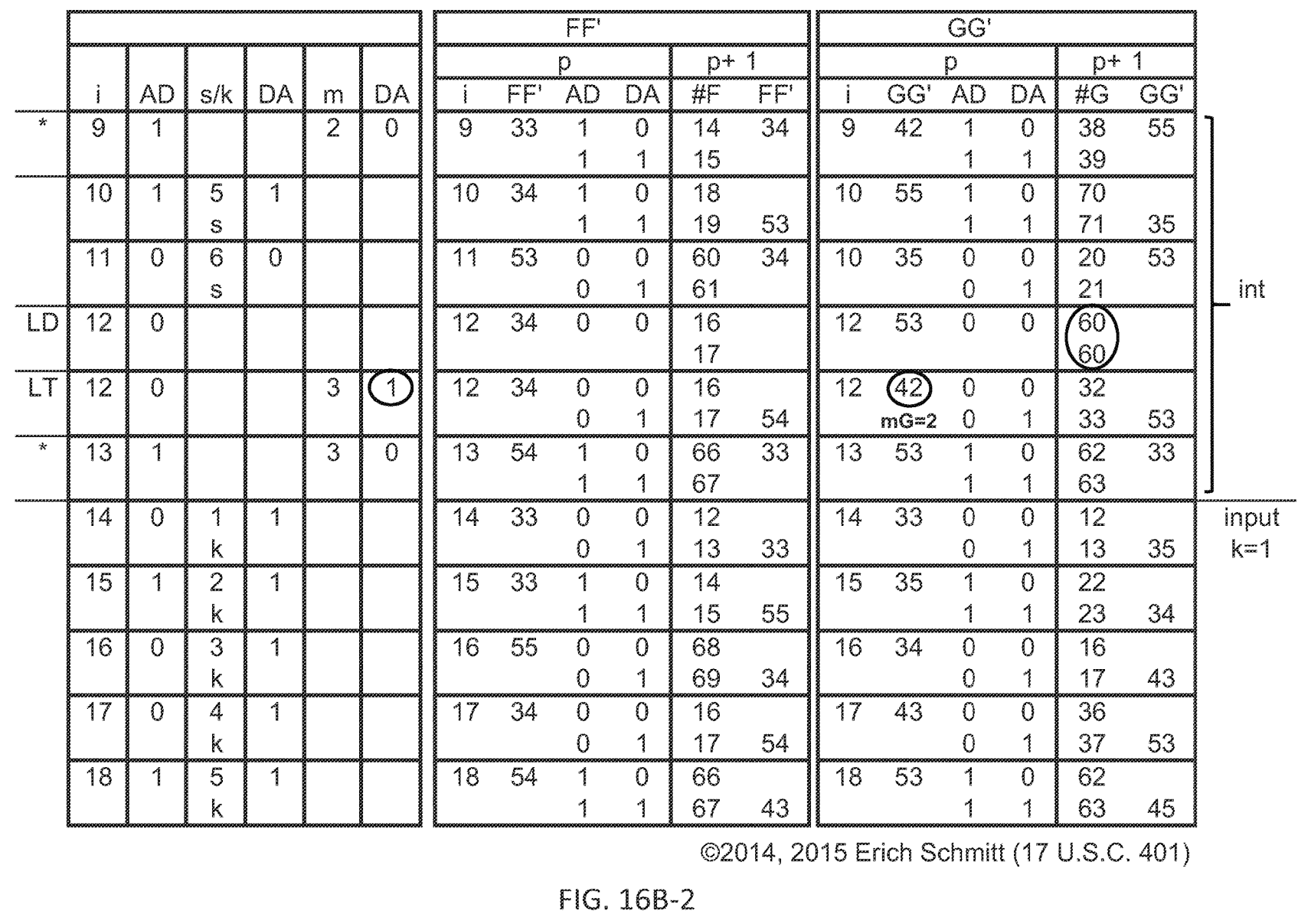
Figure 16B-3:
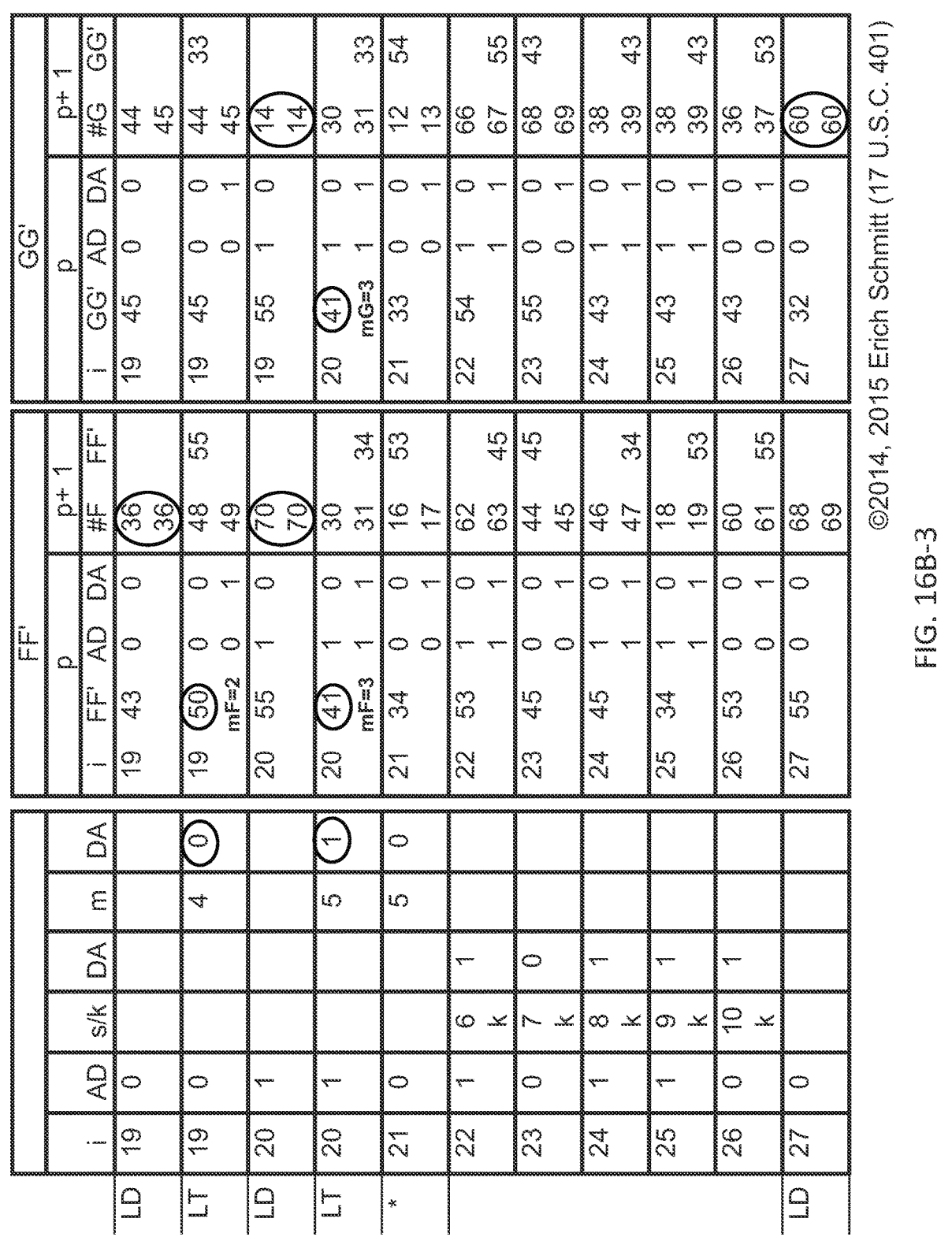
Figure 16B-4:
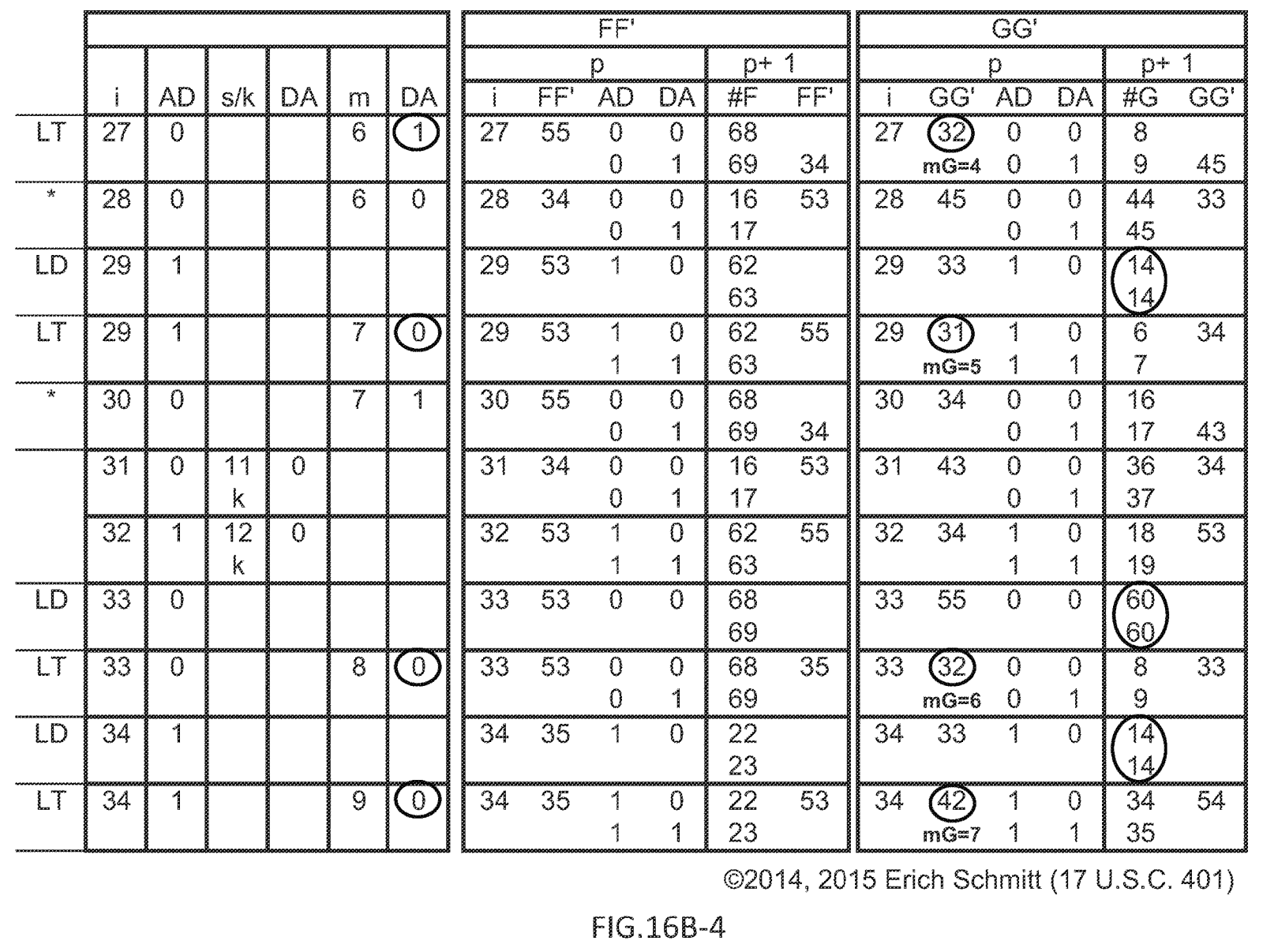
Figure 16B-5:
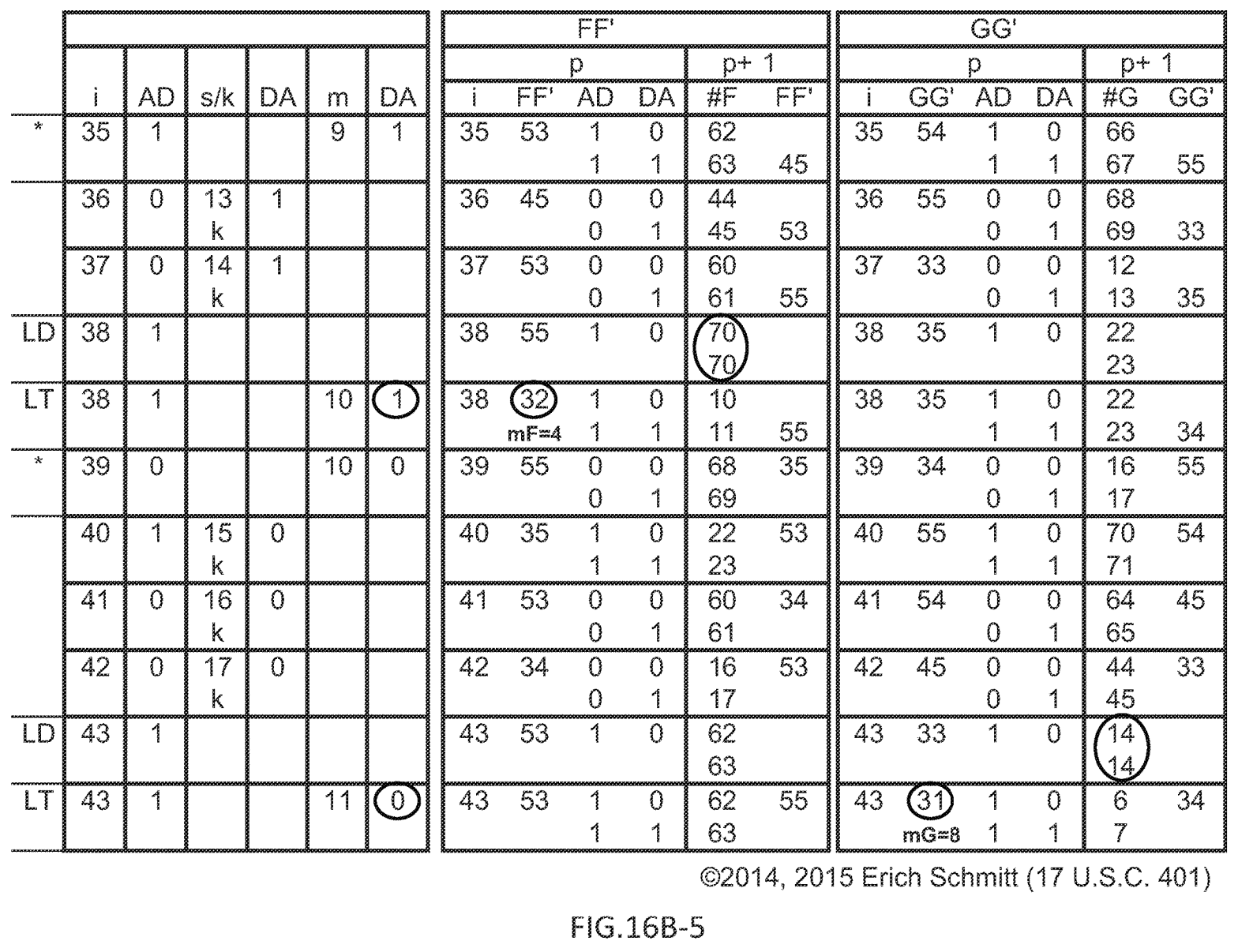
Figure 16B-7:
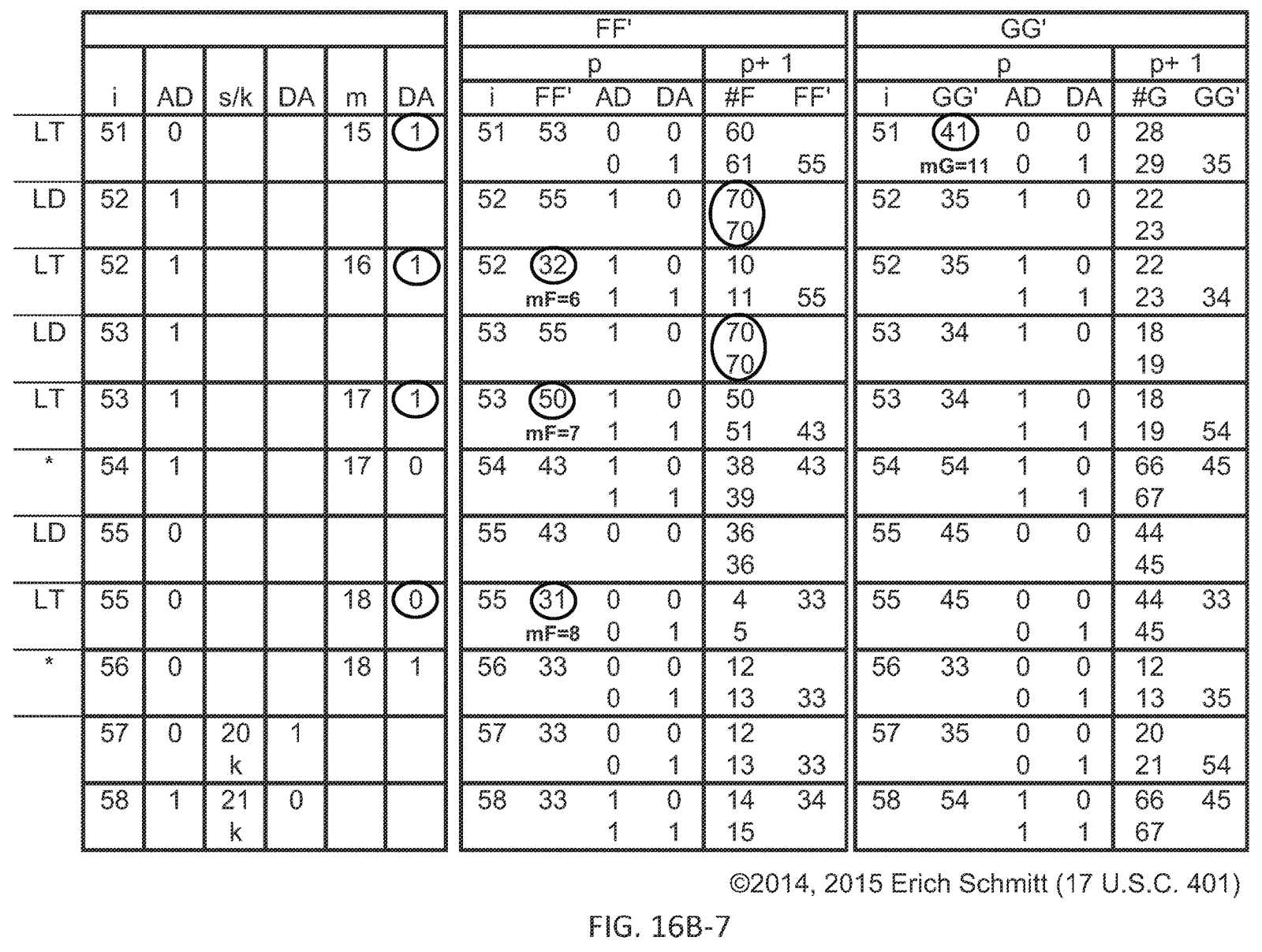
Figure 16B-8:
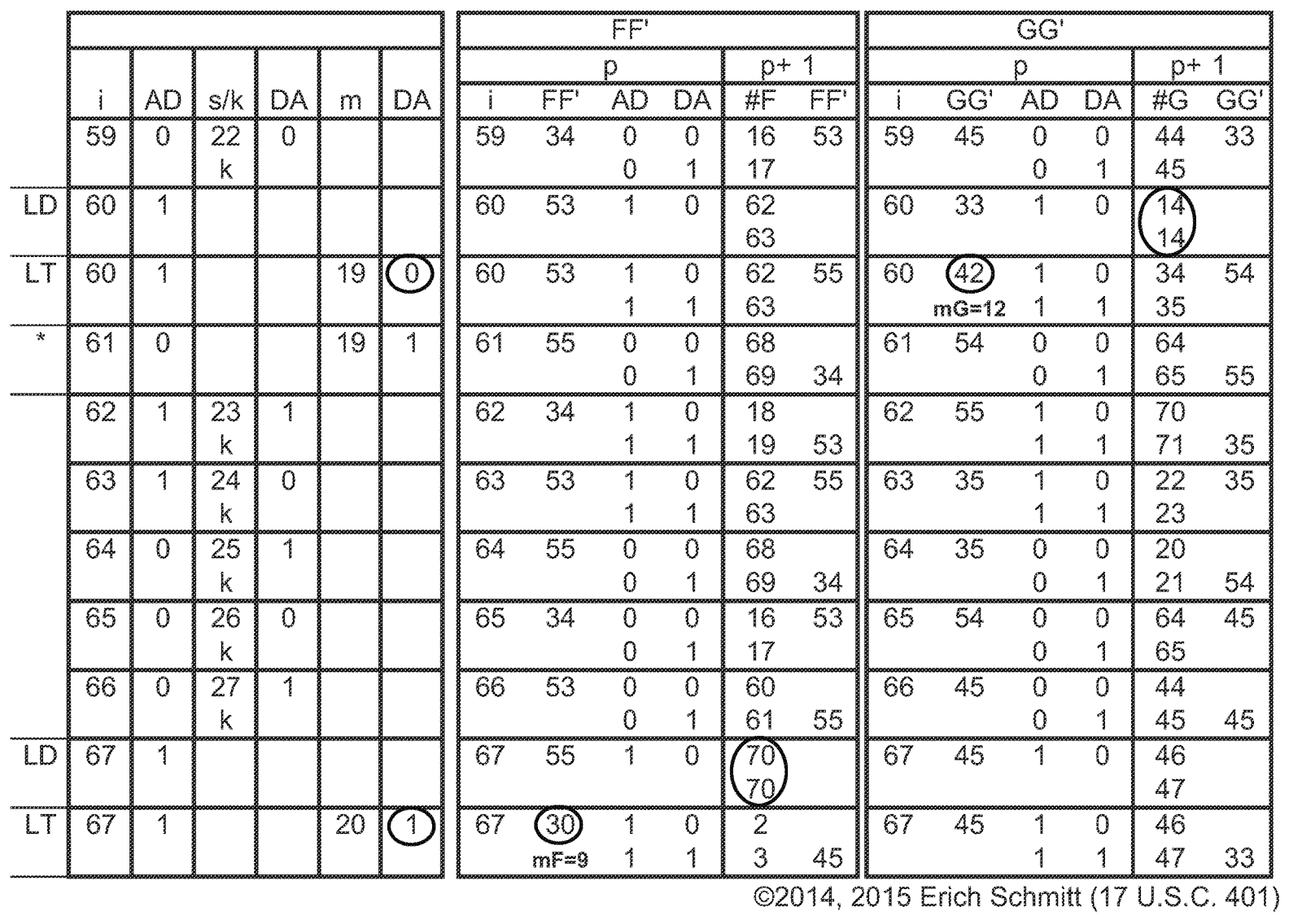
Figure 16B-9:
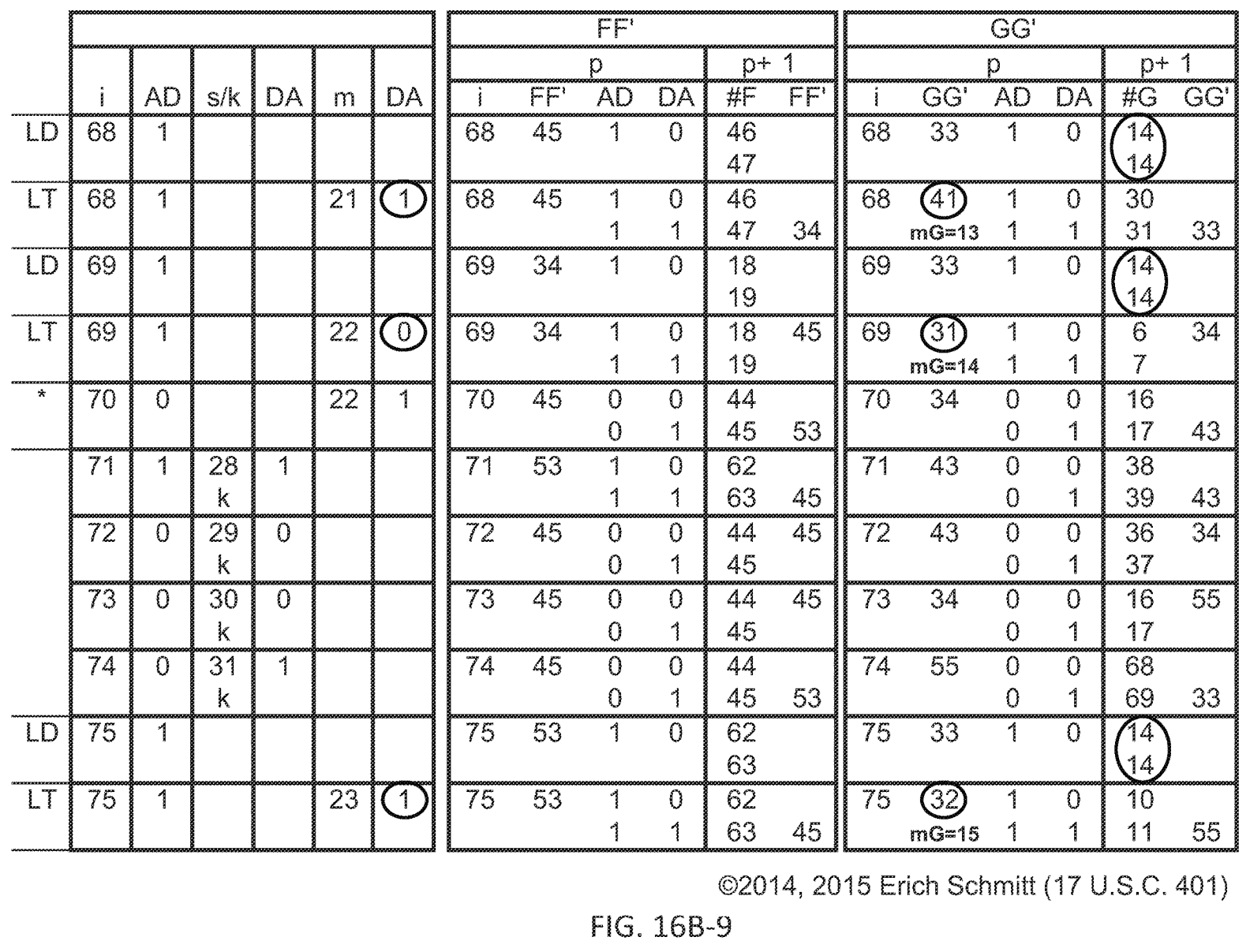

In FIG. 16A-1 at i=0 there is a limit condition of order 0 with FF' present (or begin) state of 30 as well as GG' present state (or begin) of 30. FIGS. 14B and 14C show these states at the mF=0 and mG=0 positions under the begin states columns respectively. In FIG. 16A-1 an "s" index with accompanying DA values precedes the "k" values of the input string. The "s" values are initializing values to initialize the universal abstraction engine for use with various applications. At the end of the "s" values, the beginning of the user input string "k" starts and the abstraction of the input string begins. The system begin state is at i=0 in FIG. 16A-1 and shows a limit data element with AD=0, m=0, DA=0. The limit begin states are FF' and GG' and are both 30.

The "s" values represent known data system values and are shown from i=1 through i=13. In the example there are 6 values for the system DA and 4 values for the limit DA. In general there will be ten s values.

The last row of the system begin state at i=13, depicts the begin conditions or structures for the user application. For convenience, the beginning conditions are defined as a fixed row for any application. The principle of modulo 6 repetition structure in the 36 engine operator (FIG. 8) is used.

At i=2, the GG' present state+1 shows a 60 for both DA 0 and 1, and thus indicates the existence of a Limit Detection, but the FF' present state+1 does not show an identical value for DA 0 and 1, and thus processing follows the normal transition and does not require an mF. Thus, at i=2 and m=1 with DA=0 there will be a look up in the table of FIG. 14C for mG=1. This is the Limit Transition and the corresponding new begin or present state is shown as 51.

Furthermore there are states in the figures denoted by an asterisk (*). In those states neither mF nor mG are used. It is m=1 with the opposite DA value of 1 that will drive the transition of FF'=35 and GG'=55.

As stated above, the fundamental 32 bit module is used to implement any finite user string of length L by a tree structure shown in FIG. 19. Any finite user string length L will be packaged into 32 bit V and 32 bit V' values for the abstraction and de-abstraction process. Any 32 bit module will be abstracted to 16 bits or 2:1 and de-abstracted back to 32 bits or 1:2. This process can occur at any level of the tree structure and is always the same. The tree structure depicts the abstraction and de-abstraction process for a user string example of 512 bits.

Referring to the transition graphs for present states (FIGS. 9-1 to 9-4 and generally 9-5 to 9-72 in the above mentioned provisional application), the multiplication of the present states times the next input is generated in the opposite direction as the arrows indicate. The #G functions have the arrows pointing upwards indicating that the results of the two functions #F and #G are completely independent. FIGS. 10A-10D show that the functions #F and #G are distinct. These tables are used for the abstraction process. As mentioned above, FIGS. 10 A-10D are exact summaries of all of the graphs in FIGS. 9-1 to 9-72. These tables are easier to use in explanation and implementation than the graphs.

Both #F and #G have several equivalent results shown in the binary positions 3, 4, and 5. There are 16 pairs for both #F and #G and are shown in FIGS. 17 and 18 respectively.

For instance in FIG. 17 the #F value 12 has an equivalent in #F value 42. This is given the hexadecimal number of "0" and as a binary code for the #F end 3,4,5 column as 0000. There is a transformation from a 5 bit code represented as #F to four bit code as represented as the hexadecimal numbers. The abstracted 4 bit code for #F and #G are represented by 2 hexadecimal numbers respectively. In the example for #F, the hexadecimal is 0 and the 4 bits are 0000. Of note, the last column represents the F DA elements at positions 3,4,5 and this information will be used in the de-abstraction process shown later on.

FIG. 18 shows the same process for #G. The equivalence classes shown in the column G DA elements are all distinct from the F DA elements in FIG. 18.

In the implementation of deabstraction discussed below, only the 4 bits representation for the corresponding #F and #G functions of FIGS. 17 and 18 are used. Thus, for deabstraction if the abstraction codes were 6 or 5 bit codes, these code would be reduced to 4 bits according to these tables prior to deabstraction.

Tree Architecture for RAM

Referring now to FIG. 19, a system 300 that allows for use of universal input modules in tree-like structures is shown. Abstraction is performed top to bottom and de-abstraction (discussed below) is performed bottom to top. The branches of the tree structure are represented as binary code elements 302, 304, 306, 308 and 310 and 302', 304' (only ones shown). One set (302, 304, 306, 308 and 310) is for the input string V and the other set of branches (only 302' 304' being shown) is for the complement input string V'. That is, any module on top can be found by a binary address string starting from the bottom. This tree structure implemented in the abstraction and/or deabstraction engine is particularly suitable for use with Random Access Memory (RAM). The tree structure represents addresses in a random access memory.

In FIG. 19, two independent trees are shown. One tree 312 is for the user string V as depicted above the top row of the tree for V and the other is 312' for the complement of the user string V' depicted above the top row of the tree for V'(tree 312' for V' shown partially in phantom). In this example, the user string is 512 bits, however the user string can be of any finite, size. The top row of each tree represents a fundamental module of size 32. The fundamental 32 bit module is used to implement any finite user string of length L by the tree structure shown as any user string of finite length L will be packaged into 32 bit V and 32 bit V' blocks for the abstraction and also de-abstraction process. Any 32 bit module is abstracted to 16 bits or 2:1 and de-abstracted back to 32 bits or 1:2. This process occurs at each level of the tree structure and results at the end of the tree structure 2 pairs of abstraction codes. The tree structure depicts the abstraction and de-abstraction process for a user string example of 512 bits which in this example is reduced to 16 bits for a compression ratio of 512:16 or 32 for 4 bit code words). However, if the input string was $2^{16}$ or 65536 bits the string would be reduced to 16 bits or a compression ratio of 4096, etc.

Universal Abstraction Example

Referring now again to FIGS. 16A-1 to 16A-6 and FIGS. 16B-1 to FIG. 16B-10, an abstraction example for a 32 bit string is shown. V depicts an Abstraction example for a 32 bit string (normal) FIGS. 16A1 to A-6 and V' depicts the 1's complement to the user string V (complement) FIGS. 16B-1 to FIG. B-10.

The initialization stage of the abstraction engine starts at i=0 and goes to i=13 for both V and V'. The user data string V as well as the complement string V' starts at i=14 with k=1. Here at k=1 the DA bit is 0 for V and 1 for V'. The DA bit of 0 at k=1 determines that the intermediate #F and #G output functions are even. The result for #F is 12 and for #G it is 12, independently. The abstraction for user string V is shown in FIG. 16A-1. The end functions are at k=32 and i=56 and are FE=64 and GE=64. The abstraction for the complement string V' is shown in FIG. 16A-2. The end functions are at k=32 and i=77 and are FE'=23 and GE'=67. At this point, the 5 bit code for each end function (FE, GE, FE', GE') could be reduced to a 4 bit code or a hex number for each code that is either stored or transmitted as a byte. Another option is to take the 5 bit code for each end function and continue to use each one for the de-abstraction process resulting in the original input string, as will be discussed below. There is a 1:1 correspondence between the 5 bit code and the 4 bit code and vice versa, as shown in FIGS. 17 and 18. This correspondence is possible due to the equivalence relationship.

De-Abstraction Technique

Referring still to FIGS. 16A-1 to 16A-6 and FIGS. 16B-1 to FIG. 16B-10 and now also to FIGS. 20A-20D de-abstraction is shown. At each bit position "k" that is abstracted, one of the two strings V or V' will have the correct answer for the data position bit, either DA or DA', which was present in the original user string. The two different results will contain all the information required to make the decision of which is the correct decision leading to the answer. For example:

At $V, k=1, i=14, DA=0$

At $V', k=1, i=14, DA'=1$

As shown in FIG. 20B de-abstraction of V', for k=1 will lead to a no decision possible result and will therefore point to a correct decision at V, shown in FIG. 20A. At V the procedure decides that the original bit is DA=0 and that this is the correct result for the original user input data at k=1.

Another Example

At $V, k=7, i=22, DA=1$

At $V', k=7, i=23, DA'=0$

FIG. 20C shows that the result points to a no decision possible at V and therefore points to V', shown in FIG. 20D as the correct decision leading to DA'=0. This will lead to the correct answer of DA=1. This again is the exact DA value of the user input data at k=7.

De-Abstraction Example—Detailed Procedure Example

Figure 21:
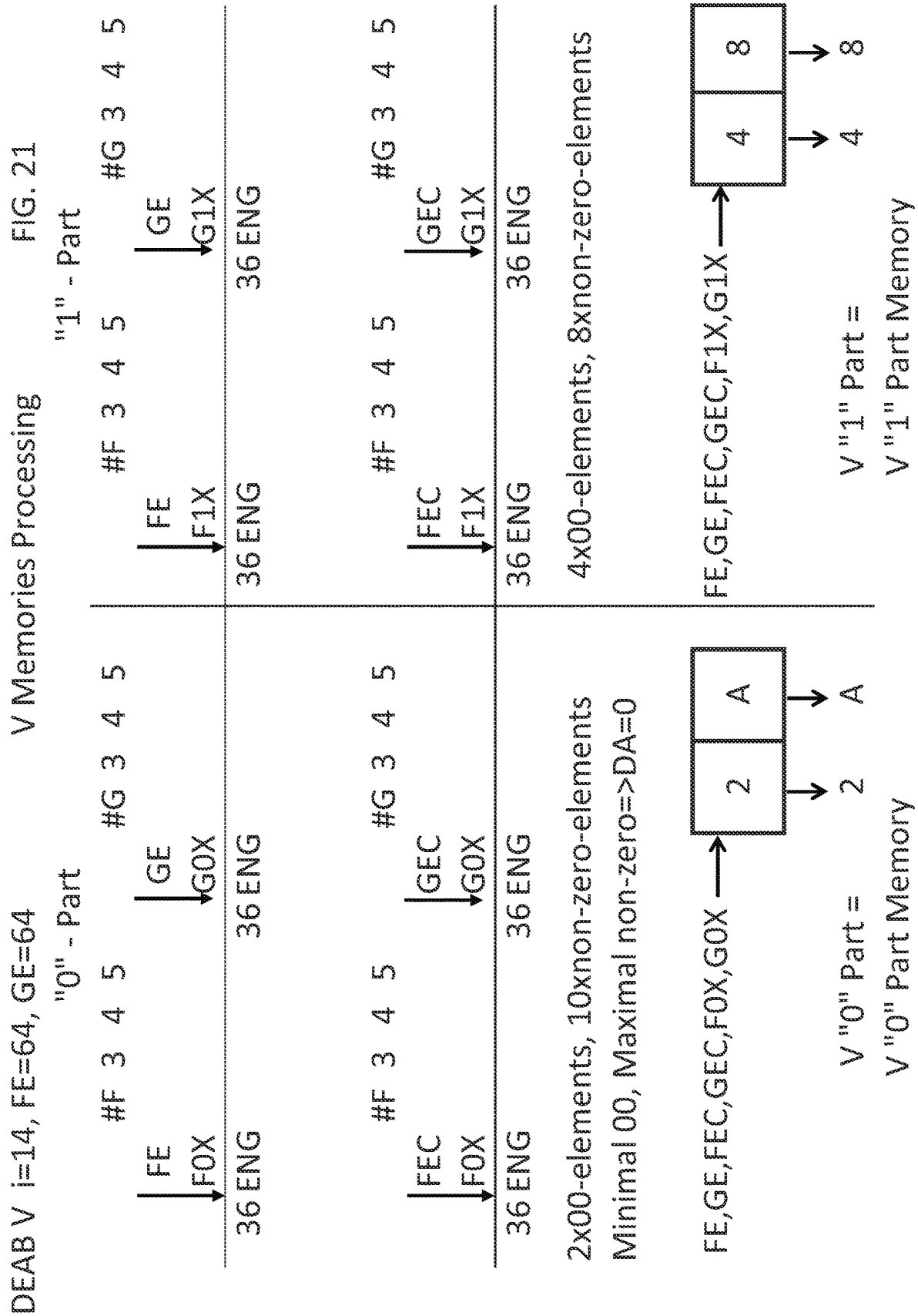
FIG. 21 is a table that depicts de-abstraction processing of memories for V, i=14, k=1

Referring now also to FIGS. 21 and 22, for k=1, the de-abstraction procedure uses the end functions FE, GE of the V string abstraction as the starting point for the de-abstraction. Also used are the even/odd complements of these end functions, referred to as FEC and GEC. FIGS. 21 and 22 depict the even/odd pair relations.

FIGS. 21 and 22 shows douplet operations. A douplet operation is defined as a multiplication of any two elements using the 36 engine. So in FIG. 21 (and also FIG. 22) a douplet operation is a multiplication operation of two elements FE, FOX using the 36 engine operator for col. 3, 4 and 5; as well as a multiplication operation of two elements GE, GOX using by the 36 engine operator for col. 3, 4 and 5; as well as multiplication operations of two elements FEC, FOX and GEC, GOX using the 36 engine operator for their respective cols. 3, 4 and 5. The results of these operations are 00 or non 00 elements, with the number of occurrences of such elements applied to min and max rules or max and min rules depending on the corresponding address bit AD for V or V' table.

Each of these even/odd pair relations for end functions FE, GE for the V string and the even/odd complements of these end functions FEC, GEC for the V' string is used to evaluate a possible DA of 0 or 1 at the desired value of k. This evaluation results in eight separate evaluations as follows. Each end function is followed by its DA element positions 3, 4, 5.

See details for FE=64, GE=64 and FEC=65, GEC=65.

Still referring to FIG. 20A, the k level to be de-abstracted follows next, in this case k=1, i=14. At that step the following values are known, FOX=12, GOX=12, F1X=13, G1X=13. Each one is shown with their respective DA element positions 3, 4, 5. Each possibility for 0 or 1 is then applied to end functions FE, GE, FEC, and GEC.

The downward going arrow indicates the direction of use of the 36 engine operator. The results are shown beneath the 3, 4, 5 element positions. There are four results for the "0 part and four results for the "1" part. The process next identifies the number of 00 elements and the number of non-zero elements. Result from the processing are the following:

For the "0" part there are 2×00 elements and 10×non-zero elements.

For the "1" part there are 4×00 elements and 8×non-zero elements.

The following rules are applied at this point and for all cases of non-equal results. If the AD bits of the non-equal results equal 0, then the minimum 00 element—maximum non 00 element rule applies. If the AD bits of the non-equal results equals 1, then the maximum 00 element—minimum non 00 element rule applies. For the present case, for V at k=1, the AD equals 0 and therefore, the min-max rule i.e., "the minimum 00 element maximum non 00 element rule." The "0" part fits that rule and is therefore the answer of DA=0 is provided as possibly corresponding to the bit in the original data string.

Referring to FIG. 20B for (k=1) the system de-abstracts the V' string as well as V' string and the abstraction end functions FE'=23 and GE'=67 have complements FEC'=22 and GEC'=66. Again the k=1, i=14 are known values and are applied and are shown as FOX'=12, GOX=12 and F1X'=13, G1X'=13. The 36 operator engine is again applies and this time the 36 operator engine gives results as follows:

For the "0" part has 4×00 elements and 8×non-zero elements.

For the "1" part has 4×00 elements and 8×non-zero elements.

The result shows "0" part="1" part which results in a no decision possible condition and points to the V string evaluation as the answer. Therefore, the DA=0 answer that was determined as the possible answer is correct and is indeed the original user DA input=0.

Referring now to FIG. 20C, a further example for k=7 is shown, for the V string. De-abstraction of V is in particular shown for k=7, 1=22 and FE=64, GE64 and FEC=65, GEC=65. The 0 or 1 options are as follows: FOX=18, GOX=62 and F1X=19, G1X=63. After the 36 engine operator is applied to the corresponding F DA and G DA elements the results yield:

"0" part has 3×00 elements, 9×non-zero elements.
"1" part has 3×00 elements, 9×non-zero elements.

The result is the same and will therefore lead to a no decision possible condition from the V string and point to the V' string.

Referring now to FIG. 20D, a further example of de-abstraction of V' for k-7 is shown, where k=7, i=23 and FE'=23, GE"=67 and FEC'=22, GEC'=66. At k=7 the 0 or 1 options for F' or G' are as follows: FOX'=44, GOX'=68 and F1X'=45, G1X'=69. Again the 36 engine operator is applied to the corresponding F DA and G DA elements and the results yield the following:

"0" part has 4×00 elements, 8×non-zero elements.
"1" part has 6×00 elements, 6×non-zero elements.

Applying the "Minimal 00 and Maximal non-zero" rule yields the "0" part as having the answer. This would be DA'=0. The inverse condition is DA=1 and this is the correct answer for DA at k=7.

Notice that the FE,GE are represented as even numbers in the above examples. The "Minimal 00 and Maximal non-zero" rule is applied for FE,GE even ends. Since FE',GE' are the complement strings they will be odd but follow the same rule.

If FE,GE are represented as odd numbers then the "Maximal 00 and Minimal non-zero" rule would be applied. The corresponding FE',GE' complement values would be even but follow the same rule.

Of importance is that at k=32 only and always:

For V, if DA=0 (even) then FE, GE will be even, If DA=1(odd) then FE, GE will be odd. For V', if DA'=0 (even), then FE', GE' will be odd, if DA=1(odd), then FE', GE' will be even.

The number of 00 elements and non-zero-elements are stored in V"0" and V"1" Part memories as well as in V' "0" and V' "1" Part memories. This is shown at the bottom of FIGS. 21 and 22. Here the input of the number of elements as hex numbers occurs during the abstraction phase and is readily available for the de-abstraction phase as shown by the arrows.

All other de-abstraction procedures are the same as described above and will result in the original DA user input bit.

During both abstraction and de-abstraction processes, the processes stop when a final permissible output function occurs at L=32 for the number of values of the fundamental modules. The length of the user bit string L is a multiple of 32. Therefore, for abstraction whenever a final permissible output function occurs at L=32 user bits at the last of all modules, the abstraction process stops and outputs a representation of the input bit string, as a pair of bit codes for V and a pair of bit codes for V' and the string length.

For de-abstraction, whenever a final permissible output function is evaluated for L=32 for the last of all modules, the original input bit string has been recovered by the de-abstraction process, and the deabstraction process stops and outputs the original input bit string. At the string length L=32 for the last of all modules all user data bits have been exactly recovered because the de-abstraction process is applied step by step for each permissible bit to find the correct data bit for all 32 bits in sequence for each of the modules.

Figure 23:
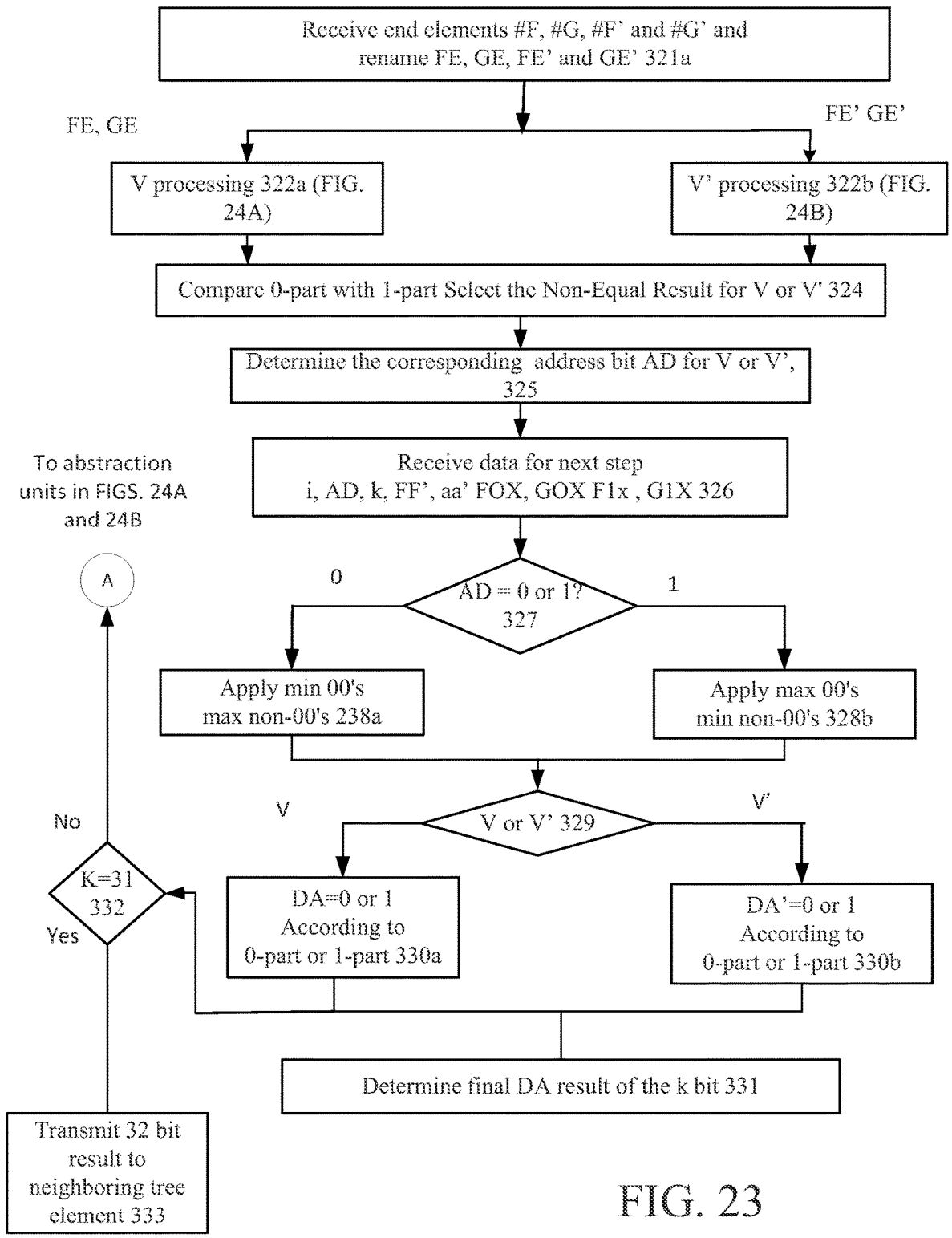
FIG. 23 is a flow chart of universal de-abstraction processing.
Figure 24A:
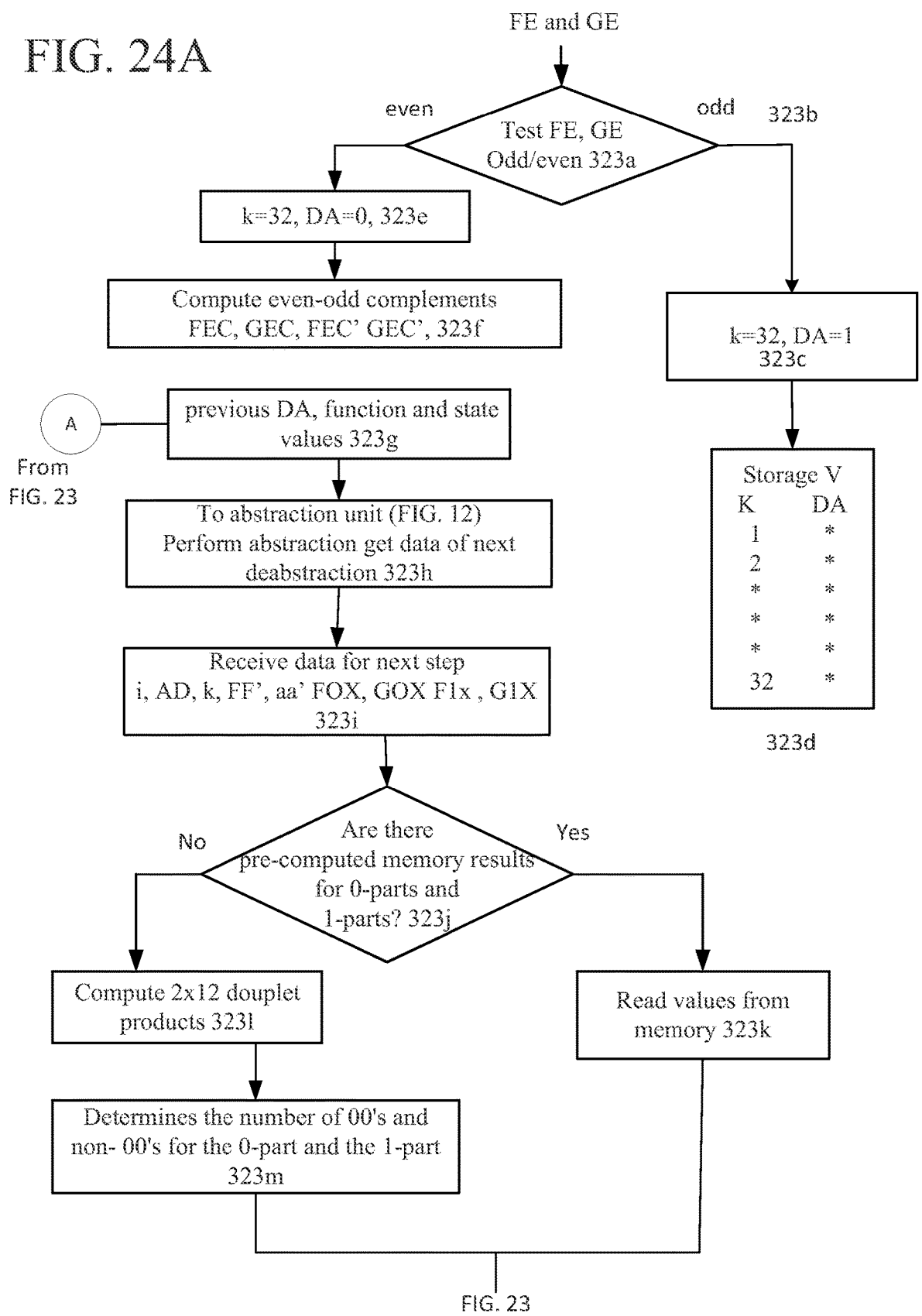
FIGS. 24A and 24B are flow charts of V and V' processing in the universal de-abstraction processing of FIG. 23.
Figure 24B:
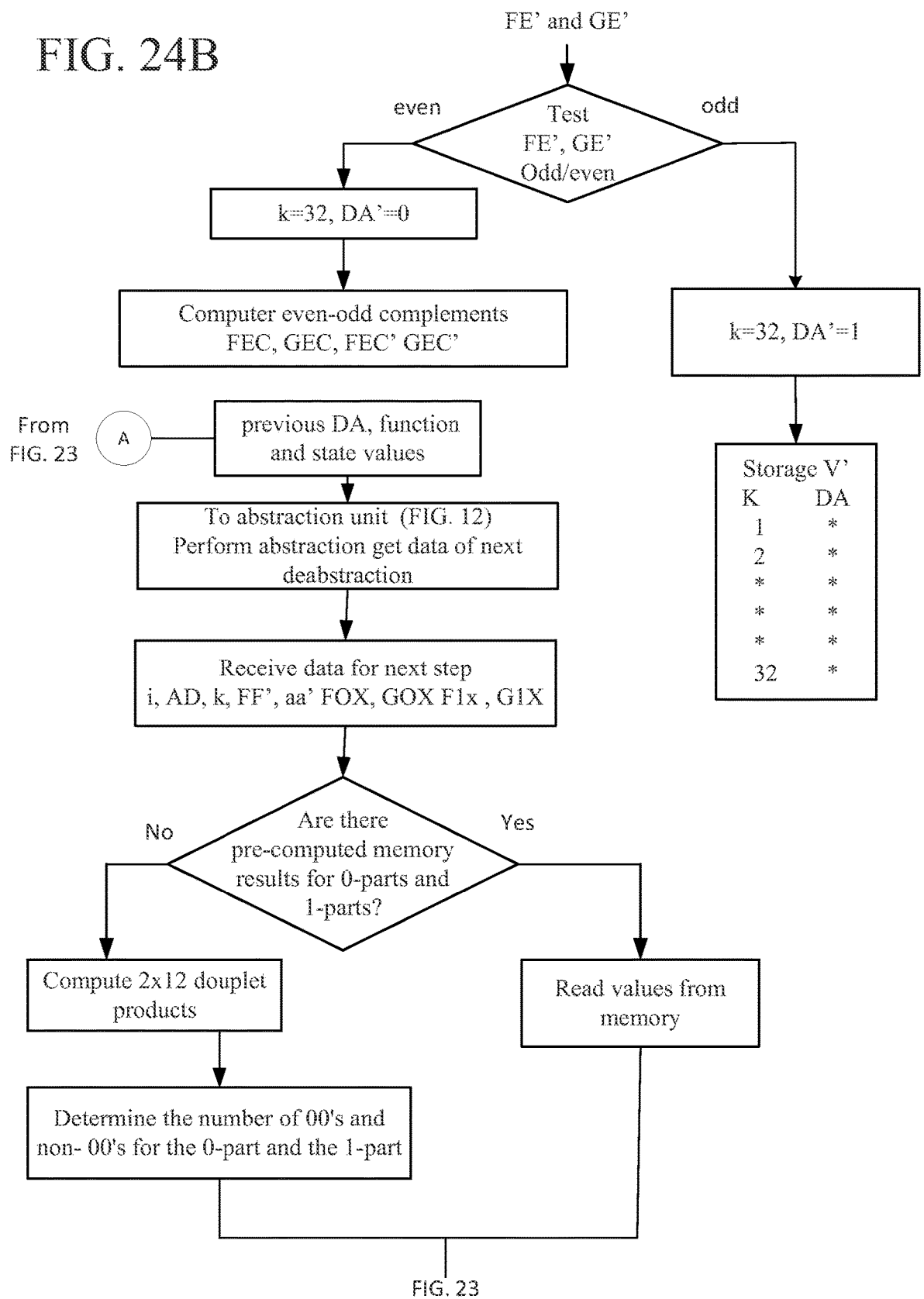
Figure 23A:
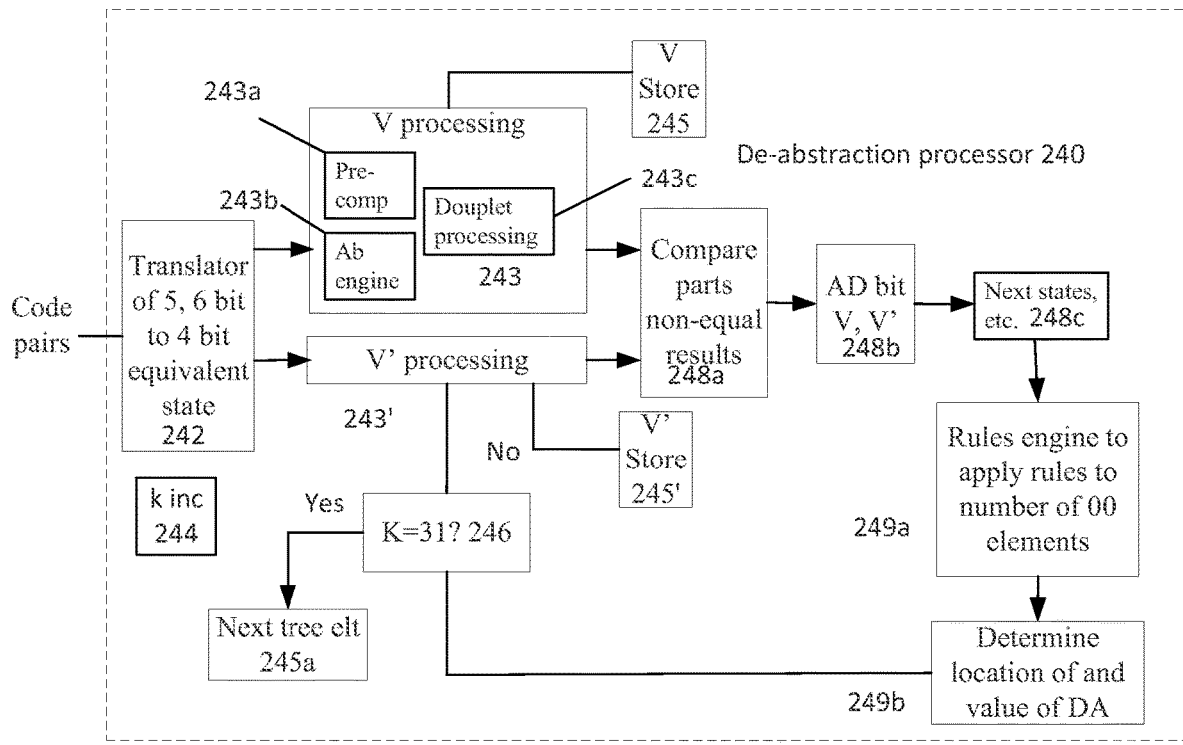
FIG. 23A shows a deabstraction engine.

Referring now to FIGS. 23 and 24A and 24B, de-abstraction processing 320 is shown using fundamental modules of 32 bits. The de-abstraction, receives end elements: #F, #G, #F', #G' that were produced from abstraction of a user input string. These elements are renamed elements, as FE, GE, FE', and GE' for clarity. These elements FE, GE and FE', and GE' are applied 322a, 322b to respective V and V' processing in FIGS. 24A and 24B respectively, to be described momentarily. From the outputs of the processing in FIGS. 24A and 24B respectively will be a number of 00 elements and non-zero-elements. The deabstraction processing compare 324 0-part with 1-part and select the non-equal result for V or V' and determines 325 the corresponding address bit AD for V or V'. The deabstraction processing receives 326 data for next step i, namely, AD, k, FF', aa' FOX, GOX F1x and G1X.

The deabstraction processing tests 327 AD. If 0, deabstraction processing applies 328a the "min 00's max non-00's" rule and if 1 deabstraction processing applies 328b the "max 00's min non-00's" rule" and a result of the application of the rules will determine whether the answer is found in V or V' 329 taking DA as DA=0 or 1 according to 0-part or 1-part, if in V 330a or taking DA as DA'=0 or 1 according to 0-part or 1-part if in V' 330b. The deabstraction processing determines 331 the final DA result of the k bit, tests 332 if k=32 and if not goes to FIGS. 24A and 24B processing, else transmits 333 32 bit result to neighboring tree element, and continues processing.

Referring now to FIG. 23A, a deabstraction engine 240 is shown. The deabstraction engine 240 includes a unit 242 that translates 6 and 5 bit abstraction code pairs into 4 bit codes, as needed. The deabstraction engine also includes V and V' processor engines 243 and 243' (that can be the same) that implement the processing shown in FIGS. 24A and 24B respectively. These engines 243, 243' include pre-computation processors 243a, abstraction engines 243b and douplet processors 243c to determine the number of 00's and non-00's for the 0-part and the 1-part. These engines 243, 243' feed the douplet processor 243c to determine the location (V or V') of and the correct value of the original input bit from V and V' stores 245, 245'. The deabstraction engine iterates 244 over k and tests 246 and sends 246a a completed result to the next tree element. The deabstraction processor 240 compares parts of non-equal results 248a, retrieves 248b the AD bit and next states 248c. The abstraction processor uses a rule engine 249 to apply the rules mentioned above, according to the number of 00 elements and determines 249b the location and value of DA.

Referring now to FIGS. 24A and 24B, these V and V' processing portions of the de-abstraction processing are the same, except that FIG. 24A operates on V and FIG. 24B operates on V' with modules of 32 bits.

FIG. 24A V processing 322a will be described in detail. The V processing 322a receives elements FE and GE (elements FE' and GE' are operated on in FIG. 24B for V' processing). These elements FE, GE are tested 323a. The last element of the V and V' process (k=32) is always computable by the sign of the end elements, and this if both are odd, 323b, k=32, DA=1, 323c and DA is stored, 323d at K position.

However, if both are even, k=32, DA=0, 323e.

V processing 322a computes 323f even-odd complements FEC, GEC, FEC' GEC', which are stored and used later in the V processing. The deabstraction engine uses 323g the previous values of DA and the states in order to determine the next value of the input string. Thus as shown in FIG. 24A, the abstraction unit (FIG. 12) is fed by the previous element (DA value and states) which for the k=1 is the last element of the initialization, and for k=2 would be the computed values of k=1 and so forth up to k=31, as k=32 had already been determined by the test step above. The abstraction unit (FIG. 12) performs 323h an abstraction on the previous values to obtain data values of next deabstraction. The V process receives 323i data for next step i, AD, k, FF', aa' FOX, GOX F1x, G1X and tests 323j if there are pre-computed memory results for 0-parts and 1-parts. If so, the V process reads 323k the values from memory. However, if there are not pre-computed memory results for the 0-parts, the V process computes 323l 2×12 douplet products and determines 323m the number of 00's and non-00's for the 0-part and the 1-part.

Similar processing 322b is performed for the V' module (FIG. 24B) which processing features are depicted but not mentioned herein, for brevity. The processing results 322a and 322b from both processes, the number of 00 elements and non-zero-elements, are further processed at 324 in FIG. 23, as discussed above.

Storage Device Implementation

Figure 25:
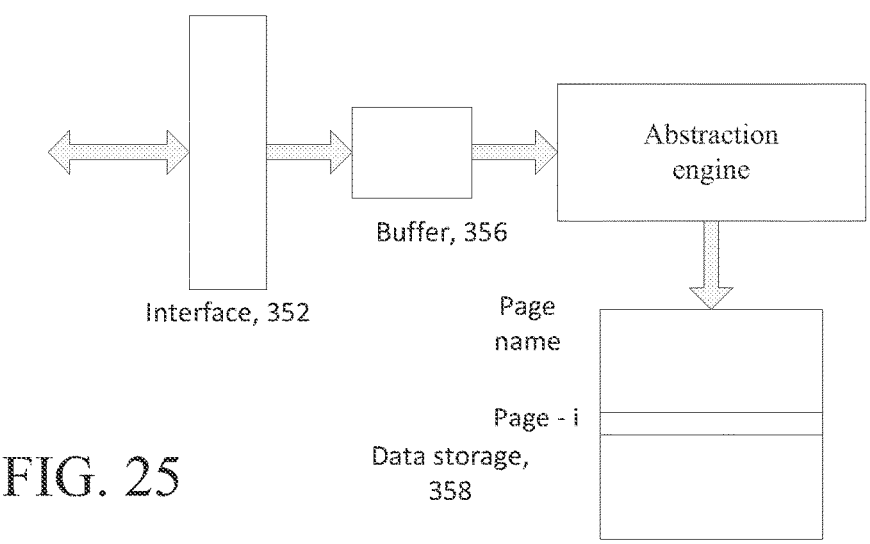
FIGS. 25 and 26 are block diagrams that depict write and read hardware implementations for storage/memory using abstraction and de-abstraction.
Figure 26:
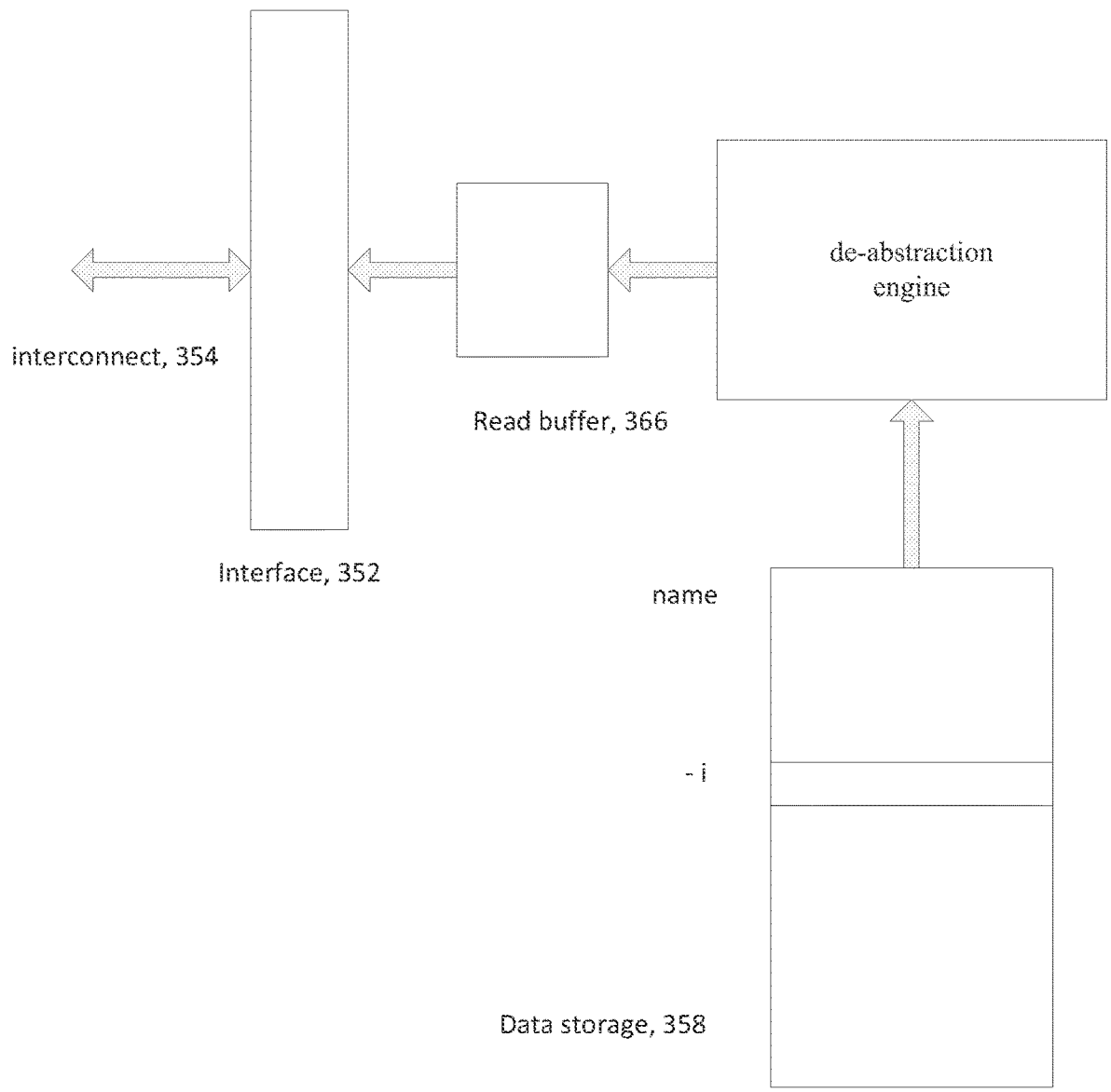

Referring now to FIGS. 25 and 26, an exemplary implementation of the abstraction/de-abstraction for a storage device 350 is shown. The storage device 350 includes an interface 352, an interconnect 354, a buffer 356, abstraction engine 37a and a data store 358 (optical, magnetic, ferroelectric, or semiconductor based storage). The storage device also includes conventional circuitry (not shown) required to write and read to/from the storage medium. This circuitry would vary depending on the technology employed for the storage medium. Moreover, this circuitry (not shown) would be fed by results (codes) from the abstraction engine 37a for storage of the codes into the storage medium 358 at an assigned storage location during WRITE operations and this circuitry (not shown) would also for READ operations feed the de-abstraction engine 37b with code words retrieved (or READ) from the assigned storage location in the storage medium 358.

While in some embodiments the data store is a storage medium that is an optical or a magnetic medium based, in other embodiments the storage medium is semiconductor-based devices. For non-volatile storage applications (and long-term persistent storage) the semiconductor storage medium 358 is typically non-volatile memory, (NVM) that retains stored information when power to the device is removed. Examples of suitable non-volatile memory include flash memory, ferroelectric RAM (F-RAM), MRAM (Magnetoresistive RAM). Memory devices such as DRAM or SRAM can be volatile or nonvolatile depending on whether the devices are continuously powered.

In some implementations, the long-term persistent storage can be accomplished by use of static/dynamic random access memory with un-interruptible power supplies (with appropriate back-up systems) in which volatile memory with continuous power application is used to provide non-volatility. Flash Memories are nonvolatile since they are self-contained. In addition, the above mentioned examples, new technologies such as F-RAM and MRAM are non-volatile.

The device 350 includes an interface 352 that interfaces the device to a system (not shown) via an interconnect structure, typically a storage bus 354 or fabric. The interface 352 receives data for storage from computer memory (main memory and/or cache memory not shown) over, e.g., the storage bus 354. The storage bus 354 can involve any of the well-known storage bus standards such as SCSI (Small Computer System Interface) or IDE (Integrated Drive Electronics) ATA (AT Attachment) or proprietary standards or standards that will be developed. The storage bus 354 would typically include data, address and control information (either as separate bus lines or separate transfer segments. The interface 352 can be a parallel or serial interface 352. Other implementations of the interconnect and thus the interface 352 besides a bus can include a high speed switching network, such as a fabric or a crossbar or a storage channel such as Fibre Channel. The principles involved in the storage implementation of abstraction/de-abstraction are not governed by the type of interface 352 employed.

Semiconductor Implementation

Described below is a mechanism for storage based on "pages," a fixed-length contiguous block of data that is used in, e.g., virtual memory systems. Typically, a page also referred to as "a memory page" or a "virtual page" is the smallest unit of data that is transferred between computer memory and storage. While, various page sizes can be employed, page size is typically governed by processor architecture and/or operating system. The number of pages depends on the size of the virtual memory supported by the computer architecture. In this embodiment the storage medium is a semiconductor based medium. The number of modules that are used in abstraction and de-abstraction could therefore be page size/32 bits.

The storage device 350 includes in addition to the interface 352, the buffer 356 that is coupled to the interface 352. While the interface 352 receives data from the interconnection 354, and may include formatting of the data for storage, the interface 354 sends the data to the buffer 356 interposed between the abstraction engine 37a (FIG. 2) and the interface 352. The buffer 356 in general can be of any size, and in general will be of a size that is sufficient to ensure no over write of data occurs. Thus, the size is based on the rate that the data is received from the interface, and the rate at which abstraction and storage can occur. The requirements can be less than a page or several pages worth of storage. In addition, the buffer can be a FIFO (first in first out) buffer structure. In some embodiments, the buffer may be part of the interface 352. That is, the buffer size is selected in accordance with the rate at which pages are received by the interface while taking into consideration the rate at which a page can be abstracted and stored by the abstraction engine 37a in the semiconductor storage medium.

With this particular application, the size of data written during a write to storage is always known, and is the same as the value of L (the input string length), which in this example is 4 KB. While in this example, the data written represents a page, in some implementations it could represent more than one page (i.e., several pages could be written.) The buffer 356 will typically send the data, a word or a byte at a time, depending on the interface 352 format to the abstraction engine 37a. In other implementations, other buffer sizes could be used for sending data to the abstraction engine 37a. Knowing the size L, the abstraction engine 37a can immediately operate on the data as it is read from the buffer 356. The abstraction engine 36 iteratively processes the data, as discussed above, and when having processed the entire 4 KB page worth of data, has extracted the two pairs of two code words that provided an abstracted representation of the input data received at the interface 352.

Operations using the storage device 350, such as writing to memory or storage (WRITE) and reading from memory or storage (READ) operate on an amount of data corresponding to one (or more pages). In the simplest example, the abstraction engine 37a will operate on a page at a time. The example of 4 KB is a common page size. The storage device 350 typically would store many such pages in the data storage 358. For example, the data storage 358 might have $2^{30}$ pages to form a four terabyte memory (i.e., 4 KB=$2^{15}$; and $2^{15} \times 2^{30} = 2^{45}$=4 terabytes). The device 350 stores the page in a location page i that corresponds to an address representing the page name (or page address) obtained from the interface 352 from address information transmitted over the interconnect 354.

In FIG. 25, during the WRITE command, the buffer 356 sends a page worth of data in the proper format to the abstraction engine typically a word or byte at a time, along with the page name. In the example, the data storage 358 has a storage medium that is implemented as semiconductor memory, e.g., DRAM or SRAM or Flash Memory or F-RAM or MRAM). In this example, the data storage 358 has a size of $2^{30}$ addresses. Each address would point to a pair of twelve bit data words (the two pairs of two six bit codes, e.g., #F, #G and #F' and #G'). In other implementations the five and four bit codes could be used.

In this example, each page name represents a 30 bit binary code address. Each page is a 4 KB bit string (32,768 bits). Thus L=32,768. The device considers each page (the 4 KB or 32,768 bit string) as an input data string, k to be abstracted. If not supplied as a string, the 4 KB block can be stored in the buffer 356, read out and operated on as a string. Each page will have an independent bit string with the same order and different content. This will result in options of the two pairs of either, 8, 10 or 12 bit code word results. For this example, two pairs of 12 bit code word results are produced by the abstraction engine 37a representing the data content of the page as V and V'. Each pair of the 12 bit data words is stored and used later in the de-abstraction process (reduced to 4 bit codes via FIGS. 17 and 18) via the interface 352 command and page name during a READ operation.

Referring now to FIG. 26, the command function READ is implemented by use of a de-abstraction engine. In the example, the page name (30 bit address) follows the command READ to the proper address of the $2^{30}$ addresses that contains the two pairs of 12 bit word of the corresponding abstraction. The storage medium through read circuitry (not shown) retrieves the two pairs of 12 bit code word at the address. The two pairs of 12 bit code word along with the length L (which in this example is fixed and thus known as 32,768 bits) can be de-abstracted to recover the original input string without data loss. The de-abstraction engine 37b is fed by the two pairs of code words retrieved from the storage medium 358 at the value of the page name or page address, here page-i. The de-abstraction engine 37b sequentially produces, starting at bit position 14 (k=1) and ending at 32,768, k=32,768 for 32,768/32 bit modules, the entire content of the page (as a de-abstracted bit string of the page).

FIGS. 25 and 26 show the storage device 350 as having two separate functional blocks one for WRITE (abstraction) and one for READ (de-abstraction). However, as discussed above, an abstraction/de-abstraction engine that shares code or logic can be used.

Figure 27:
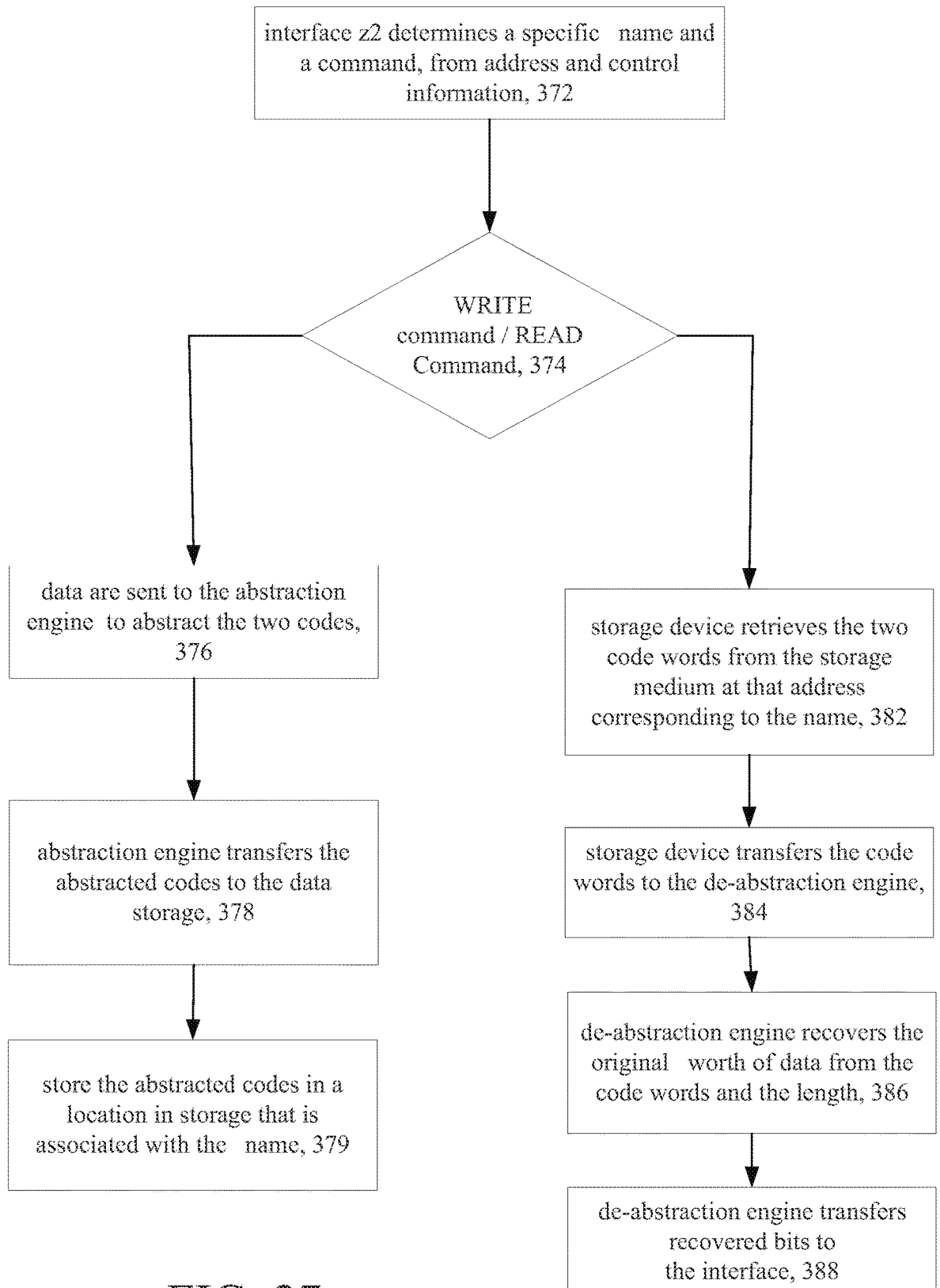
FIG. 27 is a flow chart for read/write in memory/storage.

Referring now to FIG. 27, the interface 352 determines 372 a specific page name and a command, from address and control information sent to the storage device 350 over the interconnect 354, e.g., the bus (or one of the other mechanisms). The basic commands are a WRITE command and a READ command. The interface 352 determines 374 whether it is a READ or WRITE operation. Other commands associated with the particular protocol may be used, whereas other commands that may be part of a particular known protocol may not be used.

Figure 35:
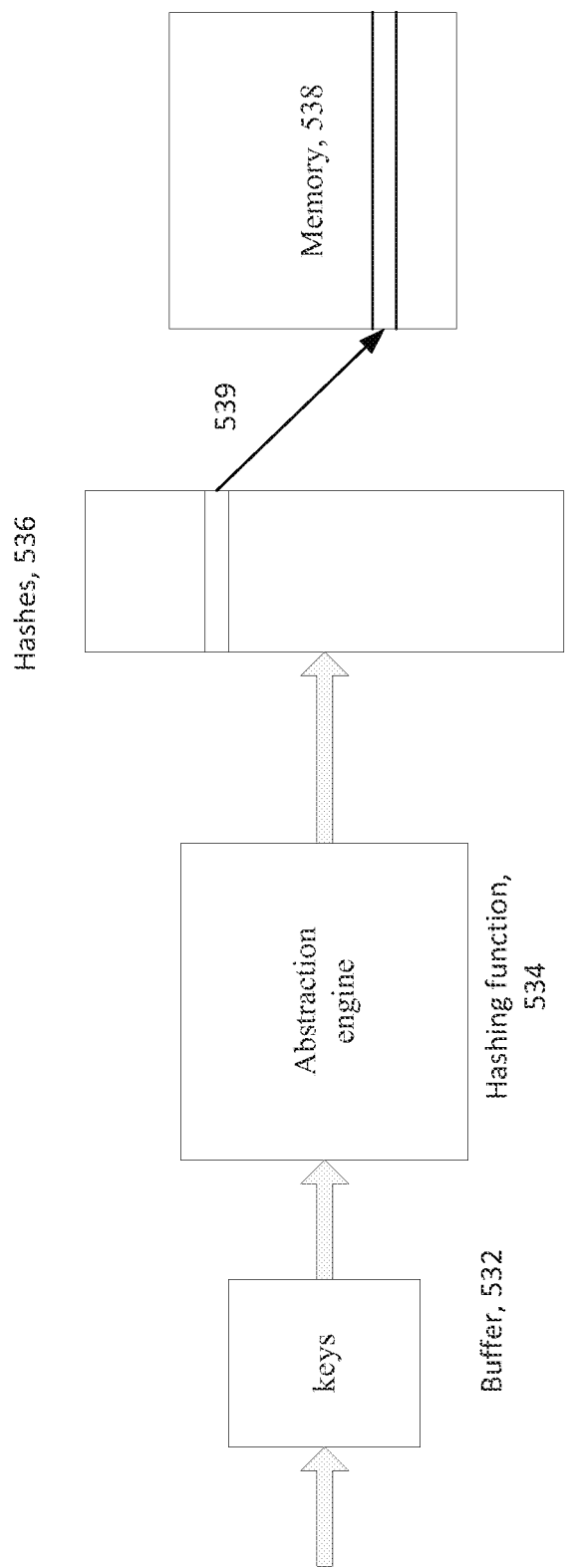
FIG. 35 is a block diagram that depicts a hashing arrangement.

During a WRITE command, data are sent 376 to the abstraction engine 37a to abstract the two pairs of two codes to represent the contents of the page by operating on data from the buffer until the length 4 KB has been reached (until L has been reached). The abstraction engine transfers 378 the two pairs of abstracted codes to the data storage 358 to store 379 the abstracted codes in a location in storage that is associated with the page name, e.g., as shown in FIG. 35 as Page i.

During the READ operation, the storage device 350 retrieves 382 the two pairs of two code words from the storage medium at that address corresponding to the page name. The storage device 350 transfers 384 the two pair of two code words to the de-abstraction engine 37b and the de-abstraction engine 37b recovers 386 the original page worth of data from the code words, and the length, again which is fixed and hence known. The de-abstraction engine 37b transfers 388 recovered bits either a bit at a time or in other increments to the buffer 356 and ultimately to the interface 352.

In one implementation, the de-abstraction engine 37b will sequentially transfer bit by bit the extracted bit string to a READ buffer 366 (a buffer that can collect the bit by bit de-abstracted results and transfer them as a block to the interface 352. From the READ buffer×6, the information is sent to the interface 352.

In multiprocessor systems a listing of typically presently used page sizes are as follows:
4 KB
8 KB
64 KB
256 KB
1 MB
16 MB
256 MB
2 GB The ratio of abstraction for a 4 KB page (e.g., the example above) is:

$$4 \text{ KB} \times 2^{30} \text{ pages} = 2^{15} \times 2^{30} = 2^{45} \text{ bits}.$$

The abstraction process reduces to an abstraction rate R as follows:

$$R = 2^{45}/2^{30} \times 16 = 2^{15}/16 => R = 1.25 \times 10^3 : 1.$$

The rate of abstraction for a 2 GB page is:

$$2 \text{ GB} \times 2^{30} \text{ pages} = 2^{34} \times 2^{30} = 2^{64} \text{ bits}.$$

The abstraction process reduces to an abstraction rate R as follows:

$$R = 2^{64}/2^{30} \times 16 = 2^{34}/16 => R = 1.25 \times 10^8 : 1.$$

For the other mentioned page sizes (as well as other pages sizes) similar calculations of the rate R can be done.

Implementation of Data Storage

Returning to FIGS. 25 and 26, shown are views of the storage device 350 for abstraction and deabstraction. The interface 352 interfaces the storage device 350 with a system bus. The device includes in addition to the interface an abstraction/de-abstraction engine 36 that includes length determination logic L, buffers, and a storage medium (not shown) that contains either the data corresponding to the separate and individual k strings when the command is abstraction or the separate and individual two pairs of 12 bit codes FE, GE, FE' and GE' (or equivalent 4 bit representations 16 bits) data contents when the command is de-abstraction.

As shown, if the system bus asks for storage of a certain k string (page), the device will use the abstraction engine 37a to generate the corresponding pair of 8, 10 or 12 bit data words. If the system bus requests retrieval of a pair of 12 bit data words, the storage device uses the de-abstraction engine 37b to regenerate (from the 4 bit representations) the corresponding input bit string.

The processes used here are similar to the processes used for storage based on "pages" as discussed with one difference. In the case above, the length L of the input bit string is always known because page size is defined by the underlying architecture of the system. In the case of data storage, the length L can be either variable or at least not initially known.

The length L can either be transmitted with the WRITE command (abstraction) or with the READ command (de-abstraction) and the system stores the pair of 12 bit codes and optionally the length. Alternatively, the system executing a WRITE command calculates the length L from the input string during the first abstraction (for fixed lengths) and stores the two pairs of 12 bit code and the length. For successive WRITE commands with fixed lengths, the system would not need to calculate or store the length.

For the READ command, the system retrieves the two pairs of 12 bit results and the length. In successive read commands, the user will then provide the length L and the two pairs of 12 bit results and the system applies equivalent 4 bit representations (FIGS. 17 and 18) as inputs to the de-abstraction engine and returns the input bit string. Alternatively, if the lengths are or can be different, the system calculates the lengths for each WRITE, stores the lengths "L" and returns the calculated "L" for the corresponding READ.

A few examples of applications of this approach include arbitrary variable data strings in database applications, audio recording, video recording, and similar applications.

Network Communication

Network communication, in principle, involves transmission and reception of data over a network that couples many systems or nodes. A packet switched network involves time sharing of a network communication channel for transmission and reception of user defined information over the communication channel. A circuit switched network involves switching of circuits to set up a dedicated path. Networks can be private networks or public networks such as the Internet.

Network communications involve a defined protocol. Protocols define formats and rules for exchanging messages among systems both in telecommunications and computing. Protocols often include signaling, authentication and error detection and correction capabilities. Many such protocols are in use today. Exemplary protocols include Ethernet, Local Talk, Token Ring, FDDI and ATM, TCI/IP etc. Communication protocols have various properties, such as whether they are connection-oriented or connectionless, whether they use circuit mode or packet switching, or whether they use hierarchical or flat addressing.

Irrespective of the protocol type and specific properties transmissions whether of packets or cells, etc., involve transmission of connection information such as connection identifiers or addresses, and data. Connection information portions of the transmissions normally define nodes, e.g., paths or systems or devices in a network over which the transmission occurs.

The data portion of the transmission is of particular interest for the abstraction/de-abstraction processing described herein. As used herein a "formatted unit of data" refers to any of the types of items carried by a network such as packets, cells, frames, etc. For example in a packet switching context, any data string in any time sharing section, independent of the length, can be abstracted at a transmitting node to two pairs of two codes, e.g., abstraction codes of 12 bits or less and used as the payload of the formatted unit of data. Correspondingly, de-abstraction of the two pairs of two abstraction codes in the payload of any formatted unit of data can be performed at the receiving node to recover the original input string. Thus, abstraction/de-abstraction also applies to either circuit or packet switching modes.

For protocols where the payloads can be of variable length, the payload can also include the size L of the input bit stream, whereas where the payloads are of a fixed size, the payload need not include the size L of the input bit stream. Further, where the payload is spread over plural, formatted units of data of variable lengths, the payloads can be processed as discussed below again with one or more of the transmissions including the size L.

Figure 28:
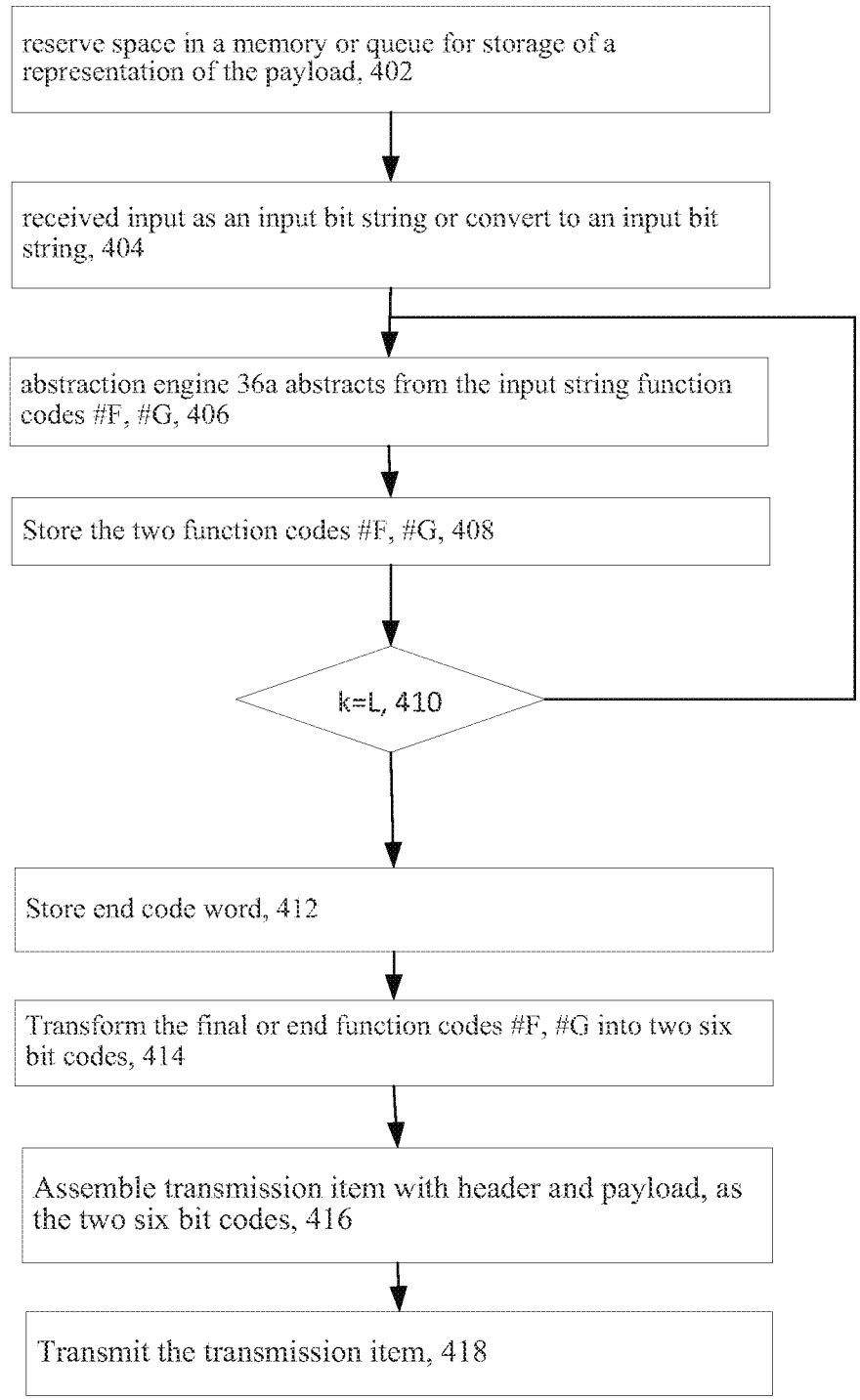
FIG. 28 is a flow chart that depicts transmission item formation for network transmission using abstraction.

Referring now to FIG. 28, an application will prepare a formatted unit of data, e.g., a packet or cell or frame, etc. for transmission using generally conventional techniques. However, the data portion (payload) of the formatted unit of data will be processed differently than is conventionally done. The application for processing of the payload will reserve 402 space in a memory or queue for storage of a representation of the payload. While this reservation is being made (or after the payload has been processed) the payload is processed. The payload either is received 404 as an input bit string or in situations where a series of bytes, words, etc. are received, is converted to an input bit string. The input bit string is sent to the abstraction engine 37a. The abstraction engine 37a operates 406 on the input string to abstract the two pairs of two codes, i.e., the function codes #F, #G and #F', #G'. The function codes #F, #G and #F', #G' are stored 408.

Where the payload is spread over plural formatted units of data, the payload is iteratively processed until k=L, 410 again with one of the transmissions including the size L. The final or end function codes #F, #G and #F', #G' are stored 412 and are transformed 414 into the two pairs of two six bit abstracted codes. The device will assemble 416 the formatted unit of data with header and payload, with the payload containing the two pairs of two six bit abstraction codes, and thereafter transmit 418 the formatted unit of data.

The example depicted below represents one time interval for each user with different data lengths (denoted by the dashed line between "DATA" and "end", where P stands for protocol and A stands for address. The results are described as 12 bits using 6 bit transformation of the end #F and end #G functions.

User 1 P.A. DATA---------------end Abstraction→P.A. 12 BITS (result)

User 2 P.A. DATA---------------------------------------end Abstraction→P.A. 12 BITS (result)

In general, there will be many users on a given channel at any one time due to time sharing, and over time, those users end transmissions and new users initiate new transmissions over the channel. All active users are organized by an address name and the temporary 12 bit data result of the last time interval. The 12 bit data result is used for transmission to the end node, and at the beginning of the next time interval for continued abstraction. The storage of the 12 bit result and transmission of the formatted unit of data occurs at the same time. The storage of the 12 bit result will be the unique beginning of the next time share interval of the corresponding user. The storage of the 12 bit result can occur in a memory device similar to the memory described in the storage discussion above. The memory used for storage of the payloads instead of using page names uses user names.

When a transmission of a communication is complete, the last 12 bit result is transmitted from memory, and the 12 bit data in the memory address of this user will be erased and the system will make that space and time slot available for another user. Memory management is used to organize the addresses of the memory. Existing software solutions provide translation and memory management between user names and their corresponding addresses. The final function codes along with the length of the string represent the string and which are used during de-abstraction to recover the input string. The input string can be converted back to whatever form the payload was originally in.

Figure 29:
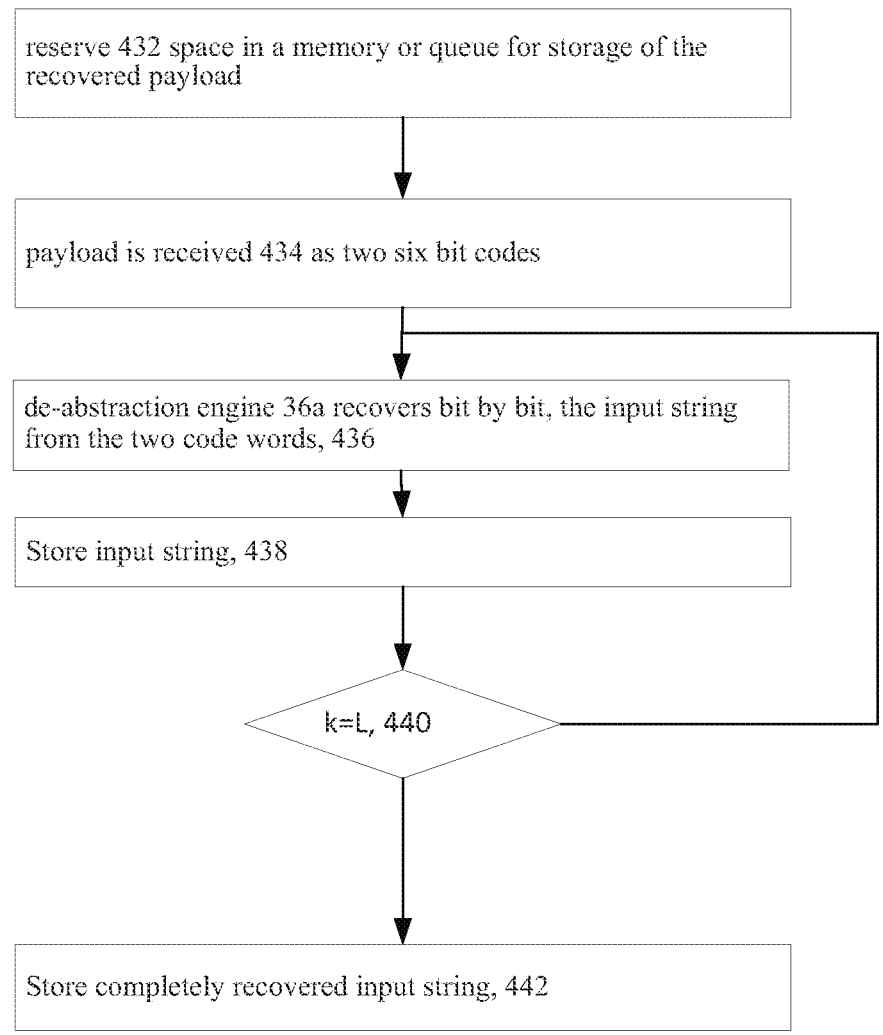
FIG. 29 is a flow chart that depicts transmission item payload recovery using de-abstraction.

Referring now to FIG. 29, an application will receive a formatted unit of data, e.g., a packet or cell using generally conventional techniques. However, for recovery of the payload from the data portion of the formatted unit of data, the payload will be processed differently than is conventionally done. The application for processing of the payload will reserve 432 space in a memory or queue for storage of the recovered payload (de-abstracted payload). While this reservation is being made the payload is processed. The payload is received 434 as two pairs of six bit abstraction codes that will be processed in the de-abstraction engine 37*b* to recover the input bit string. The de-abstraction engine 37*b* operates 436 on the two pairs of two bit abstraction codes to recover the input string bit by bit and the string is stored 438. When the string has been processed to reach k=L 440 the complete string has been recovered.

Where the payload is spread over plural transmissions, the payload is iteratively processed until k=L, 440. The device can stores the recovered input string 442 and can convert the string back to its original format.

Figure 30:
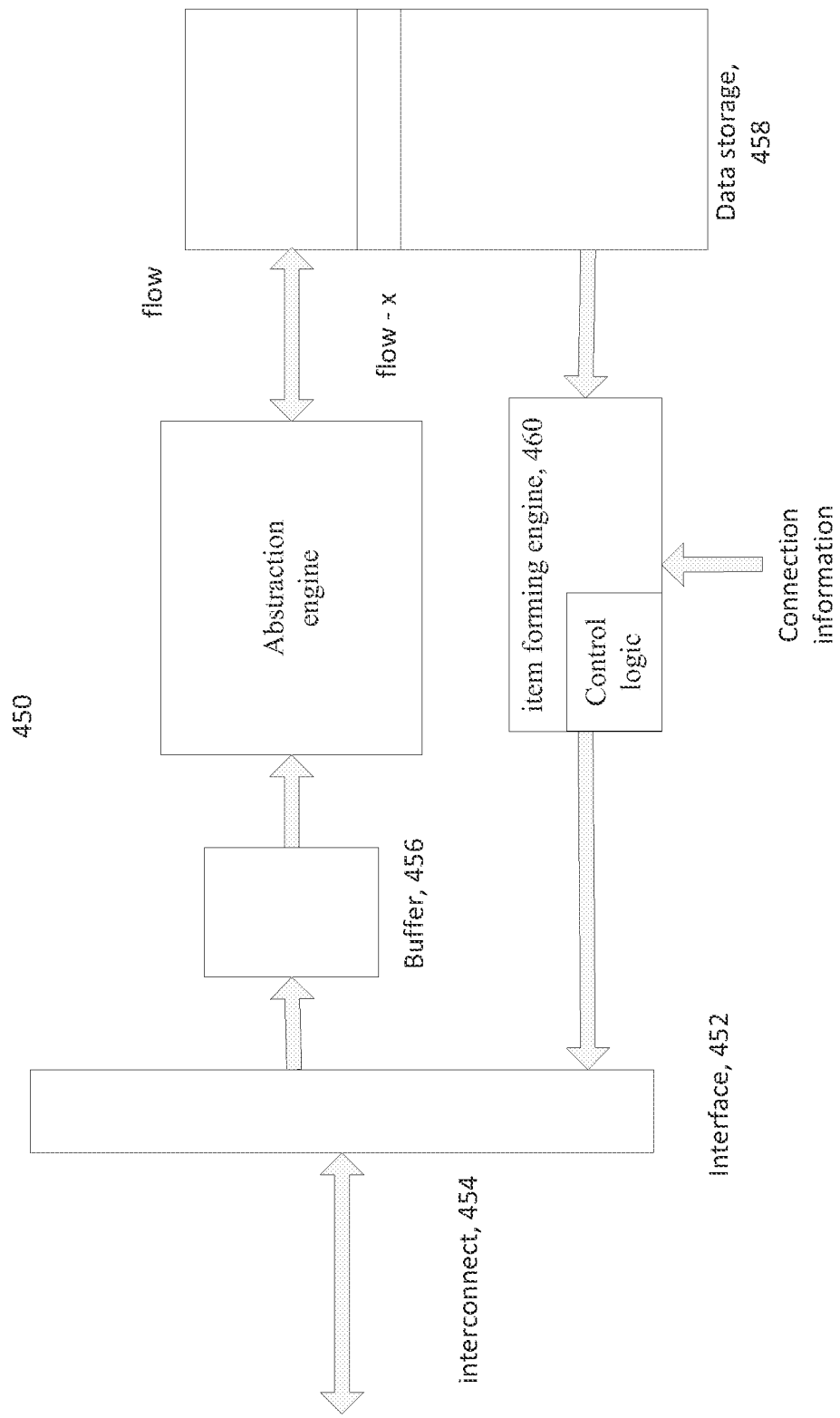
FIGS. 30 and 31 are block diagrams that depict item forming and payload extraction implementations using abstraction/de-abstraction.

Referring now to FIG. 30, a formatted unit of data forming engine 450 for forming cells, packets, etc. (according to the implemented protocol) is shown. Conventional details regarding aspects on queuing, header formation, and formatted unit of data formation, etc. are not illustrated for convenience. However, it is understood that payload (the data portion of the formatted unit of data) is at least modified to include in the payload the abstracted representation of the payload content rather than the actual content or a conventionally compressed aspect of the payload content. In an example, the formatted unit of data forming engine 450 includes an interface 452 that is coupled to an interconnect 454, an input string buffer 456 (similar in function as the buffer 356 discussed above for FIG. 25) and an abstraction engine 37*a*. The abstraction engine 37*a* forms function codes that are stored in storage 458 according to a flow name, "flow" with a flow –x illustrated. The formatted unit of data forming engine 450 also includes an item forming engine 460 with appropriate control logic that forms the formatted unit of data by combining connection information typically in a header (not shown) with a payload that is populated with a two pairs of abstraction codes. Once the formatted unit of data is formed, it is sent to the interface for transmission according to details of the protocol.

One thing to note is that because the payload will in general be of the two pairs of two abstraction codes the payloads will be smaller and hence the formatted unit of data small and thus time slots for transmission can be smaller and thus overall transmission rate of payload content higher.

Figure 31:
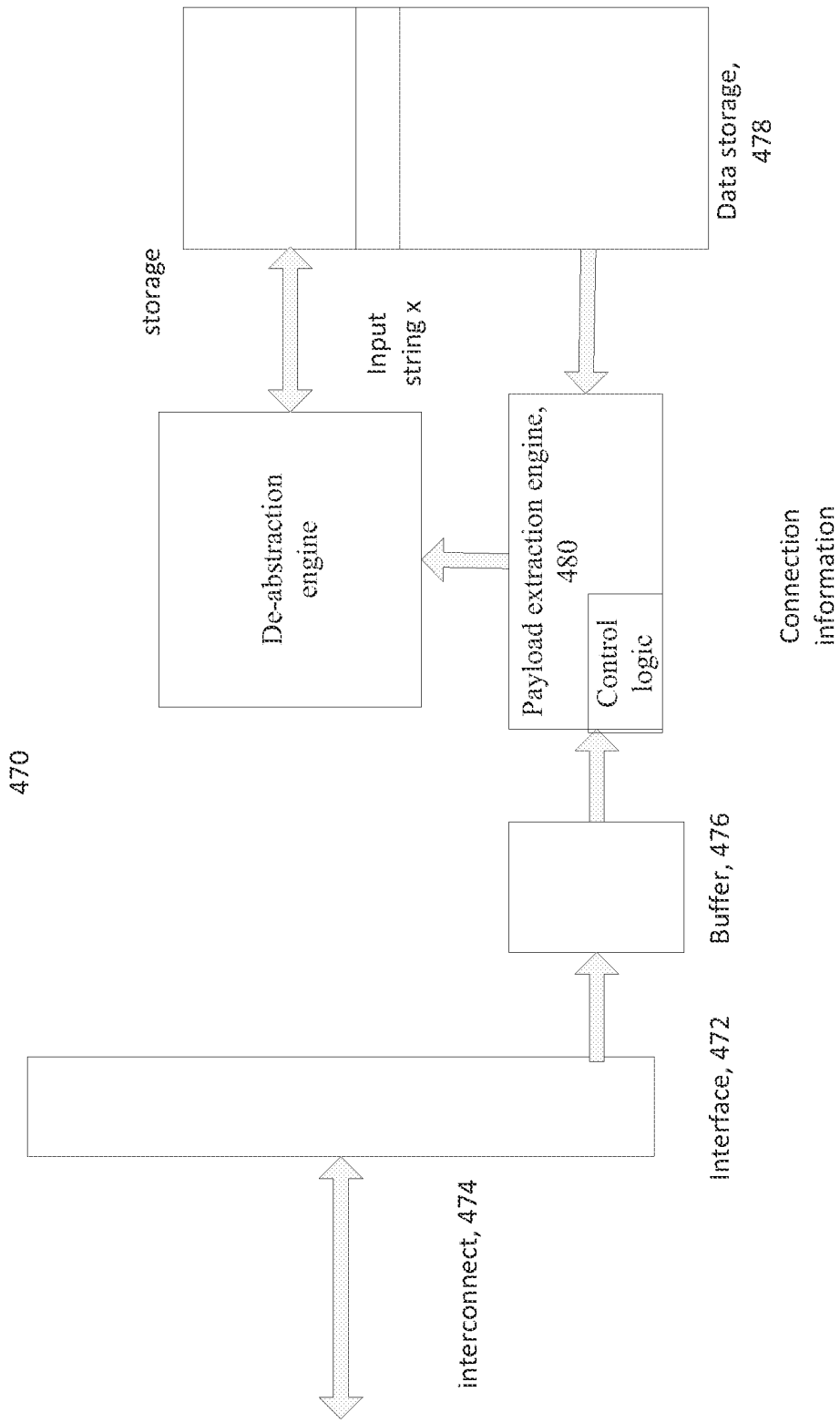

Referring now to FIG. 31, a formatted unit of data payload extraction engine 470 for receiving cells, packets, etc. and removal of payload (according to the implemented protocol) is shown. Conventional details regarding aspects on queuing, header extraction, and payload extraction, etc. are not illustrated for convenience. However, it is understood that the payload extraction is at least modified to remove from the payload the abstracted representation of the payload content and to recover from that abstracted representation of the payload content the input bit stream.

In an example, the formatted unit of data payload extraction engine 470 includes an interface 472 that is coupled to the interconnect 474, an item buffer 476 (that can be used to buffer incoming formatted unit of data) and a de-abstraction engine 37*b*. The de-abstraction engine 37*b* recovers the input bit stream from function codes that are in the payload and stores the recovered input bit stream in storage 478 according to a flow name, "flow" with a "flow –x" illustrated. The formatted unit of data payload extraction engine 470 also includes a payload extraction engine 480 with appropriate control logic that extracts the payload from a received formatted unit of data. Once the payload is extracted, it is either sent to the de-abstraction engine, as shown, or can be stored in storage 478 (or another store) according to specific implementation details. Moreover, depending on the specific implementation, the storage can be the storage discussed above or can be more conventional memory.

One thing to note is that because the payload will in general be of the two pairs of two abstraction codes, payloads will be smaller and hence the formatted unit of data smaller and thus time slots for reception can be smaller and thus overall reception rate of payload content higher.

Additionally, while FIGS. 30 and 31 are shown as separate devices for some embodiments, in other embodiments the functionality of these devices would be implemented in a single device that would share some of the described circuitry and/or features.

Cryptography

The abstraction/de-abstraction engine 36 can also be used for cryptography. Cryptography, in the form of encryption, involves the conversion of information from a readable state to apparent nonsense, and de-encryption, involves the conversion back of that apparent nonsense into readable text. Encryption and de-encryption and can be accomplished by the abstraction/de-abstraction engine 36. Specifically, the abstraction/de-abstraction engine 36 can be used for symmetric encryption.

Encryption

Figure 32:
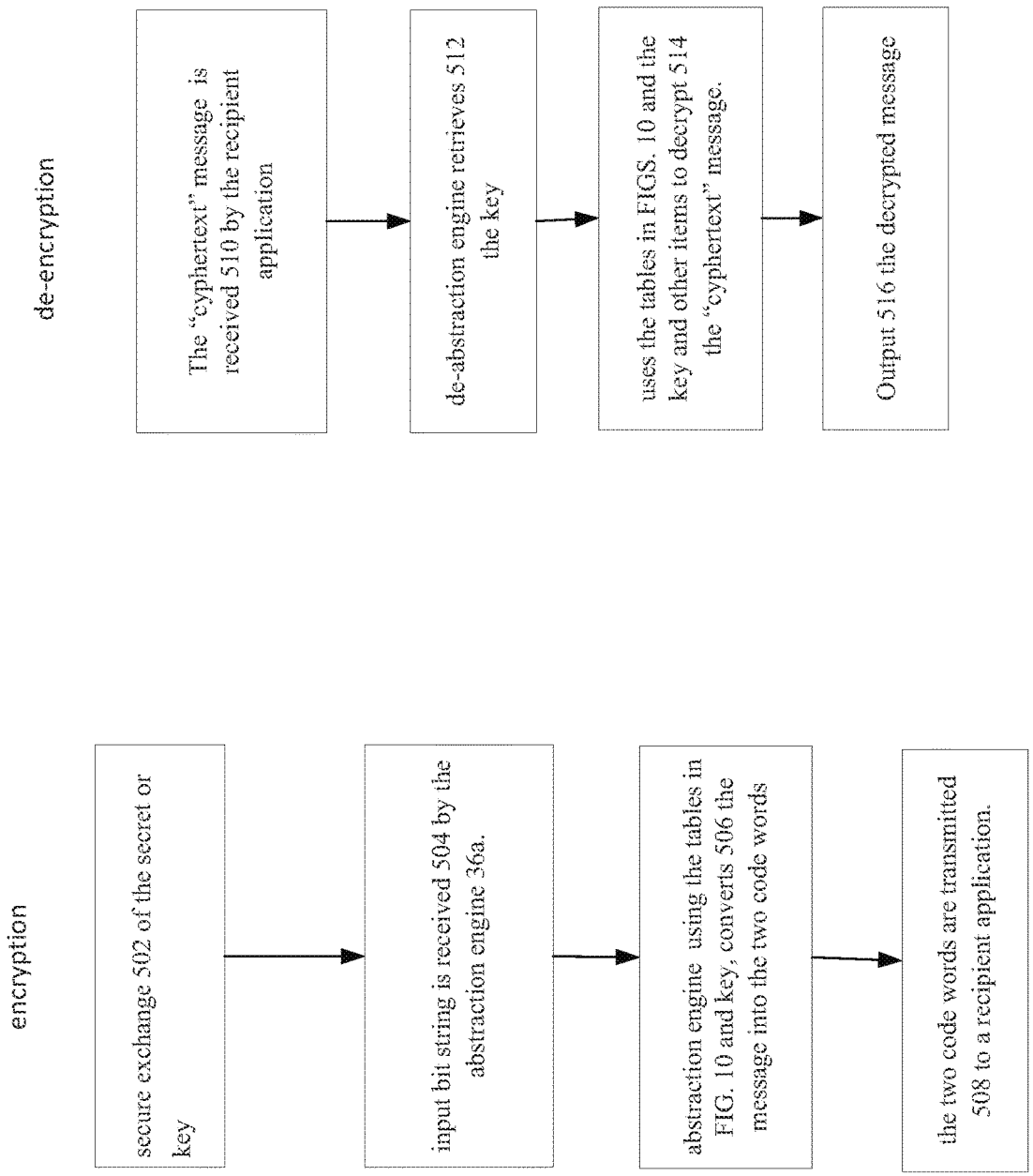
FIGS. 32A, 32B are flow charts that depict encryption/de-encryption using abstraction/de-abstraction.

Referring now to FIG. 32A, as shown, there is a secure exchange 502 of a secret or key that will used to decrypt the "cyphertext." This can occur prior to or after transmission of the message. In this case, the exchange is of one or more of the limit string, AD string or the specific permutation used to transform the end #F and end #G functions, as discussed below. The selection of the type of key can be automatic, e.g., the encryption application will generate, e.g., a random permutation of for example, the transformations of the #F and #G functions. Alternatively, the type of key used for encryption can be user selectable.

An original message (i.e., input bit string) is received 504 by the abstraction engine 37a. This original message is in plaintext or clear text. The message is fed to the abstraction engine 37a, which using the tables in FIG. 10, and a specific limit string, AD string and transformation permutation converts 506 the message into two code words (and which along with the length of the string) uniquely represents the message in a compressed form.

This compressed form however is also an encrypted form because in order to convert this representation or "encrypted message" back into clear text, the "decoding" needed to recover the original information requires de-abstraction and more specifically the knowledge of how the plaintext was abstracted. Knowledge of how the plain text was abstracted requires in addition to knowledge of the abstraction/de-abstraction processing, the "secret" or "key", which here is one or more of the limit string, the address string and/or the specific permutation used for the transformation of the end #F and end #G functions into the two pairs of two codes.

Specifically regarding the transformation, there are $=2.537 \times 10^{178}$ possible permutations for the transformation of the end #F and end #G functions, (when 6-bit code transformations are used). Thus, the two pairs of two code words can be considered "cyphertext", but in a very compact form, unlike other approaches, and are transmitted 508 to a recipient application. The recipient application can be an application on the same machine that was used to encrypt the received message or can be on a different machine.

This form of encryption is akin to a symmetric form meaning that there is a secure exchange of the secret or key that would be used to decrypt the message. In this case, the exchange can be accomplished in various known ways, such as using another encryption algorithm (e.g., a public key cryptography algorithm) to secure the key and exchange the key in a secure manner or build the key into the application in a secure manner or have an unrelated exchange of the key or a manual exchange of the key and so forth.

De-Encryption

Referring now to FIG. 32B, the "cyphertext" message that is sent is received 510 by the recipient application and is subsequently decrypted (the apparent nonsense is converted into the original message. The cyphertext is fed to the de-abstraction engine 37b. The de-abstraction engine retrieves 512 the key, and the other items mentioned above (those of the limit string, address string and transformation permutation that were not part of the key), and using the tables in FIG. 10, the other items that were not part of the key (typically the specific limit and address strings) and the key to decrypt 514 the "cyphertext" message. Thus, any one or all of the limit bit string, address bit string and the specific permutation used for transformation of the end #F and end #G functions is/are exchanged in a secure manner (depending on which one(s) of those items is the key) with the recipient application, executing the de-abstraction. The message is decoded by the de-abstraction engine 37b using the tables of FIG. 10 and these items. To the extent that only one of these items, namely the limit bit string, the address bit string and the specific permutation used for transformation, is used as the key, the remaining items can be exchanged in an non-secure manner or built into the application.

The de-abstraction engine 37b will recover the original message (input bit stream) and output 516 that message (input bit stream). The de-abstraction engine 37b thus operates on the two pairs of two code words over the length of the input bit stream to recover the original input bit stream.

Features of the Keys

Generation of the address bit string (index i, FIG. 5B) and the limit data bit string (index m, FIG. 5A) are produced by a random process. For example, these are generated by a random sequence generator, e.g., by a computer operating system library or manually, as discussed above. Thus, for specific security between two users, a unique separate random process for string i and string m are used. In addition, at the end of the abstraction, the possible 64 elements of 2×6 bits are transformed by two random permutations, one for the function end #F and one for the function end #G.

Referring now to FIGS. 33 and 34 two random permutations of the 64 elements are shown. One permutation is for end #F function and one for end #G function. Each of the end #F and end #G functions has $64!=1.26 \times 10^{89}$ random permutations. Together, the total number of random permutations is $64! \times 64!=1.58 \times 10^{178}$ possibilities, as mentioned previously. This requirement provides extreme security even without consideration of the random limit strings and address strings. The transformation with these random permutations at the end of abstraction will be used in opposite direction at the beginning of de-abstraction.

Accordingly, the general modern cryptography assumption that a strong cryptographic algorithm is based around computational hardness assumptions, making such algorithms hard to break in practice by any adversary, is provided by this approach, with the added advantage that transmission or storage of the cypher is very compact. While as with any computational encryption it is theoretically possible to break, it is infeasible to do so with the abstraction process described. This scheme is thus a computationally secure mechanism.

Hash Function

A hash function is an algorithm or routine that maps large data sets of variable length items referred to herein as "hash keys" or "keys" to smaller data sets of a fixed length. For example, persons' names have a variable length. This information could be hashed to a single integer serving as an address to a memory. The values produced by a hash function are called "hash values."

Referring now to FIG. 35, a buffer 532 can store keys that are applied to a hashing function 534 that uses the abstraction engine 37a. The abstraction engine 37a provides hashes 536 that are used to map the keys to an index 539. In general, a hashing function 536 may map several different keys to the same index, e.g., a location in memory 538 (termed a collusion that should be avoided/minimized) where a record at the index 539 associated with the key is stored. Therefore, each index 539 of a hash table is associated with a set of one or more data records, rather than a single data record. The abstraction engine 37a produces hash values for very large-sized keys requiring various fixed length index results. For example, a 128 byte key (1024 bits) might require from 8-32 bit index results.

Figure 36:
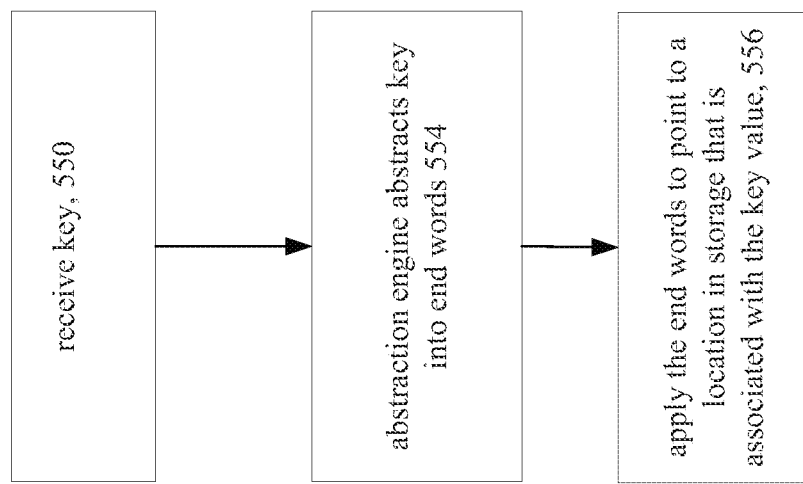
FIG. 36 is a flow chart that depicts a hashing arrangement.

Referring now to FIG. 36, to produce a hash value, the system receives 550 the key, here the 128 byte key. The system abstracts 554 the 1024 bits into four "end words" i end-0 to i end-3. The system applies 556 the end words to point to a location in memory associated with the key value. The end words are as follows:

i end-0 #F3,4 and #G3,4 each containing 4 bits=8 bits=order 0-7, i end-1,#F3,4 and #G3,4 each containing 4 bits=8 bits=order 8-15, i end-2,#F3,4 and #G3,4 each containing 4 bits=8 bits=order 16-23, i end-3,#F3,4 and #G3,4 each containing 4 bits=8 bits=order 24-31, These four sets of functions #F, #G are the permissible ends of the hash function based on abstraction of the 1024 bits.

Referring now to FIGS. 37A and 37B, these figures show 4-bit minimal representations of the abstractions for #F and #G for 4 bit codes. In case where six bit or five bits codes are used, i.e., 2×6 or 2×5 end functions, the 6 or 5 bit code end functions can be transformed into the above 2×4 bit codes. For example, the transformation of 2×6 to 2×4 can be as discussed above.

The above 32 bits can be used from 8 to 32 bit index values. These values can be used as addresses to memory for data sections correspondingly pointed to by the key. Either the entire data record pointed to by the key or the abstracted record of 12 bits produced by the abstraction engine 37a can be retrieved from memory 538.

When abstraction engine 37a is also used to compress the data record content, i.e., the input bit string, the de-abstraction engine 37b is used to recover the input bit string.

Cryptographic Hash Functions

Cryptographic hash functions can also be provided by abstraction/de-abstraction.

Figure 38:
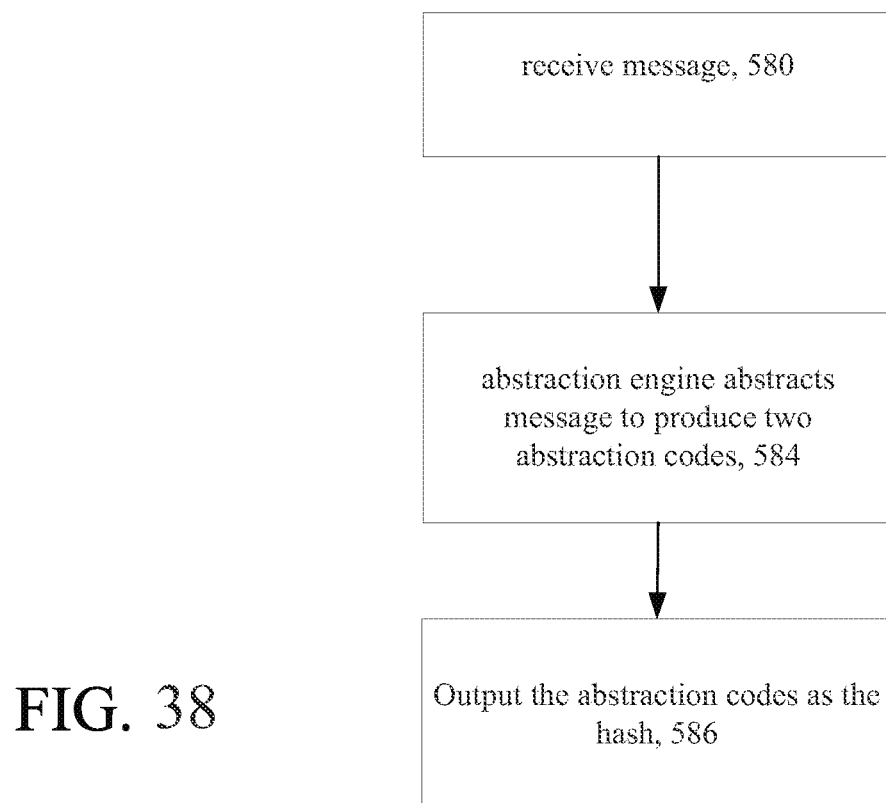
FIG. 38 depicts a flow chart for a cryptographic hash function using abstraction codes.

Referring now to FIG. 38, abstraction engine 37a receives a message 580 of any finite length L and performs 582 an abstraction to output 584 two abstraction codes. The abstraction codes correspond to a short, fixed length hash of the input message using as the hash function a transformation permutation and the abstraction engine 37. A cryptographic hash can be used in various applications such as in a digital signature. Because the abstraction two pairs of two codes are produced by the abstraction engine that requires knowledge of the abstraction process, knowledge of the limit and AD strings and the permutation used to code end #F and end #G it would provide a good hash function, since an attacker would have difficulty finding the message and the hash function that produced the same hash result.

Message Authentication Codes

The abstraction engine 37a can also be used for message authentication codes, which like cryptographic hash functions, except that a secret key can be used to authenticate the hash value upon receipt. The secret key is one of the limit string, the address string or a transformation permutation.

Figure 39B:
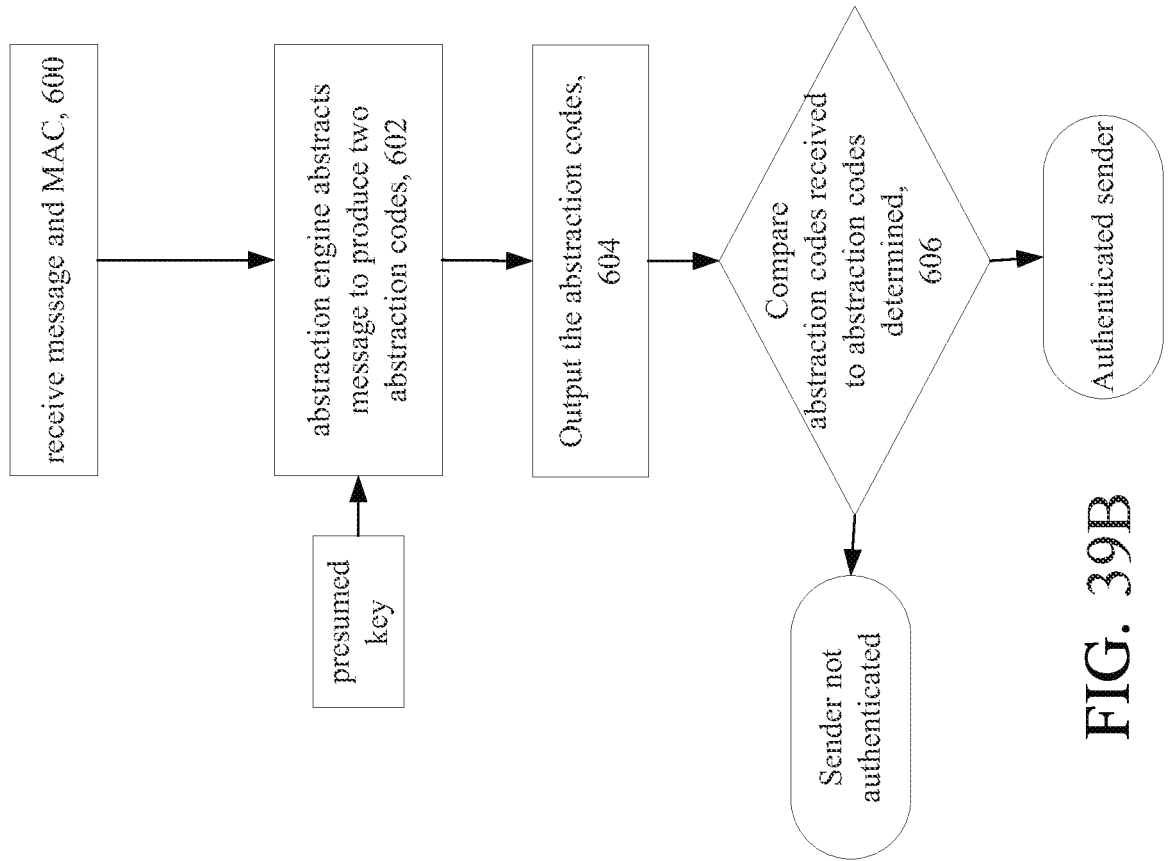
FIGS. 39A and 39B depict flow charts for message authentication code formation using abstraction codes and verification using de-abstraction of the abstraction codes.
Figure 39A:
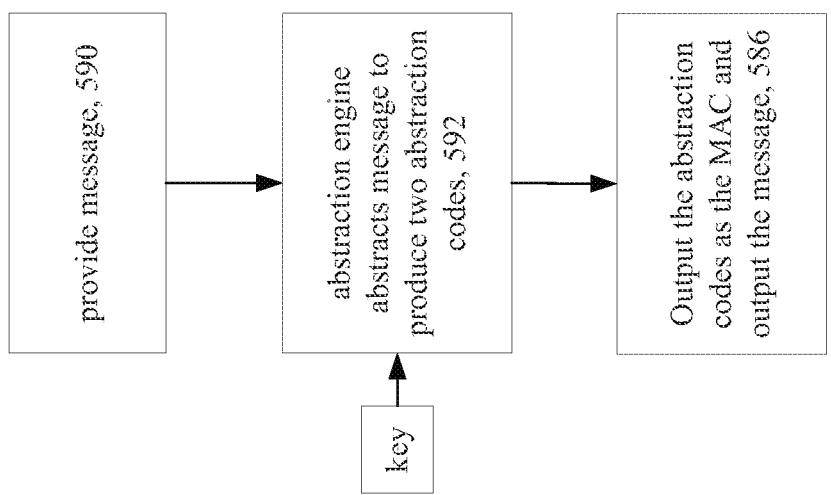

Referring now to FIG. 39A, a sender provides a message 590 and the sender runs 592 the message through the abstraction engine 37a producing two pairs of two abstraction codes, using the key to authenticate the sender and the message. The two pairs of abstraction codes are coded by the key, and the abstraction engine outputs 586 the message and the abstraction codes as the MAC (message authentication code).

Referring now to FIG. 39B, a receiver, receives the message 600 and runs 602 the received message though an abstraction engine 37a using a stored key (the same key that was used to authenticate the message from the authentic sender and which was exchanged or agreed upon prior to sending of the message). The receiver presumes that the stored key authenticates the sender of the message as the authentic sender. The abstraction engine outputs 604 the resulting abstraction codes. The receiver compares 606 the two sets of two pairs of abstraction codes, i.e., the set received with the message and the calculated set.

If the sender and receiver used the same key and the message was not altered or corrupted, then the abstraction codes will be the same and thus, the receiver can be assured that the sender of the message is the authentic sender and the message is authentic. If the abstraction codes are different then the receiver knows that something is wrong, either an old key was used or the sender is not the authentic sender or the message was corrupted or otherwise altered during transmission.

Parallel Configurations

Figure 40:
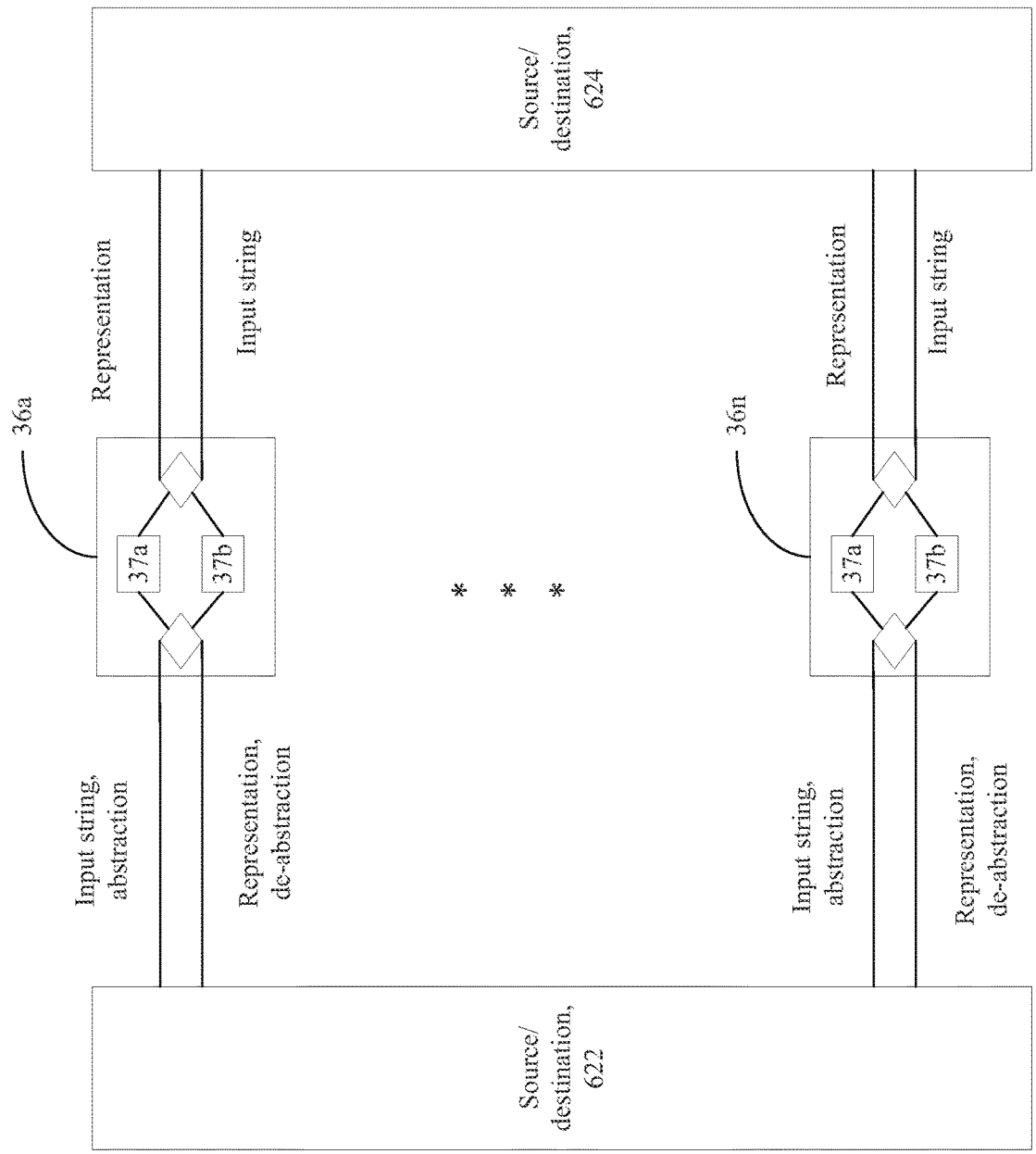
FIG. 40 is a block diagram of a parallel abstraction/de-abstraction implementation.

Referring now to FIG. 40, an exemplary parallel configuration of abstraction and de-abstraction is shown. This exemplary configuration can be used with any application, but is especially useful where the source data, e.g., the input, is not in a serial form. The parallel configuration obviates the need for parallel to serial and serial to parallel conversions for abstraction and de-abstraction respectively and can be more efficiently executed.

The configuration includes source/destination 622 and destination/source 624 devices. These devices 622, 624 source/receive data in a parallel format. For example, source/destination 622 could be a bus and destination/source 624 could be a memory that receives data from the bus during WRITE operations and during READ operations the destination/source 624 (memory) sends data to source/destination 622 (bus).

The configuration 620 also includes a plurality of abstraction/de-abstraction engines 36a-36n, typically of a number corresponding to the data width of the source/destination 622 and destination/source 624 devices. For example for a system having a 32 bit wide bus there could be 32 such engines.

Figure 41:
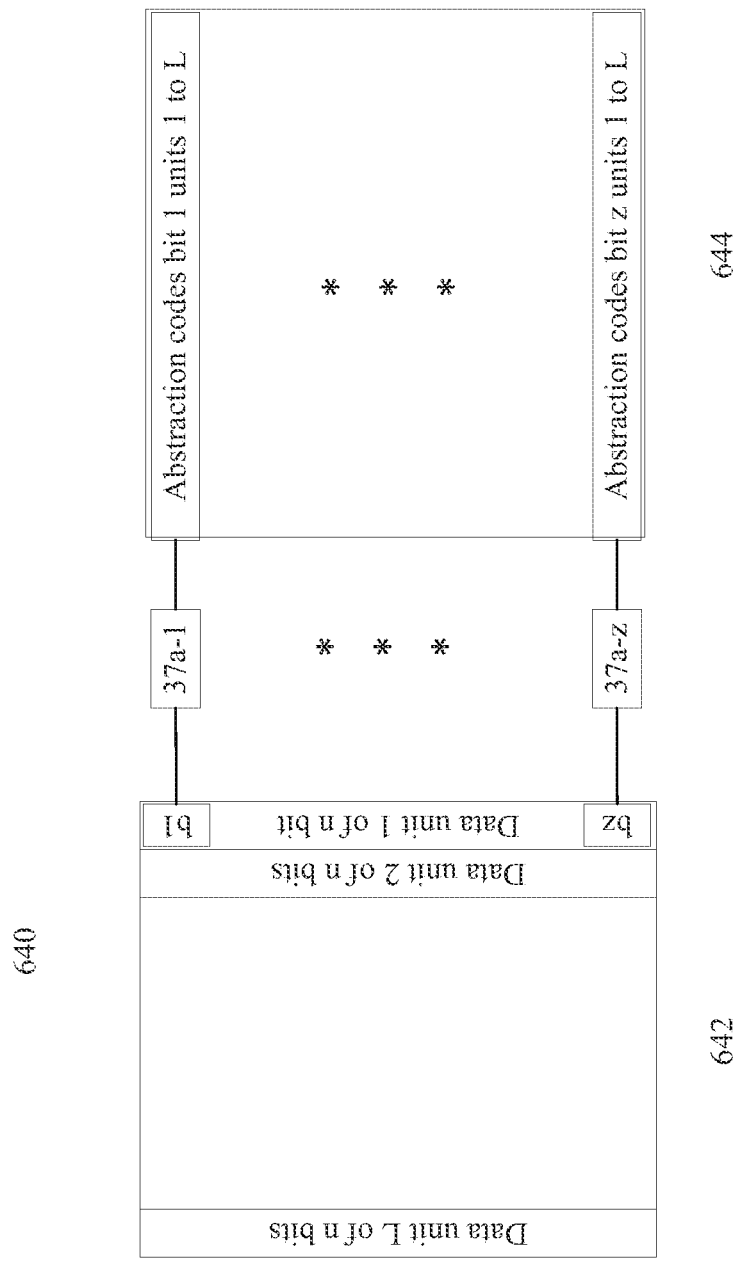
FIG. 41 is a block diagram of a parallel abstraction implementation.

Referring now to FIG. 41, a parallel abstraction configuration 640 is shown. The configuration 640 includes a device 642, such as a register, a buffer, memory etc. The device 642 here a memory has L number of entries where L is the length of an input bit string. Alternatively, the device 642 could have fewer than L number of entries and could have storage for a single data unit provided the rate at which the device is filled is less than the rate at which abstraction occurs. The entries in the memory are data units comprising plural bits (1-z) organized as e.g., bytes, words, long words, quad words, etc. Each bit position of data units are assigned to one of abstraction engines 37a-1 to 37a-z, as shown. The abstraction engines 37a-1 to 37a-z produce plural abstraction codes, one set of abstraction codes per bit position for each block of L data units. Thus, each abstraction engine 37a-1-37a-z operates over bit positions rather than data units. The abstraction codes are, e.g., stored in memory or storage 644 (as shown) and/or can be transmitted or otherwise used according to the particular application.

Figure 42:
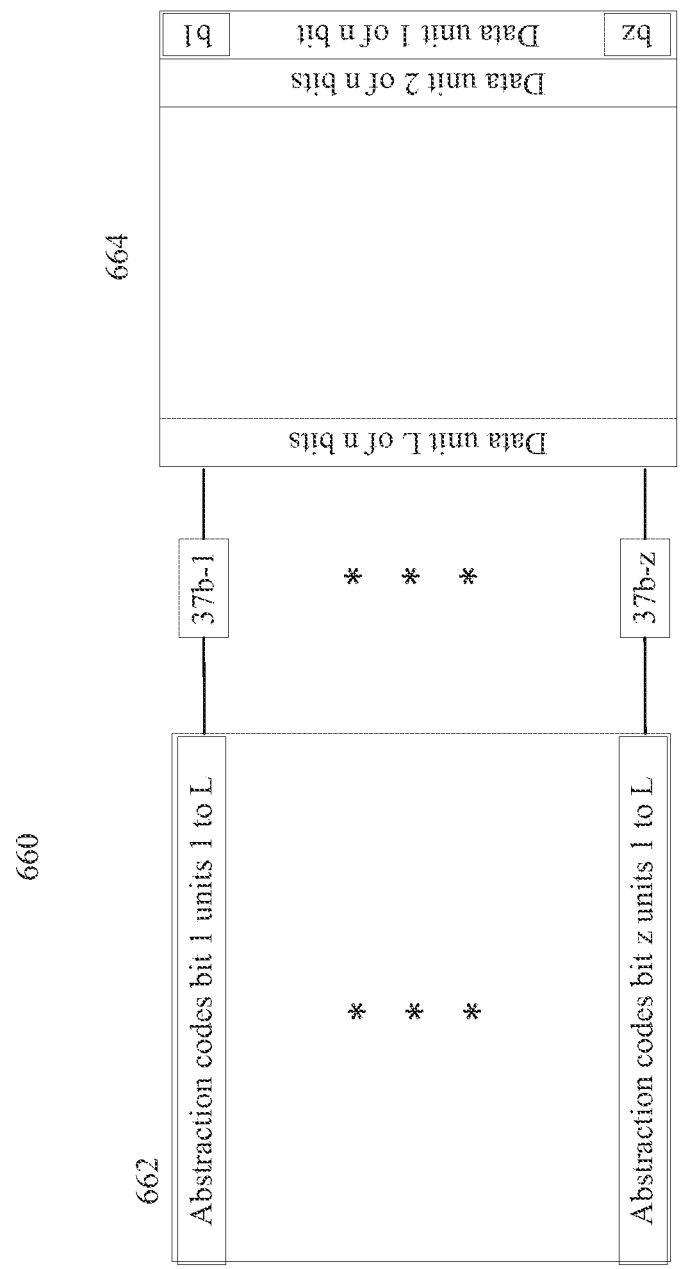
FIG. 42 is a block diagram of a parallel de-abstraction implementation.

Referring now to FIG. 42, a parallel de-abstraction configuration 660 is shown. The configuration 660 includes a device 662, such as a buffer, memory etc. The device 664, here a memory, has z number of entries where z is the width of the data units that will be recovered. The entries in the memory 662 are abstraction codes. Each bit position of the memory 662 is assigned to one of plural de-abstraction engines 37*b*-1 to 37*b*-*z*, as shown. The de-abstraction engines 37*b*-1 to 37*b*-*z* recover plural data units a bit position at a time. Thus, each de-abstraction engine operates on a bit position, recovering from the abstraction codes in each bit position data bits of the data units. The recovered bits provided by the de-abstraction engines 37*b*-1 to 37*b*-*z* can be stored in a device 664 and/or can be transmitted a recovered data unit at a time.

Document/File Compression/Decompression

Any of the abstraction and the inverse de-abstraction operations (discussed above) can operate on a file or abstraction codes that represents an electronic version of a document produced from user applications, such as portable document format applications, e.g., Adobe Acrobat, PDF writer, Doro Writer, word processing applications such as Word and WordPerfect, spread sheets such as Excel and document presentation applications such as PowerPoint and Visio. The abstraction operation could be built into the user application or could be an add-on to the user application.

Abstraction and de-abstraction functionality can be provided by a computer program product that receives an input bit string or receives the two codes and string L with either the abstraction or de-abstraction tables (stored, e.g. in memory or computer storage or other approaches) abstracts the two pairs of two six bit codes or returns the input bit string according to whether the processing is abstraction or de-abstraction. The abstraction and de-abstraction functionality can be provided in separate routines or circuitry.

The devices can be any sort of computing device. For example, the devices can be a mobile device, a desktop computer, a laptop, a cell phone, a personal digital assistant ("PDA"), a server, an embedded computing system, a special purpose computing device, a signal processor device, and so forth.

Server can be any of a variety of computing devices capable of receiving information, such as a server, a distributed computing system, a desktop computer, a laptop, a cell phone, a rack-mounted server, and so forth. Server may be a single server or a group of servers that are at a same location or at different locations.

Server can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory. A bus system (not shown), including, for example, a data bus and a motherboard, can be used to establish and to control data communication between the components of server.

Processor may include one or more microprocessors. Generally, processor may include any appropriate processor and/or logic that is capable of receiving and storing data, and of communicating over a network (not shown). Memory can include a hard drive and a random access memory storage device, such as a dynamic random access memory, machine-readable media, or other types of non-transitory machine-readable storage devices. Components also include a storage device, which is configured to store information, code, etc.

Embodiments can be implemented in digital electronic circuitry, or in computer hardware, firmware, software, or in combinations thereof. Embodiments can also involve pipelining of various computational stages. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example these techniques can be used for other applications and there can be other configurations. Further still network devices can be of various sorts including routers, switches, interface cards, network processors and so forth. Accordingly, other embodiments are within the scope of the following claims.

What is claimed is:

1. A computing device implemented method comprises:
   receiving by a computing device that includes an abstraction engine, an input bit string having a finite bit length L;
   producing by the computing device from the input string, the one's complement of the input string;
   iteratively calculating by the abstraction engine in the computing device from the input string a first set of pairs function codes corresponding to the bits in the input string, and from the one's complement of the input string, a second set of pairs of function codes corresponding to the bits in the one's complement of the input string; and
   returning by the computing device, the first and second pairs of function codes from the first set and the second set of function codes which were calculated at the bit length L, as a set of abstraction codes that correspond to a representation of the input string, with the representation having fewer number of bits than the input bit string.

2. The device implemented method of claim 1, further comprising:
  initializing the abstraction engine in the computing device, by:
    applying a set of known system values to the abstraction engine to provide beginning conditions for calculating the first and second sets of function codes.

3. The device implemented method of claim 1 wherein iteratively calculating further comprises:
  iteratively determining the first and second sets of function codes over a fundamental module number of bits of the input string and the fundamental module number of bits of the one's complement of the input string.

4. The device implemented method of claim 1 further comprises:
  transforming by the device, the first and the second set of function codes calculated at the finite bit length L into the set of abstraction codes.

5. The device implemented method of claim 2 wherein initializing the abstraction engine defines beginning conditions as a fixed row.

6. The device implemented method of claim 2 wherein the set of system values applied for initializing are six values that are prepended to the input string and processed through the abstraction engine prior to processing of the input string.

7. The device implemented method of claim 1, further comprising:
  a table including values of function codes for system initializing values, a present set of inputs, and values of a next set of inputs.

8. The device implemented method of claim 7 further comprising:
  iteratively choosing the function codes by evaluating each bit of the input bit string according to a set of present inputs and prior state to provide the function codes and the next set of inputs.

9. The device implemented method of claim 1 wherein calculating the set of abstraction codes further comprises:
  iteratively determining a DA bit and a DA' bit according to a bit position of the input bit string, by:
    testing for a limit condition for the data bit in the bit position:
    when a limit condition is not encountered, using the data bit from the input bit string and the one's complement according to the bit position; or
    when a limit condition is encountered, using for the DA bit and the DA' bit, a limit bit and limit bit complement, at least one of the limit bit and limit bit complement provided from a limit bit table according to an limit table index value.

10. The device implemented method of claim 1 wherein calculating the set of abstraction codes further comprises:
  testing for a limit condition for a bit in a bit position of the input string; and for an encountered limit condition,
  determining the type of limit condition encountered; and
  using a limit bit and limit bit complement and/or random states according to the type of limit condition encountered.

11. The device implemented method of claim 10 wherein for the limit detect condition a substitution of a function code is made for one or both of the computed function codes according to whether one of or both of the function codes encountered the limit detect condition.

12. The device implemented method of claim 9 wherein a limit condition is a limit transition condition, and occurs when for an input bit and a present input of an AD bit or an AD' bit or the DA bit or an DA' bit, for computed next states of the function codes have the same values.

13. The device implemented method of claim 12 wherein for the limit transition condition a substitution of the computed next states is made for one or both of the computed next states according to whether one of or both of the set of functions encounter the limit transition condition.

14. The device implemented method of claim 1 further comprising:
  transforming by the device the set of function codes for the bit at a bit position of the length L of input bit string into the set of abstraction codes.

15. The device implemented method of claim 1 further comprising:
  decomposing the received input string into plural blocks of a fixed number of bits of the input string, and producing a like number of plural blocks for the one's complement of the input string;
  testing the function codes for a presence of a limit condition, when no limit condition exists a data bit is read from a corresponding input string block and corresponding one's complement block.

16. A device comprises:
  one or more processor devices coupled to memory, the processor devices with the memory executing an abstraction engine that is configured to:
  receive an input bit string of bits, the input bit string having a finite bit length;
  produce from the input bit string the one's complement of the input bit string;
  iteratively calculate from the input bit string a first set of pairs of function codes corresponding to the bits in the input string, and from the one's complement of the input bit string, a second set of pairs of function codes corresponding to the bits in the one's complement of the input string; and
  return by the device the pairs of function codes from the first set and the second set of function codes calculated at a last bit in the input string and the ones complement as a set of abstraction codes that is a representation of the input string, which representation has fewer bits than the bit length of the input string.

17. A device implemented method for recovering an original input string from a set of abstraction codes, the method comprising:
  iteratively, retrieving from a memory in the device, two pairs of abstraction codes;
  determining a bit of the original input string, by:
    applying a first one of the two pairs of abstraction codes to a first abstraction engine and a second one of the two second pairs of the abstraction codes to a second abstraction engine;
    and in each of the first abstraction engine and second abstraction engine:
      retrieve a previous element that includes a value of a data bit of the previous element, states, and function codes corresponding to the previous element;
      calculating by the abstraction engines in the device from the values of the previous element, two subsequent function codes;
      obtaining douplet products using the two subsequent function codes;

determining the number of occurrences of 00 and non 00 elements from the douplet products;

applying a rule according to the number of occurrences of 00 and non 00 elements to provide a candidate location of a the correct bit value for the bit of the input string; and selecting a bit value from either the first or the second abstraction engines as the correct candidate value according to which abstraction engine produces a result that satisfies the applied rule executed in each of the first and second abstraction engines.

18. The device implemented method of claim 17 wherein for each recovering iteratively action for a subsequent bit of the input string, the method further comprises:

applying to the first and second abstraction engines, the subsequent element, as a new previous element; and in each of the first and second abstraction engines;

calculating new subsequent function using the new previous element;

obtaining subsequent douplet products using the new subsequent function codes;

determining the number of occurrences of 00 and non 00 elements for the new subsequent douplet products;

applying a rule according to the occurrences of 00 and non 00 elements to provide a subsequent candidate location of the correct bit for the subsequent bit of the input string; and selecting a subsequent bit from either the first or the second abstraction engines as correct candidate location of the next bit of the input string according to which abstraction engine produces a subsequent result that satisfies the applied rule executed in each of the first and second abstraction engines for the new subsequent function codes.

19. The device implemented method of claim 17 further comprising:

initializing the abstraction engines by applying sets of system values to the abstraction engines where the system values represent known system values to provide beginning conditions for abstracting the input string and complement of the input string.

20. A device implemented method to provide a representation of an input string having a size corresponding to a number of bits, with the representation being reduced in size in comparison to the size of the string, the method comprises:

providing to a computing device that includes an abstraction engine an input string having a finite bit length L;

initializing the abstraction engine by applying a set of system values to the abstraction engine to provide an initial state, where the set of system values represent known system values to provide beginning conditions; and calculating by the abstraction engine from the input string, a set of function codes using the initial state as the beginning state, with the set of function codes at the bit length L corresponding to the representation of the input string.

21. The device implemented method of claim 20, further comprises:

iteratively determining a set of function codes from the bits in the input string; and transforming by the device the set of functions from the last one of the iterations into the abstraction codes.

22. The device implemented method of claim 20 wherein the set of the function codes and the length L of the input bit string is the reduced size representation of the input bit string.

23. The device implemented method of claim 20 wherein the set of function codes are bit codes, and the set of bit codes are two codes, with each code being selected from the group consisting of five bits in length and six bits in length.

24. The device implemented method of claim 20 wherein initializing the abstraction engine defines beginning conditions.

25. The device implemented method of claim 20 wherein the set of system values applied for initializing are prepended to the input string and processed through the abstraction engine prior to processing of the input string.

26. The device implemented method of claim 20, further comprising:

a table including values of functions for system initializing values, a present set of inputs, and values of a next set of inputs.

27. The device implemented method of claim 21 wherein the length L of the input bit string is determined or is received by the device or is a fixed length.

28. A device implemented method of processing a set of two pairs of abstraction codes that is an equivalent representation of an original input bit string of length L to recover the original input bit string of length L, the method comprises:

iteratively repeating by one or more processing devices over a predefined number of iterations, for each of a first one of the two pairs of abstraction codes and a second one of the two pairs of abstraction codes:

obtaining by the one or more processing devices for a bit position, present states values for FF' and GG' and a present value of an AD bit from a table;

testing by the one or more processing devices values of DA=0 and DA=1 by performing a look up into a set of matrixes for F0 and G0;

forming by the one or more processing devices true end functions #F end and #G end;

determining by the one or more processing devices whether the two elements #F and #G are both even numbers or both odd numbers;

applying by the one or more processing devices one or more of selection and decision rules from a set of selection and decision rules according to the determination;

determine by the one or more processing devices the correct bit value for the bit position for recovery of the original input string according to results of applying the one or more decision rules.

29. The device implemented method of claim 28 wherein the set of two pairs of abstraction codes are codes, with each code being four or five or six bits in length.

30. The device implemented method of claim 28 wherein decision rules are minimum rules.

31. The device implemented method of claim 28 wherein decision rules are maximum rules.

32. A computing device implemented method comprises:

providing to a computing device that includes an abstraction engine, an input string having a finite length L;

initializing by the computing device, the abstraction engine by applying a set of system values to the abstraction engine, where the system values represent known system values to provide beginning conditions for abstracting the input string;

producing by the computing device from the input string, the one's complement of the input string;

decomposing the input string into plural modules a first module comprising plural blocks of bits of the input string and a second module comprising plural blocks of bits of the one's complement of the input string, for each of the first and the second modules,
calculating by the abstraction engine in the computing device, a set of function codes for each block of bits;

calculating from the set of function codes a subsequent set of function codes, and from the subsequent set of function codes and next subsequent set of function codes until a final subsequent set of function codes is reached; and returning by the computing device, the calculated final subsequent set of function codes from the first and the second modules, as a set of abstraction codes that are a representation of the input string.

33. The device implemented method of claim 32 further comprising:
applying by the abstraction engine in the device a permutation to transform the final subsequent set of function codes into the set of abstraction codes.

34. The device implemented method of claim 32 wherein the final subsequent set of function codes and the finite length L of the input bit string is the representation of the input bit string, with the finite length L being either a known length or a determined length.

35. The device implemented method of claim 32 wherein the final subsequent set of function codes are plural codes, with each being of four bits in length or five bits in length or six bits in length.

36. The device implemented method of claim 32 wherein initializing by the computing device, the abstraction engine defines beginning conditions as a fixed row for any application, and the set of system values applied for initializing are six values that are prepended to the input string and processed through the abstraction engine prior to processing of the input string.

37. The device implemented method of claim 32 wherein calculating by the abstraction engine further comprises:
accessing a table including for true and one's complement values of the input string, values of function codes for system initializing values, a present set of inputs, and values of a next set of inputs to provide the function codes according to a value of an input bit from the input bit string.

38. The device implemented method of claim 32, further comprising:
iteratively choosing the function codes for true and one's complement values of the input string by:
evaluating each bit of the input bit string according to a set of present inputs and prior state to provide the function codes and next set of inputs.

39. The device implemented method of claim 32 wherein calculating the set of function codes further comprises:
iteratively determining a DA bit and a DA' bit according to a bit position of the input bit string, by:
testing for a limit condition for the data bit in the bit position.

40. The device implemented method of claim 39 wherein when a limit condition is not encountered, further comprises:
using the bit the input bit string in the bit position as the DA bit and its complement as the DA' bit.

41. The device implemented method of claim 39 wherein when a limit condition is encountered, using for the DA bit and the DA' bit, a limit bit and limit bit complement, with at least one of the limit bit and limit bit complement provided from a limit bit table according to an limit table index value.

42. The device implemented method of claim 32 wherein calculating the set of function codes further comprises:
testing for a limit condition for a bit in a bit position of the input string; and for an encountered limit condition; and
determining the type of limit condition encountered.

43. The device implemented method of claim 42 wherein the limit condition type is a limit detect condition, and a substitution is made for one or both of the computed function codes according to whether one of or both of the set of function codes encountered the limit detect condition.

44. The device implemented method of claim 42 wherein the limit condition type is a limit transition condition, and occurs when for an input bit and a present input of an AD bit or an AD' bit or the DA bit or an DA' bit, the computed next states of the function codes have same values.

45. The device implemented method of claim 44 wherein for the limit transition condition a substitution of the computed next states is made for one or both of the computed next states according to whether one of or both of the set of functions encounter the limit transition condition.

46. A device comprises:
one or more processor devices;
memory coupled to the processor devices, with the processor devices configured to:
receive an input string having a finite length L;
produce by the device from the input string, the one's complement of the input string;
decompose the input string and the one's complement into a first set of plural modules of blocks of bits of the input string and a second set of modules of blocks of bits of the one's complement of the input string;
for each of the first set of plural modules of blocks of bits of the input string and the second set of plural modules of blocks of bits of the input string,
iteratively calculate by the abstraction engine in the computing device, a set of function codes for each of the blocks of bits with a subsequent set of function codes determined in part from a previous set of function codes until a final subsequent set of function codes is reached; and
return the final subsequent set of function codes, as a set of abstraction codes that are a representation of the input string.

47. The device of claim 46 further configured to:
initialize by the device, the abstraction engine by applying a set of system values to the abstraction engine, where the system values represent known system values to provide beginning conditions; and
apply by the abstraction engine in the device a permutation to transform the final subsequent set of function codes into the set of abstraction codes.

48. The device of claim 46 wherein the final subsequent set of function codes are plural codes, with each being of four bits in length or five bits in length or six bits in length.

49. The device of claim 47 wherein the device configured to initialize the abstraction engine, defines beginning conditions as a fixed row for any application, and the set of system values applied for initializing are six values that are prepended to the input string and processed through the abstraction engine prior to processing of the input string.

50. The device of claim 46 wherein the abstraction engine is further configured to:

access a table including for true and one's complement values of the input string, values of function codes for system initializing values, a present set of inputs, and values of a next set of inputs to provide the function codes according to a value of an input bit from the input bit string.

51. The device of claim 32 wherein the abstraction engine is further configured to:
iteratively determine a DA bit and a DA' bit according to a bit position of the input bit string; and
test for a limit condition for the input bit in the bit position.

52. The device of claim 51 wherein when a limit condition is not encountered, further comprises:
use the bit the input bit string in the bit position as the DA bit and its complement as the DA' bit.

53. The device of claim 51 wherein when a limit condition is encountered,
use for the DA bit and the DA' bit, a limit bit and limit bit complement, with at least one of the limit bit and limit bit complement provided from a limit bit table according to an limit table index value.

54. The device of claim 46 wherein the abstraction engine is further configured to:
test for a limit condition for a bit in a bit position of the input string; and for an encountered limit condition; and
determine the type of limit condition encountered.

55. The device of claim 54 wherein the limit condition type is a limit detect condition, and a substitution of a function is made for one or both of the computed functions according to whether one of or both of the set of functions encountered the limit detect condition.

56. The device of claim 54 wherein the limit condition type is a limit transition condition, and occurs when for an input bit and a present input of an AD bit or an AD' bit or the DA bit or an DA' bit, the computed next states of the function codes have same values.

57. The device of claim 56 wherein for the limit transition condition a substitution of the computed next states is made for one or both of the computed next states according to whether one of or both of the set of functions encounter the limit transition condition.

* * * * *